United States Patent
Shepard

(10) Patent No.: US 12,472,266 B2
(45) Date of Patent: Nov. 18, 2025

(54) ANTIBODIES AND ENONOMERS

(71) Applicant: ENOSI THERAPEUTICS CORPORATION, Eugene, OR (US)

(72) Inventor: H. Michael Shepard, Eugene, OR (US)

(73) Assignee: Enosi Therapeutics Corporation, Eugene, OR (US)

( * ) Notice: Subject to any disclaimer, the term of this patent is extended or adjusted under 35 U.S.C. 154(b) by 622 days.

(21) Appl. No.: 17/432,720

(22) PCT Filed: Feb. 19, 2020

(86) PCT No.: PCT/US2020/018739
§ 371 (c)(1),
(2) Date: Aug. 20, 2021

(87) PCT Pub. No.: WO2020/172218
PCT Pub. Date: Aug. 27, 2020

(65) Prior Publication Data
US 2022/0175945 A1    Jun. 9, 2022

Related U.S. Application Data

(60) Provisional application No. 62/808,635, filed on Feb. 21, 2019.

(51) Int. Cl.
| | |
|---|---|
| *C12N 15/115* | (2010.01) |
| *A61K 47/64* | (2017.01) |
| *A61K 47/68* | (2017.01) |
| *C12Q 1/68* | (2018.01) |

(52) U.S. Cl.
CPC ........ *A61K 47/6807* (2017.08); *A61K 47/643* (2017.08); *A61K 47/6849* (2017.08); *A61K 47/6855* (2017.08); *C12N 15/115* (2013.01); *C12N 2310/16* (2013.01); *C12N 2310/3513* (2013.01)

(58) Field of Classification Search
None
See application file for complete search history.

(56) References Cited

U.S. PATENT DOCUMENTS

| | | | |
|---|---|---|---|
| 5,270,163 A | 12/1993 | Gold et al. | 435/6 |
| 5,475,096 A | 12/1995 | Gold et al. | 536/23.1 |
| 5,496,938 A | 3/1996 | Gold et al. | 536/22.1 |
| 5,567,588 A | 10/1996 | Gold et al. | 435/6 |
| 5,660,985 A | 8/1997 | Pieken et al. | 435/6 |
| 5,672,695 A | 9/1997 | Eckstein et al. | 536/24.5 |
| 5,698,687 A | 12/1997 | Eckstein et al. | 536/25.3 |
| 5,705,337 A | 1/1998 | Gold et al. | 435/6 |
| 5,707,796 A | 1/1998 | Gold et al. | 435/6 |
| 5,763,177 A | 6/1998 | Gold et al. | 435/6 |
| 5,817,635 A | 10/1998 | Eckstein et al. | 514/44 |
| 5,861,254 A | 1/1999 | Schneider et al. | 435/6 |
| 5,958,691 A | 9/1999 | Pieken et al. | 435/6 |
| 8,916,696 B2* | 12/2014 | Rossi | A61K 47/549 536/23.1 |
| 8,969,318 B2 | 3/2015 | Toleikis et al. | 514/44 A |
| 9,028,817 B2 | 5/2015 | De Silva et al. | 424/135.1 |
| 9,028,822 B2 | 5/2015 | Brewis et al. | 424/143.1 |
| 9,081,017 B2 | 7/2015 | Bradley et al. | 435/7.1 |
| 2003/0175921 A1* | 9/2003 | Barbas | C07K 16/40 506/13 |
| 2009/0170769 A1 | 7/2009 | Jin et al. | 424/155.1 |
| 2012/0107330 A1 | 5/2012 | Stoop | 424/174.1 |
| 2013/0022538 A1* | 1/2013 | Rossi | C12N 15/115 424/9.1 |
| 2014/0112929 A1 | 4/2014 | Batuwangala et al. | 424/139.1 |
| 2015/0094359 A1 | 4/2015 | Gmeiner | 514/44 R |
| 2017/0028070 A1 | 2/2017 | Hah et al. | 424/131.1 |
| 2019/0144556 A1 | 5/2019 | Faustman | 424/85.7 |
| 2020/0102362 A1 | 4/2020 | Fischer et al. | 530/351 |

FOREIGN PATENT DOCUMENTS

| | | |
|---|---|---|
| WO | WO 1992/007065 | 4/1992 |
| WO | WO 2004/058820 | 7/2004 |
| WO | WO 2007/049017 | 5/2007 |
| WO | WO 2008/113515 | 9/2008 |
| WO | WO 2010/094720 | 8/2010 |
| WO | WO 2011/006914 | 1/2011 |
| WO | WO 2011/051217 | 5/2011 |
| WO | WO 2012/172070 | 12/2012 |
| WO | WO 2014/047357 | 3/2014 |
| WO | WO 2015/104322 | 7/2015 |
| WO | WO 2017/040312 | 3/2017 |
| WO | WO 2017/174586 | 10/2017 |

(Continued)

OTHER PUBLICATIONS

Letter/Written Disclosure of the Information Disclosure Statement for the above-referenced application, filed herewith on Nov. 17, 2021, 2 pages.

Abdel-Latif et al., "Inflammation and esophageal carcinogenesis," *Curr. Opin. Pharmacol.* 9(4):396-404 (2009).

Abdiche et al., "Determining kinetics and affinities of protein interactions using a parallel real-time label-free biosensor, the Octet," *Anal. Biochem.* 377(2):209-217 (2008).

American Cancer Society, "Cancer Facts and Figures 2017," Atlanta: American Cancer Society (2017), 76 pages.

Ancona et al., "First-Line Chemotherapy Improves the Resection Rate and Long-Term Survival of Locally Advanced (T4, any N, M0) Squamous Cell Carcinoma of the Thoracic Esophagus: Final Report on 163 Consecutive Patients With 5-Year Follow-Up," *Ann. Surg.* 226(6):714-724 (1997).

(Continued)

*Primary Examiner* — Sean McGarry
(74) *Attorney, Agent, or Firm* — Womble Bond Dickinson (US) LLP; Stephanie Seidman

(57) ABSTRACT

The subject invention provides a composition comprising an enomomer which comprises a) a carrier molecule, and b) at least one aptamer, wherein the carrier molecule is an antibody, an antigen-binding moiety, a serum protein, an intracellular protein, a messenger RNA (mRNA) or human serum albumin.

38 Claims, 26 Drawing Sheets
Specification includes a Sequence Listing.

(56) References Cited

FOREIGN PATENT DOCUMENTS

| WO | WO 2019/033050 | 2/2019 |
|---|---|---|
| WO | WO 2022/047243 | 3/2022 |

OTHER PUBLICATIONS

Arienti et al., "Preclinical evidence of multiple mechanisms underlying trastuzumab resistance in gastric cancer," *Oncotarget.* 7(14):18424-18439 (2016).

Arribas et al., "p95HER2 and Breast Cancer," *Cancer Res.* 71(5):1515-1519 (2011).

Ashkenazi, A. and Chamow, S.M., "Immunoadhesins as research tools and therapeutic agents," *Curr. Opin. Immunol.* 9(2):195-200 (1997).

Atretkhany et al., "Intrinsic TNFR2 signaling in T regulatory cells provides protection in CNS autoimmunity," *Proc. Natl. Acad. Sci. U S A.* 115(51):13051-13056 (2018).

Black et al., "PIK3CA oncogenic mutations represent a major mechanism of resistance to trastuzumab in HER2/neu overexpressing uterine serous carcinomas," *Br. J. Cancer.* 113(7):1020-1026 (2015).

Bonifant et al., "Toxicity and management in CAR T-cell therapy," *Mol. Ther. Oncolytics.* 3:16011 (2016).

Booth et al., "Extending human IgG half-life using structure-guided design," *MABS.* 10(7):1098-1110 (2018).

Boston University, "NF-kB Target Genes," [online], Retrieved on Oct. 26, 2021, from: <URL:bu.edu/nf-kb/gene-resources/target-genes/, 27 pages.

Branschädel et al., "Dual function of cysteine rich domain (CRD) 1 of TNF receptor type 1: conformational stabilization of CRD2 and control of receptor responsiveness," *Cell Signal.* 22(3):404-414 (2010).

Browne et al., "HER-2 Signaling and Inhibition in Breast Cancer," *Curr. Cancer Drug Targets.* 9(3):419-438 (2009).

Burris, H.A., "Trastuzumab Emtansine (T-DM1): Hitching a Ride on a Therapeutic Antibody," *Am. Soc. Clin. Oncol. Educ. Book.* 159-161 (2012).

Carpenter et al., "Evaluating for Suspected Child Abuse: Conditions That Predispose to Bleeding," *American Academy of Pediatrics.* 131(4):e1357-1373 (2013).

Carswell-Richards, E.A. and Williamson, B.D., "A man of vision and the discovery of tumor necrosis factor," *Cancer Immun.* 12:4 (2012).

Castellarin et al., "Driving cars to the clinic for solid tumors," *Gene Ther.* 25(3):165-175 (2018).

Chaganty et al., "Trastuzumab upregulates PD-L1 as a potential mechanism of trastuzumab resistance through engagement of immune effector cells and stimulation of IFNγ secretion," *Cancer Lett.* 430:47-56 (2018).

Chang et al., "Initiation of T cell signaling by CD45 segregation at 'close contacts'," *Nat. Immunol.* 17(5):574-582 (2016).

Chen et al., "Novel anti-CD3 chimeric antigen receptor targeting of aggressive T cell malignancies," *Oncotarget.* 7(35):56219-56232 (2016).

Connor, V., "Anti-TNF therapies: a comprehensive analysis of adverse effects associated with immunosuppression," *Rheumatol. Int.* 31(3):327-337 (2009).

Croft et al., "Clinical targeting of the TNF and TNER superfamilies," *Nat. Rev. Drug Discov.* 12(2):147-168 (2013).

Curry, S., "Beyond Expansion: Structural Studies on the Transport Roles of Human Serum Albumin," *Vox Sang.* 83 Suppl 1:315-319 (2002).

Czajkowsky et al., "Fc-fusion proteins: new developments and future perspectives," *EMBO Mol. Med.* 4(10):1015-1028 (2012).

Damen et al., "Electrospray Ionization Quadrupole Ion-Mobility Time-of-Flight Mass Spectrometry as a Tool to Distinguish the Lot-to-Lot Heterogeneity in N-Glycosylation Profile of the Therapeutic Monoclonal Antibody Trastuzumab," *J. Am. Soc. Mass Spectrom.* 20(11):2021-2033 (2009).

Darmostuk et al., "Current approaches in SELEX: An update to aptamer selection technology," *Biotechnol. Adv.* 33(6 Pt 2):1141-1161 (2015).

Dennler et al., "Antibody Conjugates: From Heterogeneous Populations to Defined Reagents," *Antibodies.* 4(3):197-224 (2015).

Ebbing et al., "ADAM10-mediated release of heregulin confers resistance to trastuzumab by activating HER3," *Oncotarget.* 7(9):10243-10254 (2016).

Figueroa-Magalhães et al., "Treatment of HER2-positive Breast Cancer," *Breast.* 23(2):128-136 (2014).

Fouad et al., "The role of inflammation in inflammatory breast cancer," *Adv. Exp. Med. Biol.* 816:53-73 (2014).

Gawande et al., "Selection of DNA aptamers with two modified bases," *Proc. Natl. Acad. Sci. USA.* 114(11):2898-2903 (2017).

Ghinea, N., "Vascular Endothelial FSH Receptor, a Target of Interest for Cancer Therapy," *Endocrinology.* 159(9):3268-3274 (2018).

Gianni et al., "5-year analysis of neoadjuvant pertuzumab and trastuzumab in patients with locally advanced, inflammatory, or early-stage HER2-positive breast cancer (NeoSphere): a multicentre, open-label, phase 2 randomised trial," *Lancet Oncol.* 17(6):791-800 (2016).

Giorgi et al., "Carbohydrate PEGylation, an approach to improve pharmacological potency," *Beilstein J. Org. Chem.* 10:1433-1444 (2014).

Gold et al., "Aptamer-Based Multiplexed Proteomic Technology for Biomarker Discovery," *PLoS One.* 5(12):e15004 (2010).

Grell et al., "The type 1 receptor (CD120a) is the high-affinity receptor for soluble tumor necrosis factor," *Proc. Natl. Acad. Sci. USA.* 95(2):570-575 (1998).

Gupta et al., "Pharmacokinetic Properties of DNA Aptamers with Base Modifications," *Nucleic Acid Ther.* 27(6):345-353 (2017).

Hartmann et al., "Clinical development of CAR T cells-challenges and opportunities in translating innovative treatment concepts," *EMBO Mol. Med.* 9(9):1183-1197 (2017).

Hasegawa et al., "Methods for Improving Aptamer Binding Affinity," *Molecules.* 21(4):421 (2016).

Hatfield, S.M. and Sitkovsky, M., "A2A Adenosine Receptor antagonists to weaken the hypoxia-HIF-1α driven immunosuppression and improve immunotherapies of cancer," *Curr. Opin. Pharmacol.* 29:90-96 (2016).

Herceptin® (trastuzumab) Intravenous Infusion Prescribing Information, Revised Oct. 2010, Retrieved from: <URL:accessdata.fda.gov/drugsatfda_docs/label/2010/103792s5250lbl.pdf, 33 pages.

Heo et al., "An aptamer-antibody complex (oligobody) as a novel delivery platform for targeted cancer therapies," *J. Control. Release.* 229:1-9 (2016).

Hsu et al., "TRADD-TRAF2 and TRADD-FADD Interactions Define Two Distinct TNF Receptor 1 Signal Transduction Pathways," *Cell.* 84(2):299-308 (1996).

Hu et al., "Transmembrane TNF-α Promotes Suppressive Activities of Myeloid-Derived Suppressor Cells via TNFR2," *J. Immunol.* 192(3):1320-1331 (2014).

Humira (adalimumab) Injection, Solution for Subcutaneous use Prescribing Information, Revised Dec. 2011, Retrieved from: <URL:accessdata.fda.gov/drugsatfda_docs/label/2011/125057s0276lbl.pdf, 70 pages.

Jacobsen et al., "Pan-HER, an Antibody Mixture Simultaneously Targeting EGFR, HER2, and HER3, Effectively Overcomes Tumor Heterogeneity and Plasticity," *Clin. Cancer Res.* 21(18):4110-4122 (2015).

Jiang et al., "The prognostic value of EGFR overexpression and amplification in Esophageal squamous cell Carcinoma," *BMC Cancer.* 15:377 (2015).

Jin et al., "Rational Optimization of a Bispecific Ligand Trap Targeting EGF Receptor Family Ligands," *Mol. Med.* 15(1-2):11-20 (2009).

Kangwa et al., "An engineered Staphylococcal Protein A based ligand: Production, characterization and potential application for the capture of Immunoglobulin and Fc-fusion proteins," *Protein Expr. Purif.* 155:27-34 (2019).

(56) References Cited

OTHER PUBLICATIONS

Keffer et al., "Transgenic mice expressing human tumour necrosis factor: a predictive genetic model of arthritis," *EMBO J.* 10(13):4025-4031 (1991).
Keir et al., "Sym004-induced EGFR elimination is associated with profound anti-tumor activity in EGFRvIII patient-derived glioblastoma models," *J. Neuro-Oncol.* 138(3):489-498 (2018).
Kimoto et al., "Generation of high-affinity DNA aptamers using an expanded genetic alphabet," *Nat. Biotechnol.* 31(5):453-457 (2013).
Khattabi et al., "The effect of polymer length on the in vitro characteristics of a drug loaded and targeted silica nanoparticles," *Saudi Pharm. J.* 26(7):1022-1026 (2018).
Klinger et al., "Immunopharmacologic response of patients with B-lineage acute lymphoblastic leukemia to continuous infusion of T cell-engaging CD19/CD3-bispecific BiTE antibody blinatumomab," *Blood.* 119(26):6226-6233 (2012).
Kulkarni et al., "Cationic α-Cyclodextrin:Poly(ethylene glycol) Polyrotaxanes for siRNA Delivery," *Mol. Pharm.* 10(4):1299-1305 (2013).
Law et al., "Expression and characterization of recombinant soluble human CD3 molecules: Presentation of antigenic epitopes defined on the native TCR-CD3 complex," *Int. Immunol.* 14(4):389-400 (2002).
Lee, P. and Wu, X., "Review: Modifications of Human Serum Albumin and Their Binding Effect," *Curr. Pharm. Des.* 21(14):1862-1865 (2015).
Lewis et al., "Differential responses of human tumor cell lines to anti-p185HER2 monoclonal antibodies," *Cancer Immunol. Immunother.* 37(4):255-263 (1993).
Lewis et al., "Modulation of the Growth of Transformed Cells by Human Tumor Necrosis Factor-α and Interferon-γ," *Cancer Res.* 47(20):5382-5385 (1987).
Lewis Phillips et al., "Targeting HER2-Positive Breast Cancer with Trastuzumab-DM1, an Antibody-Cytotoxic Drug Conjugate." *Cancer Res.* 68(22):9280-9290 (2008).
Li et al., "Mechanisms of Acquired Resistance to Trastuzumab Emtansine in Breast Cancer Cells," *Mol. Cancer Ther.* 17(7):1441-1453 (2018).
Lin et al., "A HER2 bispecific antibody can be efficiently expressed in *Escherichia coli* with potent cytotoxicity," *Oncol. Lett.* 16(1):1259-1266 (2018).
Liu et al., "Recent Advances on the Development of Pharmacotherapeutic Agents on the Basis of Human Serum Albumin," *Curr. Pharm. Des.* 21(14):1866-1888 (2015).
Liu et al., "The Reactivity of Human Serum Albumin Toward trans-4-Hydroxy-2-nonenal," *J. Mass. Spectrom.* 47(4):411-424 (2012).
Löffler et al., "A recombinant bispecific single-chain antibody, CD19×CD3, induces rapid and high lymphoma-directed cytotoxicity by unstimulated T lymphocytes," *Blood.* 95(6):2098-2103 (2000).
Lopez et al., "Identification of Highly Selective MMP-14 Inhibitory Fabs by Deep Sequencing," *Biotechnol. Bioeng.* 114(6):1140-1150 (2017).
Ma et al., "A Novel Small-molecule Tumor Necrosis Factor α Inhibitor Attenuates Inflammation in a Hepatitis Mouse Model," *J. Biol. Chem.* 289(18):12457-12466 (2014).
Magis et al., "An improved understanding of TNFL/TNFR interactions using structure-based classifications," *Trends Biochem. Sci.* 37(9):353-363 (2012).
Maude et al., "Tisagenlecleucel in Children and Young Adults with B-Cell Lymphoblastic Leukemia," *N. Engl. J. Med.* 378(5):439-448 (2018).
Misharin et al., "Development of a new humanized mouse model to study acute inflammatory arthritis," *J. Transl. Med.* 10:190 (2012).
Mitri et al., "The HER2 Receptor in Breast Cancer: Pathophysiology, Clinical Use, and New Advances in Therapy," *Chemother. Res. Pract.* 2012:743193 (2012).
Mocellin, S. and Nitti, D., "TNF and cancer: the two sides of the coin," *Front. Biosci.* 13:2774-2783 (2008).
Monaco et al., "Anti-TNF therapy: past, present and future," *Int. Immunol.* 27(1):55-62 (2014).
Morandi et al., "RET in breast cancer: functional and therapeutic implications," *Trends Mol. Med.* 17(3):149-157 (2011).
Morita et al., "Aptamer Therapeutics in Cancer: Current and Future," *Cancers.* 10(3) (2018).
Morgan et al., "Case Report of a Serious Adverse Event Following the Administration of T Cells Transduced With a Chimeric Antigen Receptor Recognizing ERBB2," *Mol. Ther.* 18(4):843-851 (2010).
Möker et al., "Antibody Selection for Cancer Target Validation of FSH-Receptor in Immunohistochemical Settings," *Antibodies.* 6(15) (2017).
Mukai et al., "Solution of the Structure of the TNF-TNFR2 Complex," *Sci. Signal.* 3(148):ra83 (2010).
Nahta et al., "The HER-2-Targeting Antibodies Trastuzumab and Pertuzumab Synergistically Inhibit the Survival of Breast Cancer Cells," *Cancer Res.* 64(7):2343-2346 (2004).
Nicto et al., "Epigenetic biomarkers in progression from non-dysplastic Barrett's ocsophagus to oesophageal adenocarcinoma: a systematic review protocol," *BMJ Open.* 6(12) (2016).
Ni et al., "Chemical Modifications of Nucleic Acid Aptamers for Therapeutic Purposes," *Int. J. Mol. Sci.* 18(8) (2017).
Nimjee et al., "Aptamers as Therapeutics," *Annu. Rev. Pharmacol. Toxicol.* 57:61-79 (2017).
Öhman et al., "A New Antibody Recognizing the vIII Mutation of Human Epidermal Growth Factor Receptor," *Tumor Biol.* 23(2):61-69 (2002).
Okita et al., "Efficacy and Safety of Trastuzumab in Combination with S-1 and Cisplatin Therapy for Japanese Patients with HER2-Positive Advanced Gastric Cancer: Retrospective Analysis," *Tohoku J. Exp. Med.* 245(2):123-129 (2018).
Paladini et al., "Mutations in the Catalytic Domain of Human Matrix Metalloproteinase-1 (MMP-1) That Allow for Regulated Activity through the Use of Ca2+," *J. Biol. Chem.* 288(9):6629-6639 (2013).
Papadimitriou et al., "Follicle-Stimulating Hormone Receptor (FSHR): A Promising Tool in Oncology?" *Mol. Diagn. Ther.* 20(6):523-530 (2016).
Pegram et al., "Rational Combinations of Trastuzumab With Chemotherapeutic Drugs Used in the Treatment of Breast Cancer," *J. Natl. Cancer Inst.* 96(10):739-749 (2004).
Peters, C. and Brown, S., "Antibody-drug conjugates as novel anti-cancer chemotherapeutics," *Biosci. Rep.* 35:e00225 (2015).
Perales-Puchalt et al., "Follicle-Stimulating Hormone Receptor Is Expressed by Most Ovarian Cancer Subtypes and Is a Safe and Effective Immunotherapeutic Target," *Clin. Cancer Res.* 23(2):441-453 (2017).
Placke et al., "Glucocorticoid-Induced TNFR-Related (GITR) Protein and Its Ligand in Antitumor Immunity: Functional Role and Therapeutic Modulation," *Clin. Dev. Immunol.* 2010:239083 (2010).
Portell et al., "Clinical and pharmacologic aspects of blinatumomab in the treatment of B-cell acute lymphoblastic leukemia," *Clin. Pharmacol.* 5(Suppl 1):5-11 (2013).
Pulusu, S.S.R. and Lawrance, I.C., "Dysplasia and colorectal cancer surveillance in inflammatory bowel disease," *Expert Rev. Gastroenterol. Hepatol.* 11(8):711-722 (2017).
Roberts et al., "Chemistry for peptide and protein PEGylation," *Adv. Drug. Deliv. Rev.* 54(4):459-476 (2002).
Sanchez-De Melo et al., "N-glycosylation profile analysis of Trastuzumab biosimilar candidates by Normal Phase Liquid Chromatography and MALDI-TOF MS approaches," *J. Proteomics.* 127(Pt B):225-233 (2015).
Schietinger et al., "A Mutant Chaperone Converts a Wild-Type Protein into a Tumor-Specific Antigen," *Science.* 314(5797):304-308 (2006).
Sensi et al., "Retinol binding protein: a short half life determinant of protein non enzymatic glycation in diabetes," *Diabetes Res.* 13(4):195-198 (1990), abstract only, 2 pages.
Shalaby et al., "Development of Humanized Bispecific Antibodies Reactive with Cytotoxic Lymphocytes and Tumor Cells Overexpressing the HER2 Protooncogene," *J. Exp. Med.* 175(1):217-225 (1992).
Sheng et al., "TNF Receptor 2 Makes Tumor Necrosis Factor a Friend of Tumors," *Front. Immunol.* 9:1170 (2018).
Shiokawa et al., "Effect of Polyethylene Glycol Linker Chain Length of Folate-Linked Microemulsions Loading Aclacinomycin

(56) References Cited

OTHER PUBLICATIONS

A on Targeting Ability and Antitumor Effect In vitro and In vivo," *Clin. Cancer Res.* 11(5):2018-2025 (2005).
Singha et al., "Tumor-Associated Hyaluronan Limits Efficacy of Monoclonal Antibody Therapy," *Mol. Cancer Ther.* 14(2):523-532 (2015).
Smith et al., "A novel, native-format bispecific antibody triggering T-cell killing of B-cells is robustly active in mouse tumor models and cynomolgus monkeys," *Sci. Rep.* 5:17943 (2015).
Steffen et al., "Recurrence Patterns and Long-term Results After Induction Chemotherapy, Chemoradiotherapy, and Curative Surgery in Patients With Locally Advanced Esophageal Cancer," *Ann. Surg.* 269(1):83-87 (2019).
Sugiyama et al., "A semi high-throughput method for screening small bispecific antibodies with high cytotoxicity," *Sci. Rep.* 7(1):2862 (2017).
Sun et al., "Mechanisms Contributing to T Cell Receptor Signaling and Assembly Revealed by the Solution Structure of an Ectodomain Fragment of the CD3εγ Heterodimer," *Cell.* 105(7):913-923 (2001).
Teplinsky, E. and Muggia, F., "Targeting HER2 in ovarian and uterine cancers: Challenges and future directions," *Gynecol. Oncol.* 135(2):364-370 (2014).
ThermoFisher Scientific Publication, "TNF Signaling Pathway," [online]; retrieved on Oct. 28, 2021 from: <URL:thermofisher.com/us/en/home/life-science/antibodies/antibodies-learning-center/antibodies-resource-library/cell-signaling-pathways/tnf-signaling-pathway.html, 4 pages.
Tolle, F. and Mayer, G., "Dressed for success—applying chemistry to modulate aptamer functionality," *Chem. Sci.* 4:60-67 (2013).
Tokito, A. and Jougasaki, M., "Matrix Metalloproteinases in Non-Neoplastic Disorders," *Int. J. Mol. Sci.* 17(7) (2016).
Torigoe et al., "Therapeutic strategies for afatinib-resistant lung cancer harboring HER2 alterations," *Cancer Sci.* 109(5):1493-1502 (2018).
Tracey et al., "Cachectin: A Hormone That Triggers Acute Shock and Chronic Cachexia," *J. Infect. Dis.* 157(3):413-420 (1988).
Tran et al., "Regulation and functions of inflammasome-mediated cytokines in Helicobacter pylori infection," *Microbes Infect.* 19(9-10):449-458 (2017).
Urban et al., "Tumor necrosis factor: A potent effector molecule for tumor cell killing by activated macrophages," *Proc. Natl. Acad. Sci. USA.* 83(14):5233-5237 (1986).
Van Landuyt et al., "Customized protein glycosylation to improve biopharmaceutical function and targeting," *Curr. Opin. Biotechnol.* 60:17-28 (2019).
Vanamee, E.S. and Faustman, D.L., "TNFR2: A Novel Target for Cancer Immunotherapy," *Trends Mol. Med.* 23(11):1037-1046 (2017).
Velasquez et al., "Redirecting T cells to hematological malignancies with bispecific antibodies," *Blood.* 131(1):30-38 (2018).
Vlahopoulos et al., "Nuclear Factor-κB-Dependent Induction of Interleukin-8 Gene Expression by Tumor Necrosis Factor α: Evidence for an Antioxidant Sensitive Activating Pathway Distinct From Nuclear Translocation," *Blood.* 94(6):1878-1889 (1999).
Vu, T. and Claret, F.X., "Trastuzumab: updated mechanisms of action and resistance in breast cancer," *Front. Oncol.* 2:62 (2012).
Wang et al., "Optimization of the Linker Length of Mannose-Cholesterol Conjugates for Enhanced mRNA Delivery to Dendritic Cells by Liposomes," *Front. Pharmacol.* 9:980 (2018).
Wang et al., "NF-κB Signaling Pathway, Inflammation and Colorectal Cancer," *Cell. Mol. Immunol.* 6(5):327-334 (2009).
Wang et al., "Three decades of nucleic acid aptamer technologies: Lessons learned, progress and opportunities on aptamer development," *Biotechnol. Adv.* 37(1):28-50 (2019).
Waybrant et al., "Effect of Polyethylene Glycol, Alkyl, and Oligonucleotide Spacers on the Binding, Secondary Structure, and Self-Assembly of Fractalkine Binding FKN-S2 Aptamer-Amphiphiles," *Langmuir.* 30(25):7465-7474 (2014).
Wikipedia, "Systematic evolution of ligands by exponential enrichment" [online]; retrieved on Oct. 28, 2021 from: <URL:en.wikipedia.org/wiki/Systematic_evolution_of_ligands_by_exponential_enrichment, 10 pages.
Wilkinson, D.M., "Selection of Aptamers for Human Serum Albumin and its Glycated Form." Thesis for PhD in Chemistry at Imperial College, London, UK.
Williams et al., "Phenotypic screening reveals TNFR2 as a promising target for cancer immunotherapy," *Oncotarget.* 7(42):68278-68291 (2016).
Williams et al., "Antibody-Mediated Inhibition of TNFR1 Attenuates Disease in a Mouse Model of Multiple Sclerosis," *PLoS One.* 9(2):e90117 (2014).
Wolter, O. and Mayer, G., "Aptamers as Valuable Molecular Tools in Neurosciences," *J. Neurosci.* 37(10):2517-2523 (2017).
Wortzel et al., "Independent immunodominant and immunorecessive tumor-specific antigens on a malignant tumor: antigenic dissection with cytolytic T cell clones," *J. Immunol.* 130(5):2461-2466 (1983).
Xu et al., "Essential role of the TNF-TNFR2 cognate interaction in mouse dendritic cell-natural killer cell crosstalk," *Blood.* 109(8):3333-3341 (2007).
Youn et al., "Carbohydrate-specifically polyethylene glycol-modified ricin A-chain with improved therapeutic potential," *Int. J. Biochem. Cell. Biol.* 37(7):1525-1533 (2005).
Yu et al., "Trastuzumab Glycan Batch-to-Batch Profiling using a UPLC/FLR/Mass Spectrometry Platform," *Waters Corp.* (2010).
Zhang et al., "Biomacromolecules as carriers in drug delivery and tissue engineering," *Acta. Pharm. Sin. B.* 8(1):34-50 (2018).
Zheng et al., "Simultaneous targeting of CD44 and EpCAM with a bispecific aptamer effectively inhibits intraperitoneal ovarian cancer growth," *Theranostics.* 7(5):1373-1388 (2017).
Zhou, J. and Rossi, J.J., "Cell-type-specific, Aptamer-functionalized Agents for Targeted Disease Therapy," *Mol. Ther. Nucleic Acids.* 3:e169 (2014).
Zettlitz et al., "ATROSAB, a humanized antagonistic anti-tumor necrosis factor receptor one-specific antibody," *MAbs.* 2(6):639-647 (2010).
Zuberbühler et al., "Fucose-specific conjugation of hydrazide derivatives to a vascular-targeting monoclonal antibody in IgG format," *Chem. Commun.* 48(56):7100-7102 (2012).
Enosi Life Sciences Press Release, entitled "Therapeutic Antibody Pioneers Professor Sir Marc Feldmann and Dr. H. Michael Shepard Formally Launch Enosi Life Sciences," published Sep. 2, 2020 [online]; retrieved on Sep. 22, 2020 from: <URL:finance.yahoo.com/news/therapeutic-antibody-pioneers-professor-sir-130000113.html, 3 pages.
Bio World™ Article, entitled "Other news to note for Sep. 2, 2020," announcing the launch of Enosi Life Sciences; published on Sep. 2, 2020 [online]; retrieved on Sep. 22, 2020, from: <URL:bioworld.com/articles/497307-other-news-to-note-for-sept-2-2020, 4 pages.
LinkedIn Post by H. Michael Shepard, posted on Sep. 21, 2020; available [online] at: <URL:linkedin.com/feed/update/urn:li:activity:6713061809768816640/, 1 page.
Credence Research "Tumor Necrosis Factor (TNF) Inhibitors Market is Expected to Reach US$ 181,139.7 Million By 2026: Credence Research," published Apr. 30, 2018 [online]; retrieved on Oct. 26, 2021, from: <URL:globenewswire.com/news-release/2018/04/30/1489866/0/en/Tumor-Necrosis-Factor-TNF-Inhibitors-Market-is-Expected-to-Reach-US-181-139-7-Million-By-2026-Credence-Research.html, 5 pages.
FDA, "FDA Drug Safety Communication: Drug labels for the Tumor Necrosis Factor-alpha (TNF&alpha) blockers now include warnings about infection with Legionella and Listeria bacteria" published Sep. 7, 2011 [online]; retreived on Oct. 27, 2021, from: <URL:fda.gov/Drugs/DrugSafety/ucm270849.htm, 4 pages.
International Search Report and Written Opinion, mailed Jun. 17, 2020, in connection with International Application No. PCT/US2020/018739, 13 pages.
PCT Demand for International Preliminary Examination (Chapter II), and Response and Amendment under Article 34 PCT, filed Dec. 21, 2020, responsive to the International Search Report and Written

(56) References Cited

OTHER PUBLICATIONS

Opinion, mailed Jun. 17, 2020, in connection with corresponding International Application No. PCT/US2020/018739, 27 pages.
International Preliminary Report on Patentability (Chapter II of the PCT), mailed May 21, 2021, in connection with corresponding International Application No. PCT/US2020/018739, 5 pages.
U.S. Appl. No. 17/731,595, filed Apr. 28, 2022, 2022/0288226, Sep. 15, 2022.
Letter/Written Disclosure of the Supplemental Information Disclosure Statement for the above-referenced application, filed herewith on May 20, 2024, 2 pages.
Dhanasekharan et al., "Rapid Development and Scale-Up of Biosimilar Trastuzumab: A Case Study of Integrated Cell Line and Process Development," *BioProcess International* 13(4):30-39 (2015), 7 pages.
Response, filed Nov. 6, 2023, in response to the Examiner's Search Report, dated Jan. 5, 2023, in connection with European Patent Application No. 20 758 513.4, 20 pages.
Letter/Written Disclosure of the Supplemental Information Disclosure Statement for the above-referenced application, filed herewith on Jun. 26, 2023, 2 pages.
Ahmad et al., "The Key Role of TNF-TNFR2 Interactions in the Modulation of Allergic Inflammation: A Review," *Front. Immunol.* 9:2572 (2018).
Ban et al., "Strategic internal covalent cross-linking of TNF produces a stable TNF trimer with improved TNFR2 signaling," *Molecular and Cellular Therapies.* 3:7 (2015), 6 pages.
Berger et al., "An anti-TNFR1 scFv-HSA fusion protein as selective antagonist of TNF action," *Protein Engineering, Design & Selection* 26(10):581-587 (2013).
Blüml et al., "Targeting TNF receptors in rheumatoid arthritis," *International Immunology* 24(5):275-281 (2012).
Blüml et al., "Antiinflammatory Effects of Tumor Necrosis Factor on Hematopoietic Cells in a Murine Model of Erosive Arthritis," *Arthritis & Rheumatism* 62(6):1608-1619 (2010).
Brennan et al., "Preparation of Bispecific Antibodies by Chemical Recombination of Monoclonal Immunoglobulin G1 Fragments," *Science* 229:81-83 (1985).
Bullimore, D. W., "Endometriosis is sustained by tumour necrosis factor-α," *Med. Hypotheses* 60(1):84-88 (2003).
Chang et al., "Tumor necrosis factor α inhibition for Alzheimer's disease," *J. Cent. Nerv. Syst. Dis.* 9:1-5 (2017).
Chen et al., "TNFR2 Is Critical for the Stabilization of the CD4$^+$ Foxp3$^+$ Regulatory T Cell Phenotype in the Inflammatory Environment," *J. Immunol.* 190(3):1076-1084 (2013).
Chopra et al., "Exogenous TNFR2 activation protects from acute GvHD via host T reg cell expansion," *J. Exp. Med.* 213(9):1881-1900 (2016).
Chou et al., "Treatment for Rheumatoid Arthritis and Risk of Alzheimer's Disease: A Nested Case-Control Analysis," *CNS Drugs* 30:1111-1120 (2016).
Cordy et al., "Specificity of human anti-variable heavy (VH) chain autoantibodies and impact on the design and clinical testing of a VH domain antibody antagonist of tumor necrosis factor-α receptor 1," *Clin. Exp. Immunol.* 182:139-148 (2015).
Dong et al., "Essential protective role of tumor necrosis factor receptor 2 in neurodegeneration," *Proc. Natl. Acad. Sci. U.S.A.* 113(43):12304-12309 (2016).
Espirito Santo et al., "Selective inhibition of TNFR1 reduces osteoclast numbers and is differentiated from anti-TNF in a LPS-driven model of inflammatory bone loss," *Biochem. Biophys. Res. Commun.* 464:1145-1150 (2015).
Faustman et al., "TNF receptor 2 and disease: autoimmunity and regenerative medicine," *Front. Immunol.* 4:478 (2013), 8 pages.
Feldmann et al., "Trials of anti-tumour necrosis factor therapy for COVID-19 are urgently needed," *The Lancet* 395:1407-1409 (2020).
Fischer et al., "A TNF Receptor 2 Selective Agonist Rescues Human Neurons from Oxidative Stress-Induced Cell Death," *PLoS One.* 6(11):e27621 (2011), 11 pages.

Fischer et al., "Targeting sTNF/TNFR1 Signaling as a New Therapeutic Strategy," *Antibodies* 4:48-70 (2015).
Greco et al., "The novel S59P mutation in the TNFRSF1A gene identified in an adult onset TNF receptor associated periodic syndrome (TRAPS) constitutively activates NF-κB pathway," *Arthritis Research & Therapy.* 17:93 (2015), 15 pages.
Holland et al., "Autoantibodies to Variable Heavy (VH) Chain Ig Sequences in Humans Impact the Safety and Clinical Pharmacology of a VH Domain Antibody Antagonist of TNF-α Receptor 1," *J. Clin. Immunol.* 33(7):1192-1203 (2013).
Horiuchi et al., "Transmembrane TNF-α: structure, function and interaction with anti-TNF agents," *Rheumatology (Oxford)* 49:1215-1228 (2010).
Inoue et al., "Structural optimization of a TNFR1-selective antagonistic TNFα mutant to create new-modality TNF-regulating biologics," *J. Biol. Chem.* 295(28):9379-9391 (2020).
Kalliolias and Ivashkiv, "TNF biology, pathogenic mechanisms and emerging therapeutic strategies," *Nat. Rev. Rheumatol.* 12(1):49-62 (2016).
King et al. "Facile synthesis of maleimide bifunctional linkers," *Tetrahedron Letters* 43:1987-1990 (2002).
Kipriyanov, S.M., "Generation of Antibody Molecules Through Antibody Engineering," *Methods in Molecular Biology, vol. 207: Recombinant Antibodies for Cancer Therapy Methods and Protocols.* Chapter 1; pp. 3-25 (2003).
Kitagaki et al., "Novel TNF-α Receptor 1 Antagonist Treatment Attenuates Arterial Inflammation and Intimal Hyperplasia in Mice," *J. Atheroscler. Thromb.* 19(1):36-46 (2012).
Koczan et al., "Molecular discrimination of responders and nonresponders to anti-TNFalpha therapy in rheumatoid arthritis by etanercept," *Arthritis Research & Therapy* 10:R50 (2008), 10 pages.
Koninckx et al., "Anti-TNF-α treatment for deep endometriosis-associated pain: a randomized placebo-controlled trial," *Hum. Reprod.* 23(9):2017-2023 (2008).
Lang et al., "Binding Studies of TNF Receptor Superfamily (TNFRSF) Receptors on Intact Cells*," *J. Biol. Chem.* 291(10):5022-5037 (2016).
Li et al., "Targeting the Fc receptor in autoimmune disease," *Expert Opin. Ther. Targets.* 18(3):335-350 (2014).
Lis et al., "Tumor necrosis factor inhibitors—state of knowledge," *Arch. Med. Sci.* 10(6):1175-1185 (2014).
Lo et al., "Noncompetitive inhibitors of TNFR1 probe conformational activation states," *Sci. Signal.* 12(592):eaav5637 (2019), 14 pages.
Loetscher et al., "Human Tumor Necrosis Factor α (TNFα) Mutants with Exclusive Specificity for the 55-kDa or 75-kDa TNF Receptors," *J. Biol. Chem.* 268(35):26350-26357 (1993).
Malaviya et al., "Anti-TNFα Therapy in Inflammatory Lung Diseases," *Pharmacol. Ther.* 180:90- 98 (2017).
McCann et al., "Selective Tumor Necrosis Factor Receptor I Blockade Is Antiinflammatory and Reveals Immunoregulatory Role of Tumor Necrosis Factor Receptor II in Collagen-Induced Arthritis," *Arthritis & Rheumatology* 66(10):2728-2738 (2014).
Merlot et al., "Unraveling the mysteries of serum albumin-more than just a serum protein," *Front. Physiol.* 5:299 (2014), 7 pages.
Morton et al., "TNFR1 membrane reorganization promotes distinct modes of TNFα signaling," *Sci. Signal.* 12(592):caaw2418 (2019), 34 pages.
Mueller, "Tumour necrosis factor in mouse models of chronic intestinal inflammation," *Immunology* 105(1):1-8 (2002).
Richter et al., "Improved monovalent TNF receptor 1-selective inhibitor with novel heterodimerizing Fc," *mAbs* 11(4):653-665 (2019).
Richter et al., "Monovalent TNF receptor 1-selective antibody with improved affinity and neutralizing activity," *mAbs* 11(1):166-177 (2019).
Richter, F. Thesis, entitled "Evolution of the Antagonistic Tumor Necrosis Factor Receptor One-Specific Antibody ATROSAB," Universität Stuttgart, 2015, 161 pages.
Richter et al., "Antagonistic TNF Receptor One-Specific Antibody (ATROSAB): Receptor Binding and In Vitro Bioactivity," *PLoS One.* 8(8):e72156 (2013), 13 pages.

(56) References Cited

OTHER PUBLICATIONS

Schmøkel et al., "Site-selective conjugation of an anticoagulant aptamer to recombinant albumins and maintenance of neonatal Fc receptor binding," *Nanotechnology* 28(20):204004 (2017), 9 pages.

Steeland et al., "Generation and Characterization of Small Single Domain Antibodies Inhibiting Human Tumor Necrosis Factor Receptor 1," *J. Biol. Chem.* 290(7):4022-4037 (2015).

Strohl, W. R., "Fusion Proteins for Half-Life Extension of Biologics as a Strategy to Make Biobetters," *BioDrugs* 29(4):215-239 (2015).

Torrey et al., "Targeted killing of TNFR2-expressing tumor cells and Tregs by TNFR2 antagonistic antibodies in advanced Sezary syndrome," *Leukemia* 33:1206-1218 (2019).

Tortarolo et al., "Lack of TNF-alpha receptor type 2 protects motor neurons in a cellular model of amyotrophic lateral sclerosis and in mutant SOD1 mice but does not affect disease progression," *J. Neurochem.* 135:109-124 (2015).

Tseng et al., "TNF receptor 2 signaling prevents DNA methylation at the Foxp3 promoter and prevents pathogenic conversion of regulatory T cells," *Proc. Natl. Acad. Sci. U.S.A.* 116:21666-21672 (2019).

Udalova et al., "Anti-TNF Therapy," Microbiol. Spectrum 4(4):MCHD-0022-2015 (2016), 11 pages.

University of Stuttgart News, "Proof of therapeutic activity of selective TNFR targeting in an in vivo model of acute neurodegeneration," Published Oct. 27, 2016 [online], Retrieved from <URL:uni-stuttgart.de/en/university/news/all/Proof_of_therapeutic_activity_of_selective_TNFR_targeting_in_an_in_vivo_model_of_acute_neurodegeneration-00003/ on Jan. 12, 2022, 2 pages.

Wuellner et al., "Expanding the concept of chemically programmable antibodies to RNA aptamers: chemically programmed biotherapeutics," *Angew. Chem. Int. Ed. Egl.* 49(34):5934-5937 (2010).

Yang et al., "Clinical significance of tumor necrosis factor receptor 2 in middle and lower thoracic esophageal squamous cell carcinoma," *Oncol. Lett.* 16(3):2971-2978 (2018).

Yang et al., "Clinical implications of tumor necrosis factor receptor 2 in breast cancer," *Oncol. Lett.* 14(2):2393-2398 (2017).

Yang et al., "Role of TNF-TNF Receptor 2 Signal in Regulatory T Cells and Its Therapeutic Implications," *Front. Immunol.* 9:784 (2018), 11 pages.

Zhang et al., "Expression of tumor necrosis factor receptor 2 in human non-small cell lung cancer and its role as a potential prognostic biomarker," *Thorac. Cancer.* 10(3):437-444 (2019).

Extended Examiner's Search report, dated Jan. 5, 2023, in connection with European Patent Application No. 20 758 513.4, 11 pages.

\* cited by examiner

The common strategies in the chemical modifications of nucleic acid aptamers and their purposes

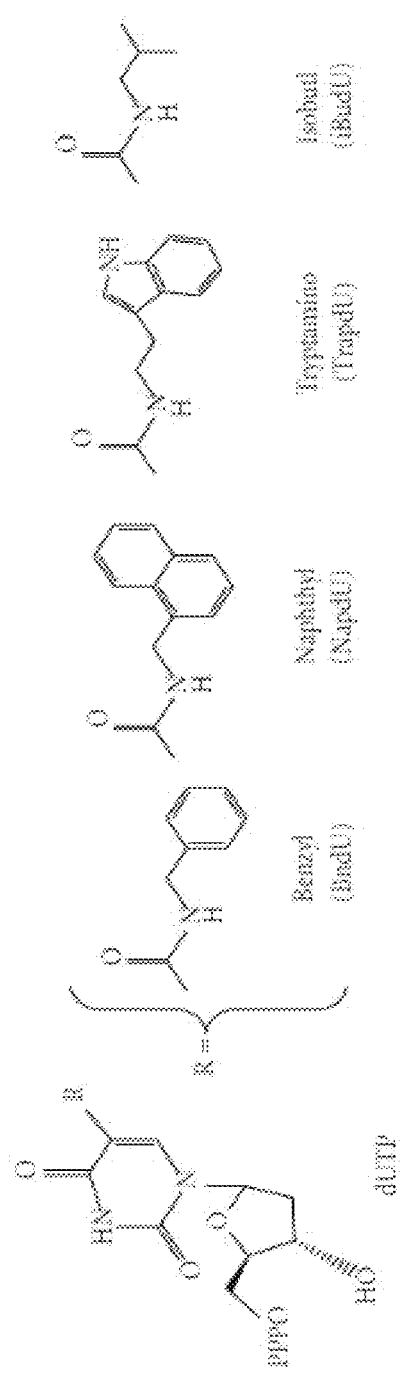
Fig. 1C(ii)

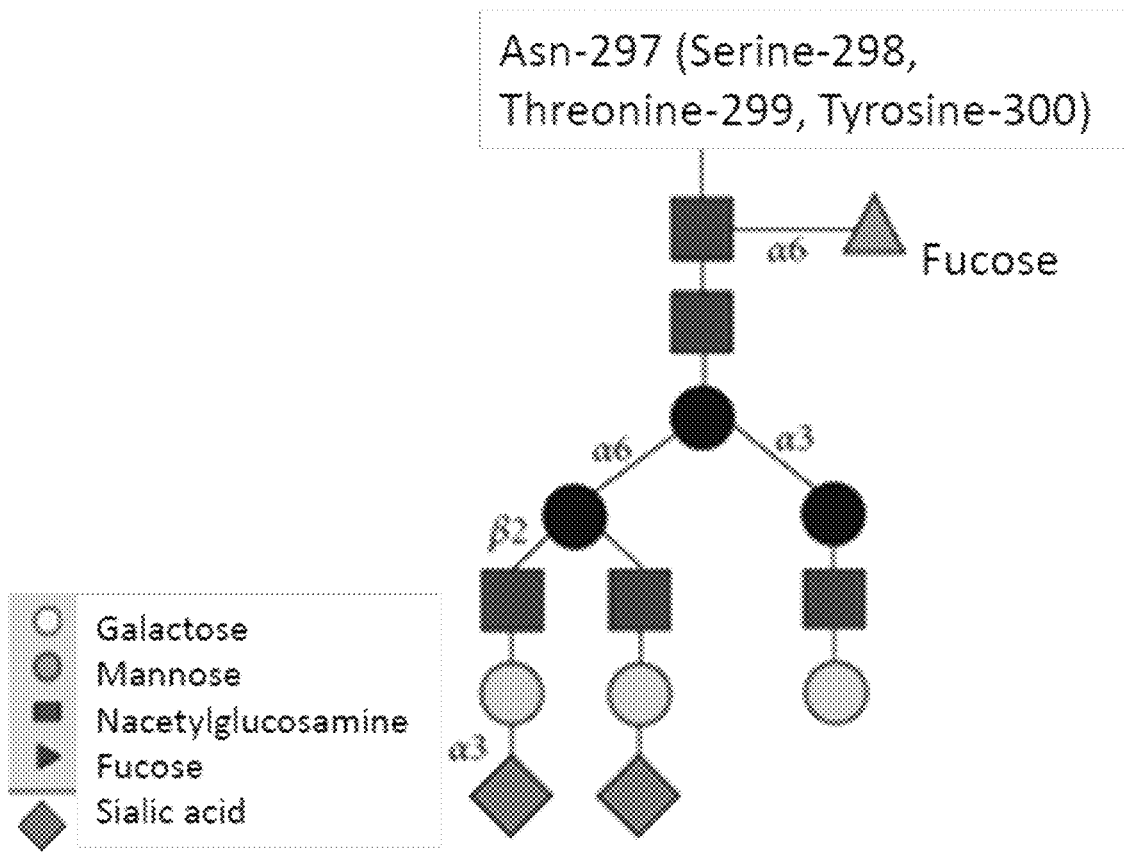
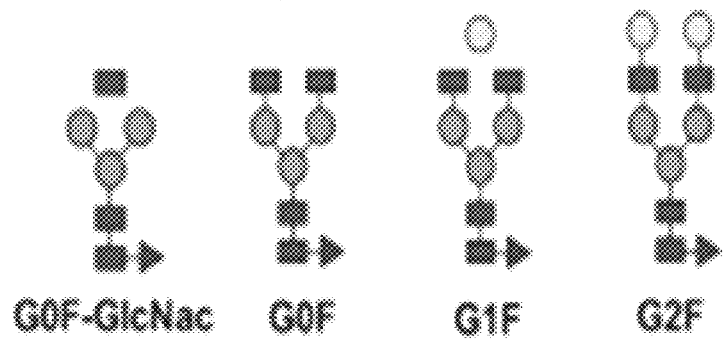
Fig. 2C

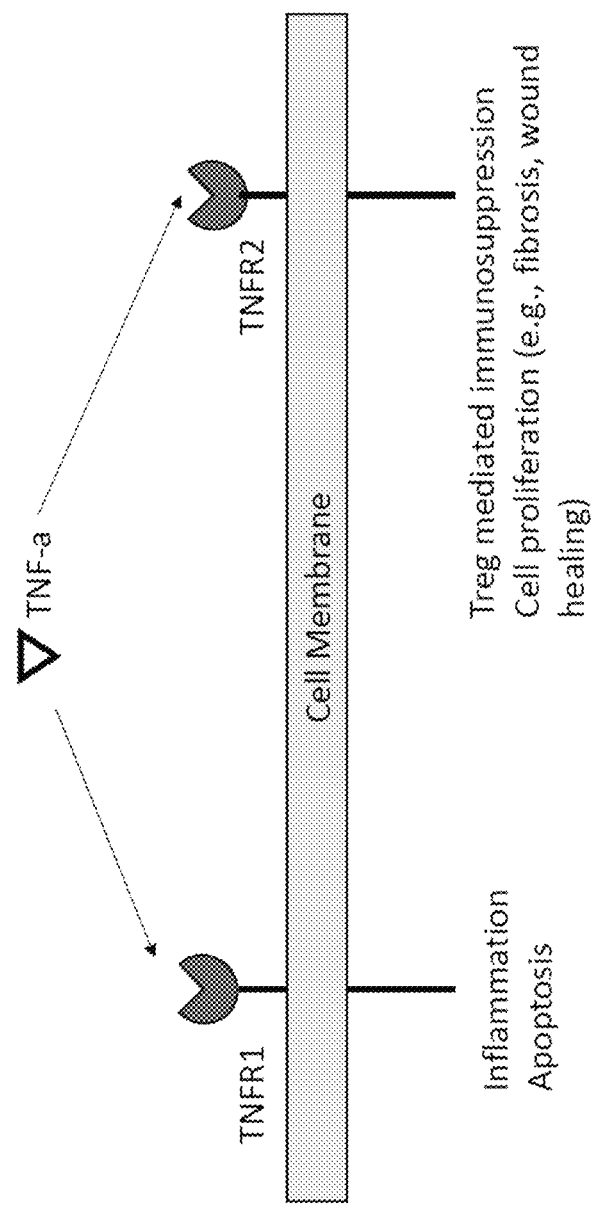

Fig. 11

```
          10         20         30         40         50
     MGLPTVPGLL LSLVLLALLM GIHPSGVTGL VPSLGDREKR DSLCPQGKYV
          60         70         80         90        100
     HSKNNSICCT KCHKGTYLVS DCPSPGRDTV CRECEKGTFT ASQNYLRQCL
         110        120        130        140        150
     SCKTCRKEMS QVEISPCQAD KDTVCGCKEN QFQRYLSETH FQCVDCSPCF
         160        170        180        190        200
     NGTVTIPCKE TQNTVCNCHA GFFLRESECV PCSHCKKNEE CMKLCLPPPL
         210        220        230        240        250
     ANVTNPQDSG TAVLLPLVIL LGLCLLSFIF ISLMCRYPRW RPEVYSIICR
         260        270        280        290        300
     DPVPVKEEKA GKPLTPAPSP AFSPTSGFNP TLGFSTPGFS SPVSSTPISP
         310        320        330        340        350
     IFGPSNWHFM PPVSEVVPTQ GADPLLYESL CSVPAPTSVQ KWEDSAHPQR
         360        370        380        390        400
     PDNADLAILY AVVDGVPPAR WKEFMRFMGL SEHEIERLEM QNGRCLREAQ
         410        420        430        440        450
     YSMLEAWRRR TPRHEDTLEV VGLVLSKMNL AGCLENILEA LRNPAPSSTT

RLPR
```

Fig. 12

SELEX analysis

SEQUENCE LISTING

```
<160> NUMBER OF SEQ ID NOS: 2

<210> SEQ ID NO 1
<211> LENGTH: 207
<212> TYPE: PRT
<213> ORGANISM: Homo sapiens

<400> SEQUENCE: 1

Met Gln Ser Gly Thr His Trp Arg Val Leu Gly Leu Cys Leu Leu Ser
1               5                   10                  15

Val Gly Val Trp Gly Gln Asp Gly Asn Glu Glu Met Gly Gly Ile Thr
            20                  25                  30

Gln Thr Pro Tyr Lys Val Ser Ile Ser Gly Thr Thr Val Ile Leu Thr
        35                  40                  45

Cys Pro Gln Tyr Pro Gly Ser Glu Ile Leu Trp Gln His Asn Asp Lys
    50                  55                  60

Asn Ile Gly Gly Asp Glu Asp Asp Lys Asn Ile Gly Ser Asp Glu Asp
65                  70                  75                  80

His Leu Ser Leu Lys Glu Phe Ser Glu Leu Glu Gln Ser Gly Tyr Tyr
                85                  90                  95

Val Cys Tyr Pro Arg Gly Ser Lys Pro Glu Asp Ala Asn Phe Tyr Leu
            100                 105                 110

Tyr Leu Arg Ala Arg Val Cys Glu Asn Cys Met Glu Met Asp Val Met
        115                 120                 125

Ser Val Ala Thr Ile Val Ile Val Asp Ile Cys Ile Thr Gly Gly Leu
    130                 135                 140

Leu Leu Leu Val Tyr Tyr Trp Ser Lys Asn Arg Lys Ala Lys Ala Lys
145                 150                 155                 160

Pro Val Thr Arg Gly Ala Gly Ala Gly Gly Arg Gln Arg Gly Gln Asn
                165                 170                 175

Lys Glu Arg Pro Pro Pro Val Pro Asn Pro Asp Tyr Glu Pro Ile Arg
            180                 185                 190

Lys Gly Gln Arg Asp Leu Tyr Ser Gly Leu Asn Gln Arg Arg Ile
        195                 200                 205

<210> SEQ ID NO 2
<211> LENGTH: 454
<212> TYPE: PRT
<213> ORGANISM: Artificial Sequence
<220> FEATURE:
<223> OTHER INFORMATION: TNFRSF1a/TNFR1
<220> FEATURE:
<221> NAME/KEY: misc_feature
<222> LOCATION: (43)...(82)
<223> OTHER INFORMATION: CRD1
```

<400> SEQUENCE: 2

| | | | | | | | | | | | | | | |
|---|---|---|---|---|---|---|---|---|---|---|---|---|---|---|
|Met|Gly|Leu|Pro|Thr|Val|Pro|Gly|Leu|Leu|Ser|Leu|Val|Leu|Leu|
|1| | | |5| | | | |10| | | | |15|
|Ala|Leu|Leu|Met|Gly|Ile|His|Pro|Ser|Gly|Val|Thr|Gly|Leu|Val|Pro|
| | | |20| | | | |25| | | | |30| | |
|Ser|Leu|Gly|Asp|Arg|Glu|Lys|Arg|Asp|Ser|Leu|Cys|Pro|Gln|Gly|Lys|
| | | |35| | | | |40| | | | |45| | |
|Tyr|Val|His|Ser|Lys|Asn|Asn|Ser|Ile|Cys|Cys|Thr|Lys|Cys|His|Lys|
| | |50| | | | |55| | | | |60| | | |
|Gly|Thr|Tyr|Leu|Val|Ser|Asp|Cys|Pro|Ser|Pro|Gly|Arg|Asp|Thr|Val|
|65| | | | |70| | | | |75| | | | |80|
|Cys|Arg|Glu|Cys|Glu|Lys|Gly|Thr|Phe|Thr|Ala|Ser|Gln|Asn|Tyr|Leu|
| | | | |85| | | | |90| | | | |95| |
|Arg|Gln|Cys|Leu|Ser|Cys|Lys|Thr|Cys|Arg|Lys|Glu|Met|Ser|Gln|Val|
| | | |100| | | | |105| | | | |110| | |
|Glu|Ile|Ser|Pro|Cys|Gln|Ala|Asp|Lys|Asp|Thr|Val|Cys|Gly|Cys|Lys|
| | | |115| | | | |120| | | | |125| | |
|Glu|Asn|Gln|Phe|Gln|Arg|Tyr|Leu|Ser|Glu|Thr|His|Phe|Gln|Cys|Val|
| |130| | | | |135| | | | |140| | | | |
|Asp|Cys|Ser|Pro|Cys|Phe|Asn|Gly|Thr|Val|Thr|Ile|Pro|Cys|Lys|Glu|
|145| | | | |150| | | | |155| | | | |160|
|Thr|Gln|Asn|Thr|Val|Cys|Asn|Cys|His|Ala|Gly|Phe|Phe|Leu|Arg|Glu|
| | | | |165| | | | |170| | | | |175| |
|Ser|Glu|Cys|Val|Pro|Cys|Ser|His|Cys|Lys|Lys|Asn|Glu|Glu|Cys|Met|
| | | |180| | | | |185| | | | |190| | |
|Lys|Leu|Cys|Leu|Pro|Pro|Leu|Ala|Asn|Val|Thr|Asn|Pro|Gln|Asp|
| | | |195| | | | |200| | | | |205| | |
|Ser|Gly|Thr|Ala|Val|Leu|Leu|Pro|Leu|Val|Ile|Leu|Leu|Gly|Leu|Cys|
| | | |210| | | | |215| | | | |220| | |
|Leu|Leu|Ser|Phe|Ile|Phe|Ile|Ser|Leu|Met|Cys|Arg|Tyr|Pro|Arg|Trp|
|225| | | | |230| | | | |235| | | | |240|
|Arg|Pro|Glu|Val|Tyr|Ser|Ile|Ile|Cys|Arg|Asp|Pro|Val|Pro|Val|Lys|
| | | | |245| | | | |250| | | | |255| |
|Glu|Glu|Lys|Ala|Gly|Lys|Pro|Leu|Thr|Pro|Ala|Pro|Ser|Pro|Ala|Phe|
| | | |260| | | | |265| | | | |270| | |
|Ser|Pro|Thr|Ser|Gly|Phe|Asn|Pro|Thr|Leu|Gly|Phe|Ser|Thr|Pro|Gly|
| | |275| | | | |280| | | | |285| | | |
|Phe|Ser|Ser|Pro|Val|Ser|Ser|Thr|Pro|Ile|Ser|Pro|Ile|Phe|Gly|Pro|
| |290| | | | |295| | | | |300| | | | |
|Ser|Asn|Trp|His|Phe|Met|Pro|Pro|Val|Ser|Glu|Val|Val|Pro|Thr|Gln|
|305| | | | |310| | | | |315| | | | |320|
|Gly|Ala|Asp|Pro|Leu|Leu|Tyr|Glu|Ser|Leu|Cys|Ser|Val|Pro|Ala|Pro|
| | | |325| | | | |330| | | | |335| | |
|Thr|Ser|Val|Gln|Lys|Trp|Glu|Asp|Ser|Ala|His|Pro|Gln|Arg|Pro|Asp|
| | | |340| | | | |345| | | | |350| | |
|Asn|Ala|Asp|Leu|Ala|Ile|Leu|Tyr|Ala|Val|Val|Asp|Gly|Val|Pro|Pro|
| | | |355| | | | |360| | | | |365| | |
|Ala|Arg|Trp|Lys|Glu|Phe|Met|Arg|Phe|Met|Gly|Leu|Ser|Glu|His|Glu|
| | | |370| | | | |375| | | | |380| | |
|Ile|Glu|Arg|Leu|Glu|Met|Gln|Asn|Gly|Arg|Cys|Leu|Arg|Glu|Ala|Gln|
|385| | | | |390| | | | |395| | | | |400|
|Tyr|Ser|Met|Leu|Glu|Ala|Trp|Arg|Arg|Arg|Thr|Pro|Arg|His|Glu|Asp|

-continued

```
                405                 410                 415
Thr Leu Glu Val Val Gly Leu Val Leu Ser Lys Met Asn Leu Ala Gly
            420                 425                 430

Cys Leu Glu Asn Ile Leu Glu Ala Leu Arg Asn Pro Ala Pro Ser Ser
            435                 440                 445

Thr Thr Arg Leu Pro Arg
    450
```

ANTIBODIES AND ENONOMERS

This application is a U.S. National Stage Application of International Application No. PCT/US2020/018739, filed on Feb. 19, 2020, which claims the benefit of U.S. Provisional Application No. 62/808,635, filed Feb. 21, 2019, the contents of which are hereby incorporated by reference in their entirety.

REFERENCE TO SEQUENCE LISTING

This application incorporates-by-reference nucleotide sequences which are present in the file named "200219_90676-PCT_Sequence_Listing_AAH.txt", which is 3 kilobytes in size, and which was created on Feb. 18, 2020 in the IBM-PC machine format, having an operating system compatibility with MS-Windows, which is contained in the text file filed herewith as part of this application. A substitute Sequence Listing is filed electronically herewith, the contents of which are incorporated by reference in their entirety. The electronic file was created on Aug. 18, 2021, is 6 kilobytes in size, and is titled 5303SEQUS01.txt.

Throughout this application various publications are referenced, most typically by the last name of the first author and the year of publication. Full citations for these publications are set forth in a section entitled "References" immediately preceding the claims. The disclosures of all referenced publications in their entireties are hereby incorporated by reference into this application in order to more fully describe the state of the art to which the invention relates.

BACKGROUND OF THE INVENTION

Inflammatory and autoimmune diseases have many properties similar to malignancies, and inflammation has long been a suspect in the pathogenesis of malignancy (Marquardt 1947). At the epidemiological level (population medicine), inflammation associated with chronic infection or repeated wounding has been shown to be a precursor for numerous malignancies (Tran 2017; Pulusu 2017; Nieto 2016; Fouad 2014; and Trinchieri 2011). The inflammatory cascade includes generation of free radicals (which cause genomic mutations), activation of kinase pathways (which accelerate cell proliferation) and transcription factors (like c-Myc which contribute to drug resistance), and dysregulated production of cytokines and inflammatory enzymes, all of which are shared by malignancy (Abdel-Latif 2009).

Cancer remains one of the leading causes of death in the United States and the world. In 2016, there were 600,920 cancer-related deaths in the United States, and some cancers (eg. gastric, pancreatic, liver, lung cancer) cause death within months of diagnosis (American Cancer Society, 2017).

In some cases, surgery removes the diseased tissue; radiotherapy shrinks solid tumors; and chemotherapy kills rapidly dividing cells. Chemotherapy results in numerous side effects. In some cases the severity of these side effects limits the dosage that can be administered and thus precludes the use of potentially effective drugs. Moreover, cancers often develop resistance to chemotherapeutic drugs. The treatment of early stage or benign tumors would be desirable for preventing progression to a malignant or metastatic state, but cancer is rarely discovered at an early stage, apart from skin cancers (Trinchieri 2011).

For most patients newly diagnosed with operable cancer, the standard treatment is surgery followed by chemotherapy. Such treatment aims at removing as much primary and metastatic disease tissue and cells as possible in order to prevent recurrence and improve survival. Indeed, most of these patients have no macroscopic evidence of residual tumor after surgery. Sometimes neoadjuvant therapy is employed to reduce the tumor size and make successful surgery more likely. This aspect is discussed further below. In any case, many patients later develop recurrence and eventually die of their disease. This occurs because a small number of viable tumor cells metastasize prior to the surgery or escape the surgery and were undetected after the surgery due to the limitation of current detection techniques.

Therefore, postoperative adjuvant treatments are still the cornerstone of treatment of patients following surgery to eliminate these residual micrometastatic cancer cells. Also, because in most cases of disease, especially brain cancer and metastatic ovarian cancer, the surgeon will not be able to remove the tumor tissue with 'clean' margins. Over the past several decades, there have been incremental improvements in adjuvant chemotherapy. Because the remaining cancer cells are likely resistant to treatment, new methods need to be developed that can potently kill systemically dispersed/metastatic and treatment-resistant cancer cells. Of necessity, a successful treatment for these sorts of tumors will need to operate by a distinct mechanism from which tumor cells are unlikely to escape.

Neoadjuvant therapy, an adjunctive therapy given before the main definitive surgery, has emerged as another important part of cancer therapy. There are several advantages to giving neoadjuvant treatment prior to a definitive surgery. First, it may help to improve patient's performance status prior to surgery, due to the reduction of tumor volume, ascites and pleural effusion. Second, the reduction of tumor volume may allow a less extensive surgery hence preserving patient's organ and function thereof. Also, reduction of tumor volume may enable surgery of otherwise inoperable tumors. Lastly, neoadjuvant therapy may improve the chance of completely removing tumor by surgery, thereby improving patient survival. This has been shown in several malignancies (Ancona 1997). Recently, combinations of monoclonal antibodies have shown a tremendous neoadjuvant effect in HER2-positive breast cancer, although the long-term benefits are unclear (Gianni 2016).

As explained above, one major limitation associated with chemotherapy of any kind is the significant toxicity. In the chronic phase of cancer chemotherapy, in a patient in which the whole tumor has not been completely removed, regrowth is inevitable, leading to relapse. As this likely occurs more than once, with patients likely receiving ever more toxic therapies after each relapse, the overall quality of life rapidly deteriorates. There are not many options for cancer patients who have relapsed after neoadjuvant treatment, surgery and follow-up chemotherapy, for example, in esophageal cancer (Steffen 2019). However, when cancers re-occur the outcome is usually grim.

The overexpression of HER2 has been found in about 20-30% of breast cancers, which is classified as the HER2-positive subtype (Vu 2012). Breast cancer characterized as HER2-positive responds to trastuzumab plus chemotherapy, or trastuzumab and pertuzumab plus chemotherapy, in only about 50% of HER2-positive patients (Figueroa-Magalhães 2014). There are multiple mechanisms that contribute to innate and acquired resistance to HER2-inhibitors. These mechanisms usually increase expression of other receptors or oncogenic mutations in growth signaling pathways (Black 2015; Ebbing 2016; Chaganty 2018; Arribas 2011). In addition to the two anti-HER2 modalities listed above, the antibody drug conjugate ado-trastuzumab is also an anti-HER2 modality (Lewis Phillips 2008). Ado-trastuzumab benefits patients who have progressed after trastuzumab plus chemotherapy. However, the effect is largely transient because of increased expression of the multiple drug resistance-1 gene and downregulation of HER2 expression (Li 2018). Because 20% of patients afflicted with breast cancer are HER2-positive, and since anti-HER2 therapies only induce a significant response in about 50% of these patients, combined with the high relapse rate following anti-HER2 therapy, it is very clear that new approaches are needed that are independent of the known resistance mechanisms. Other monoclonal antibody-based therapies also target receptors (e.g., EGFR, VEGFR, PD1, CD52). Recently, it has been shown that follicle stimulating hormone receptor (FSHR) is overexpressed on ovarian cancer and its associated vasculature. A phenomenon called 're-expression' since it was expressed at earlier stages of development, but not in the adult (Ghinea 2018). Recently an engineered T cell (CAR-T) was prepared against the FSHR, and useful preclinical data was obtained (Perales-Puchalt 2017). In addition, CAR-T cells have not been useful in treating solid tumors, like ovarian cancer, or other cancers which overexpress the FSHR (Castellarin 2018). A better approach to FSHR as a disease target needs to be developed.

SUMMARY OF THE INVENTION

The subject invention provides a composition comprising an enonomer, which comprises a) a carrier molecule, and b) at least one aptamer, wherein the carrier molecule is an antibody, an antigen-binding moiety, a serum protein, an intracellular protein, a messenger RNA (mRNA) or human serum albumin.

The subject invention provides a composition comprising an enonomer, which comprises a) a carrier molecule, and b) at least one aptamer, wherein the carrier molecule is an antibody, an antigen-binding moiety, a serum protein, an intracellular protein, a messenger RNA (mRNA) or human serum albumin and the half-life of the enonomer is equal to or greater than 10 hours.

The invention described herein utilizes aptamers in a new targeting modality called enonomers. Preferably, an enonomer of the present invention is a chemical entity comprising an aptamer conjugated in a very specific way to a protein, called a carrier protein. Carrier proteins can be any of many blood-derived proteins with a long half-life. Examples of carrier proteins are human or humanized antibodies, human serum albumin, albumin-binding peptides, and small molecules such as cholesterol, all of which can be used to enhance serum half-life of candidate therapeutics. While the aptamer component can be peptide-based or nucleic acid-based, the aptamers of this invention are preferably nucleic acid-based. Aptamers are a way to bring various cellular components together, including delivery of toxins, or immune cells (as in CD3+ T cells and tumor cells).

Disclosed herein are methods of treating inflammatory and malignant diseases. Such diseases have mechanisms in common. For instance, both cancer and chronic inflammation are characterized by increased expression of disease pathways, including pathways mediated by cytokine and growth factor receptors. An example is the activation of NF-kappaB in inflammation and cancer (Wang 2009). Cytokine and growth factor receptors initiate signaling mediated by their cognate ligands. In most cases, these receptors must form multimers (dimers, trimers, or clusters) to initiate signaling. Thus, means of preventing or disrupting these receptor multimers can be used to prevent acquisition of the inflammatory or malignant phenotype; or to treat the disease. Often, disease receptors are highly expressed on the diseased cell and can be preferentially targeted because of their high expression and location on the outside of a cell. Furthermore, hypermultimerization (clustering) of receptors due to overexpression or mutation can lead to signal transduction independent of ligand binding. It is the objective of this invention to prevent, disrupt, or specifically stimulate receptor signaling, and to take advantage of the overexpression of some disease receptors to specifically and artificially target the immune system to kill diseased cells.

It is another aim of this invention to demonstrate that aptamers have the ability to overcome drug resistance, especially to overcome resistance of HER2 positive cancers to trastuzumab, pertuzumab, ado-trastuzumab or their biosimilars. It is a further aim of this invention to take advantage of the overexpression of follicle stimulating hormone receptor (FSHR) in ovarian cancer, or other diseases characterized by the overexpression of the FSHR.

BRIEF DESCRIPTION OF THE FIGURES

FIG. 1C: Modifications of Deoxyribonucleotides that contribute to increased functional diversity of aptamers, nuclease resistance, and increased serum residence time.

SOMAmers are the most commonly used approach to creating aptamers with much greater shape flexibility than natural A,G,T,C. Examples of alterations are:

LNA—Locked nucleic acid involves crosslinking of the sugar residue such that the associated base is presented to its complement more efficiently, resulting in stronger hydrogen bonds between the nucleic acid bases.

UNA—Allows more flexibility within the nucleotide such that there is more tolerance for mis-matches.

2'-F ANA—Base pairing ambiguity and resistance to nucleases.

Changes that minimize renal clearance and resistance to nucleases can also be made. Double substitution is shown by FIG. 1D.

Figure 1A:
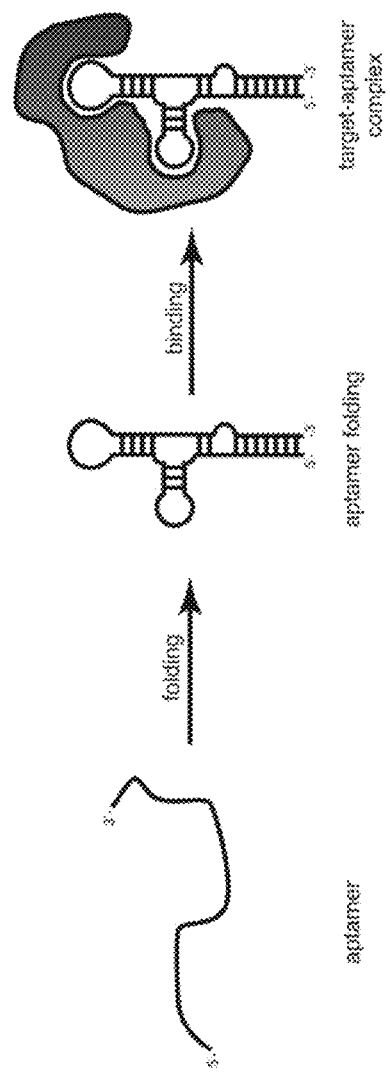
FIGS. 1A and 1B: Selection of aptamers for therapy of drug resistant disease: Schematic representation of aptamer binding to a target protein depending on structural complementarity. After the adjustment of the binding conditions, the aptamer folds into a 3D structure, upon which it interacts with the target molecule (e.g., a polypeptide, nucleic acid, carbohydrate or a small molecule), resulting in a stable target-aptamer complex (Wolter 2017). Aptamers are shown as thin dashed lines in FIG. 1B. At the 5' and 3' ends of each aptamer are different constant normal DNA sequences that can be used for DNA amplification by the appropriate polymerase, which is carried out on aptamers eluted at the most stringent elution conditions. A review of this methodology may be found at Wikipedia, "Systematic evolution of ligands by exponential enrichment," 2019.
Figure 1B:
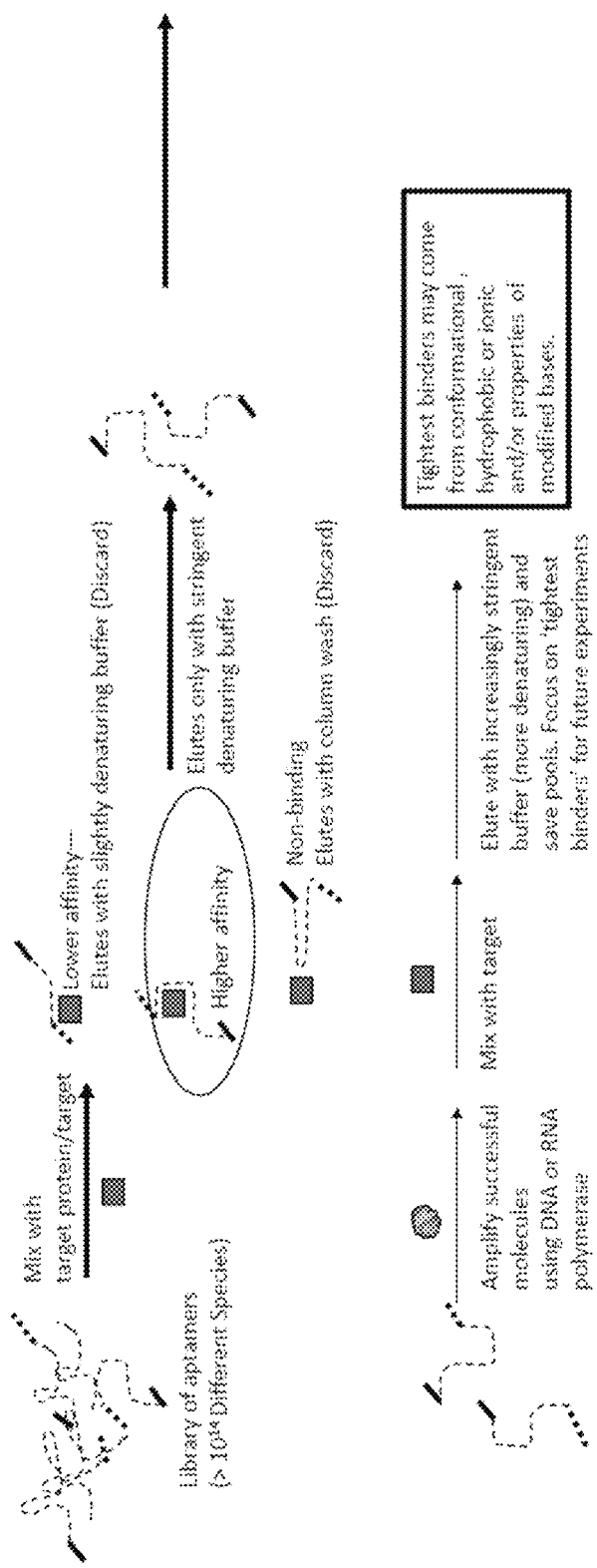
Figure 1C:
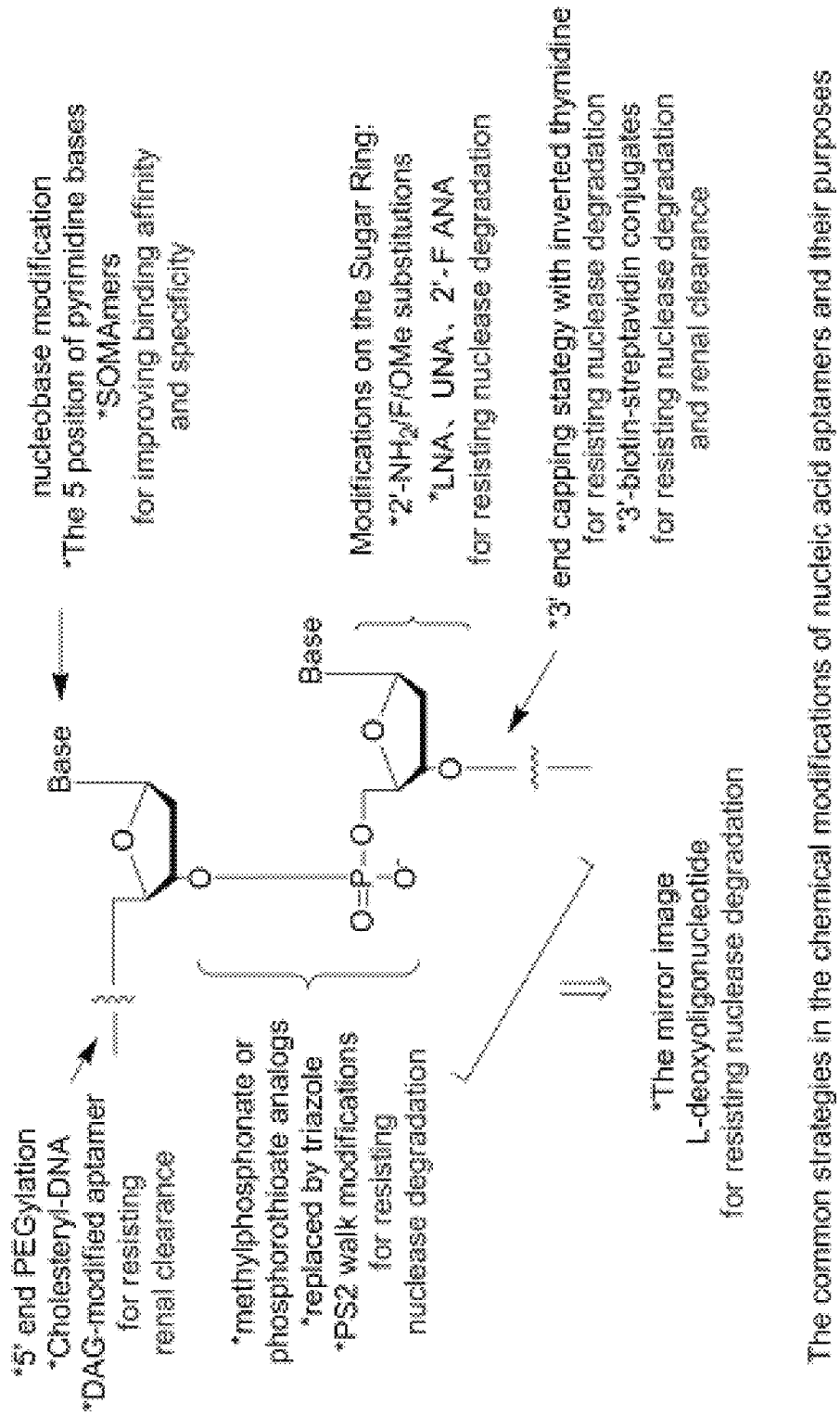
FIGS. 1C and 1D: Interactions with the target are a result of the aptamer sequence and also the substituted nucleotide side chains.
Figure 1D:
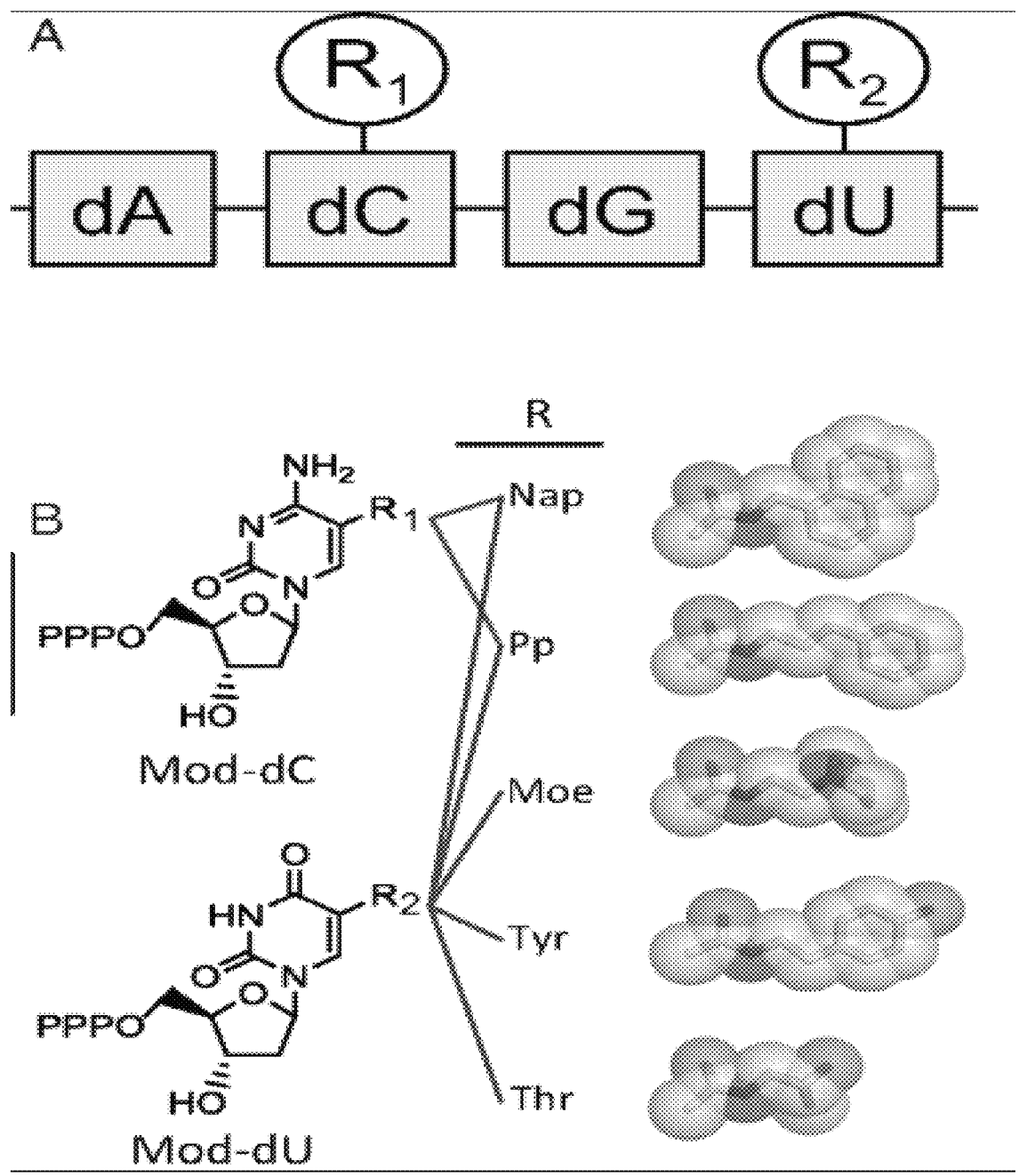

FIG. 1D: Examples of aptamer conformational changes resulting from modified bases. R denotes a chemical alteration of deoxycytidine (R1) and deoxyuridine (R2). These changes result in changes to the surface of aptamers which increases their shape and/or diversity (Gawande 2017). Abbreviations used in this figure: Chemical structures of modified-dC (mod-dC) and modified-dU (mod-dU) triphosphates bearing a 5-(N-substituted-carboxamide) functional group, $R_1$ and $R_2$, respectively, and space-filling models of R groups as follows: Nap, 5-[N-(1-naphthylmethyl)carboxamide]-2'-deoxy; Pp, 5-[N-(phenyl-3-propyl)carboxamide]-2'-deoxy; Moe, 5-[N-(1-morpholino-2-ethyl)carboxamide]-2'-deoxy; Tyr, 5-[N-(4-hydroxyphenyl-2-ethyl) carboxamide]-2'-deoxy; and Thr, 5-[N-(S-2-hydroxypropyl) carboxamide]-2'-deoxy.

Figure 2A:
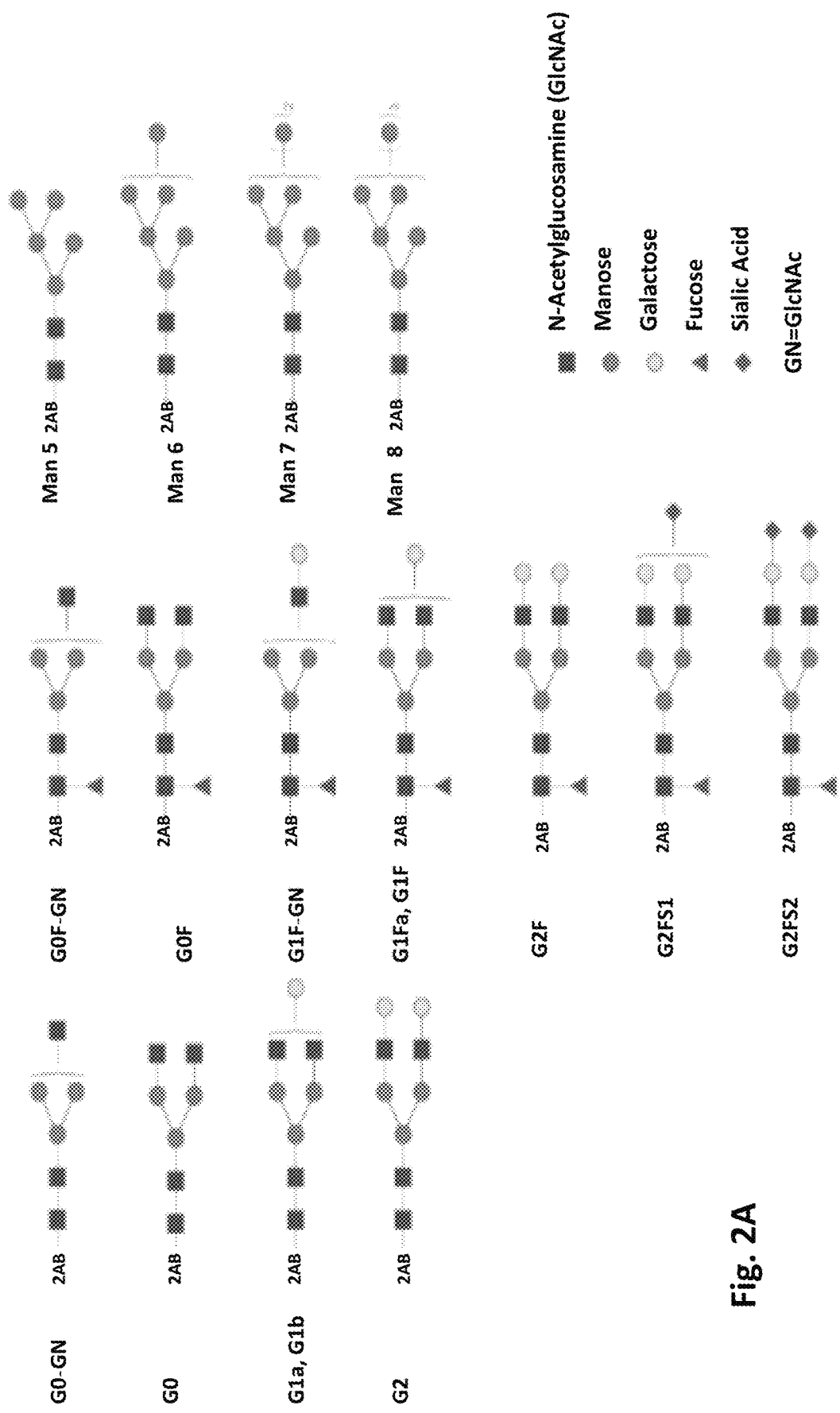
Figure 2B:
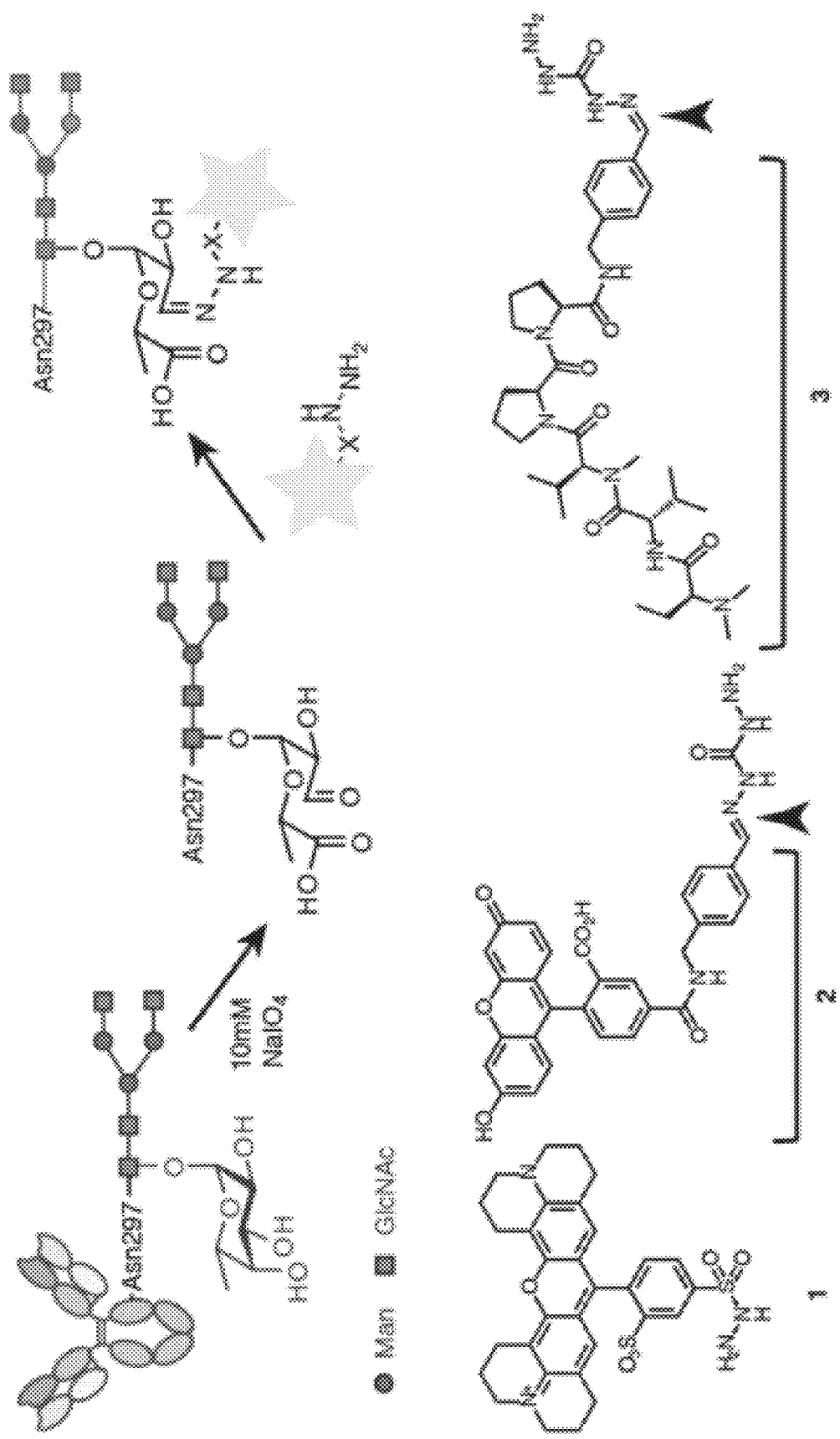

FIGS. 2A, 2B and 2C: The glycans associated with aa297/300 (Asparagine) of trastuzumab. When fucose (represented by triangles) is present in the glycan, it is present only once on each chain of the antibody (in the hinge region). This means it is possible, using fucose-directed chemistry (FIG. 2B) to create a largely homogeneous product (1 adduct per heavy chain, 2 adducts per antibody). Furthermore, fucose-containing polysaccharide is the most abundant species attached to the core N-acetylglucosamine (attached to the asparagine at aa297/300). Species containing fucose comprise >88% of the glycan chains of trastuzumab (FIG. 2C) (Dhanasekharan 2018; Sanchez-De Melo 2015; and Yu 2010). The enonomer in this case is trastuzumab coupled through fucose to a single branched or multibranched polyethylene glycol (PEG), conjugated to the 5' end of an anti-CD3 aptamer to provide the bispecific activity (FIG. 2C). FIG. 2B (top) Schematic representation of the strategy for fucose-specific conjugation of hydrazide-derivatives to a monoclonal antibody. Circles represent mannose and squares represent N-acetyl-D-glucosamine. FIG. 2B (bottom) Structures of hydrazide-derivatives. A Texas Red based hydrazide (labeled 1), fluorescein (labeled 2) and an aldehyde dolastatin analogue (labeled 3) carrying a carbohydrazide moiety were used in this study. Arrow heads indicate a cleavable hydrazone bond. Reagents and specific protocols are available commercially, for example from Iris Biotech GmbH (Marktredwitz, Germany).

FIG. 2C: Most common glycoform found at aa297/300 of trastuzumab (top); Structures of fucose-containing glycoforms in trastuzumab, or other IgG1, including IgG1 present in IV IgG (bottom).

Figure 3:
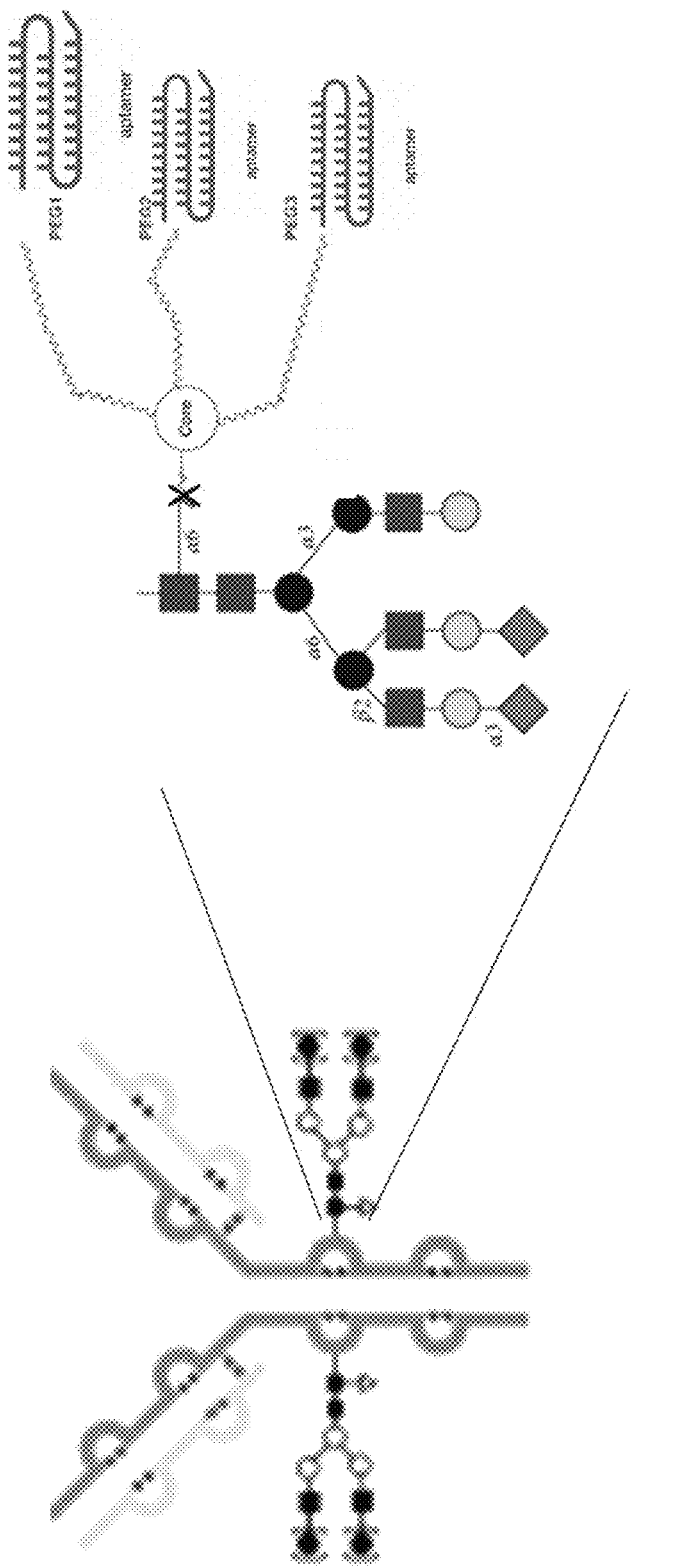

FIG. 3: Structure of a trastuzumab enomomer. The antibody in this structure is a fucose-containing trastuzumab. One of the fucose-containing glycoforms is reacted via fucose chemistry to a bispecific branched PEG, subsequently the bispecific PEG is then reacted with anti-CD3 aptamer. The serum half-life in mice is expected to be at least 10H and preferably 24H.

Figure 4:
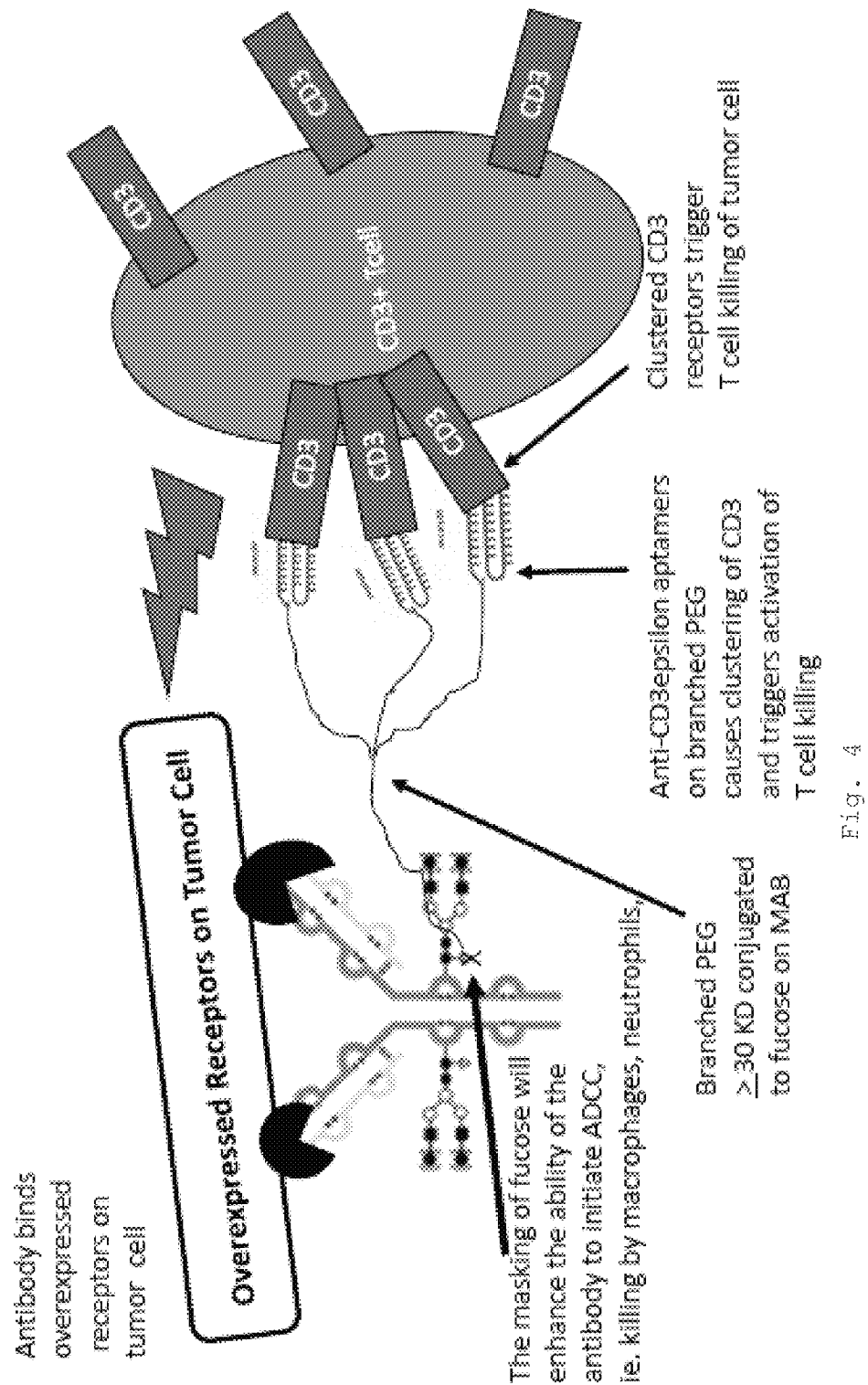

FIG. 4: Cells bound to an enonomer and masking of the fucose residue will enable enhanced antibody-dependent cellular cytotoxicity.

FIG. 5: Specific Antagonists/Agonists of TNFR1 and TNFR2. Current TNF blockers inhibit signaling by both TNFR1 and TNFR2. To solve this problem a specific antagonist of TNFR1 is created that will retain anti-inflammatory activity, while retaining additional anti-inflammatory activity of TNFR2. The specific antagonist of TNFR2 will inhibit regulatory T cell proliferation, thereby enhancing the immune response which is useful for the treatment of cancer, potentially in combination with other immunotherapies. Specific agonist of TNFR2 can stimulate proliferation of Tregs, and could enhance its immunosuppressive effects by inducing proliferation of regulatory T cells, thereby synergizing with anti-TNFR1.

Figure 6A:
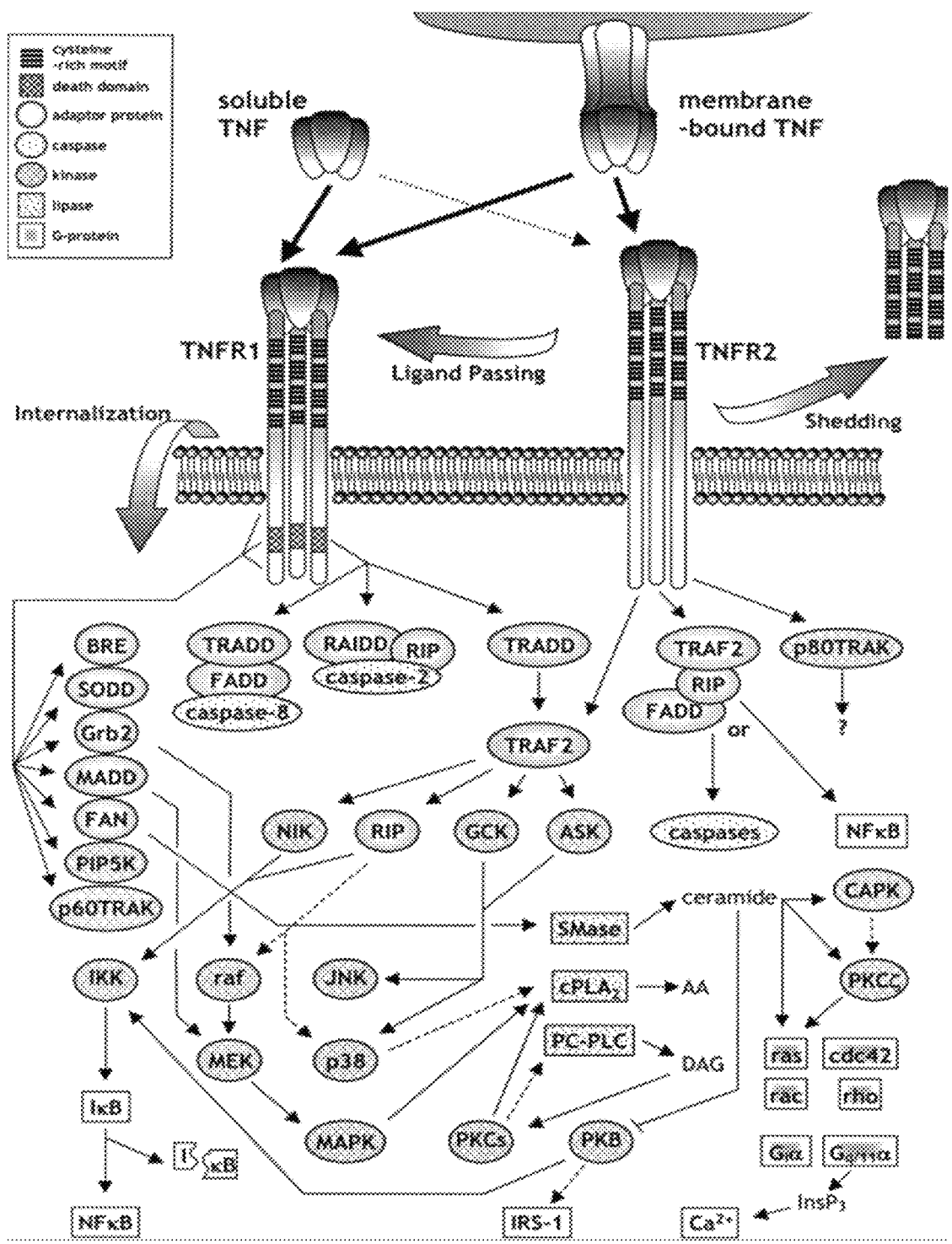

FIG. 6A: The TNFR1 and TNFR2 Induce Independent and Convergent Changes in Intracellular Signaling. Because endogenous receptors in the 3T3 cell line have been inactivated, only signals from huTNFR1 in one cell line, and huTNFR2 in another can be monitored.

As is well known in the art, treatment of unmodified cells with TNF will induce overlapping changes in cell signaling (FIG. 6A). One of the strongest is $NF_KB$ induction of IL-8 synthesis (Vlahopoulos 1999). This can be monitored by creating a reporter gene downstream from an NFkappaB activated promoter. These include all of the genes listed in Boston University Biology 2019 which is hereby incorporated by reference.

In particular, a luciferase reporter cloned downstream of the IL-8 promoter, resulting in increased luciferase activity in the cell, is a preferred embodiment of a reporter gene on the engineered 3T3 cells (Vlahopoulos 1999). Although both TNFR1/2 induce NFkappaB activation, only one type of TNFR is expressed on the modified 3T3 cells. Therefore, signaling can only come from the huTNFR expressed by that cell.

Figure 6B:
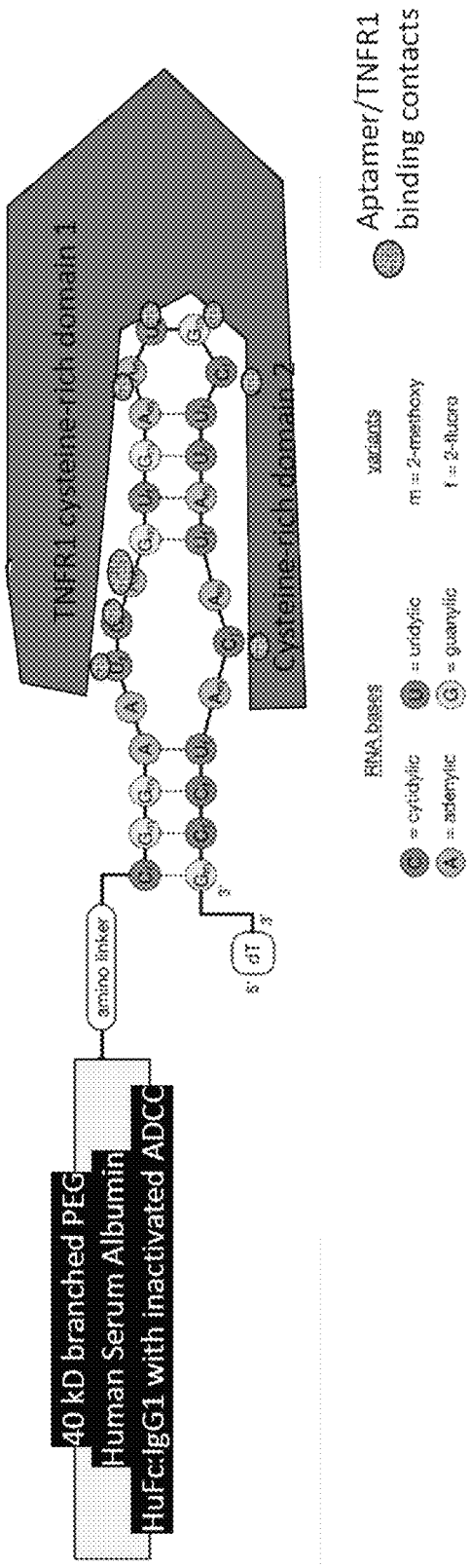

FIG. 6B: Characteristics of the Anti-TNFR1 Enonomer. In this figure, the aptamer is 'coating' the ligand binding domains. The many contacts of the aptamer with amino acids in the cysteine-rich domains of TNFR1 gives very high affinity binding. The target is aa1-70 of TNFR1 (Encompasses CRD1 (and the contained PLAD domain), CRD2). It is important to block the PLAD domain as it is involved in spontaneous multimers which may be the pre-signaling complex (Mukai 2010). Candidate aptamers (<28 bases long, and hydrophilicity negative cLogP, i.e., hydrophilic), Kd for TNFR1<100pM.

Aptamers will be conjugated via their 5' ends to a carrier molecule to increase serum residence time: PEG, human serum albumin or derivatives thereof; Immune Globulin (Human) (IgG) (brand names Gamimune and Octagam®) (Gupta 2017). If conjugated to PEG, then 40 kDa PEG (branched 2×20 kDa N-hydroxysuccinimide ester; available from JenKem Technology (Plano, TX)). The serum half-life of this compound in mice will be at least 10h, and preferably 24h. PLAD means Presignaling Ligand Assembly Domain or Pre-Ligand Assembly Domain.

Figure 6C:
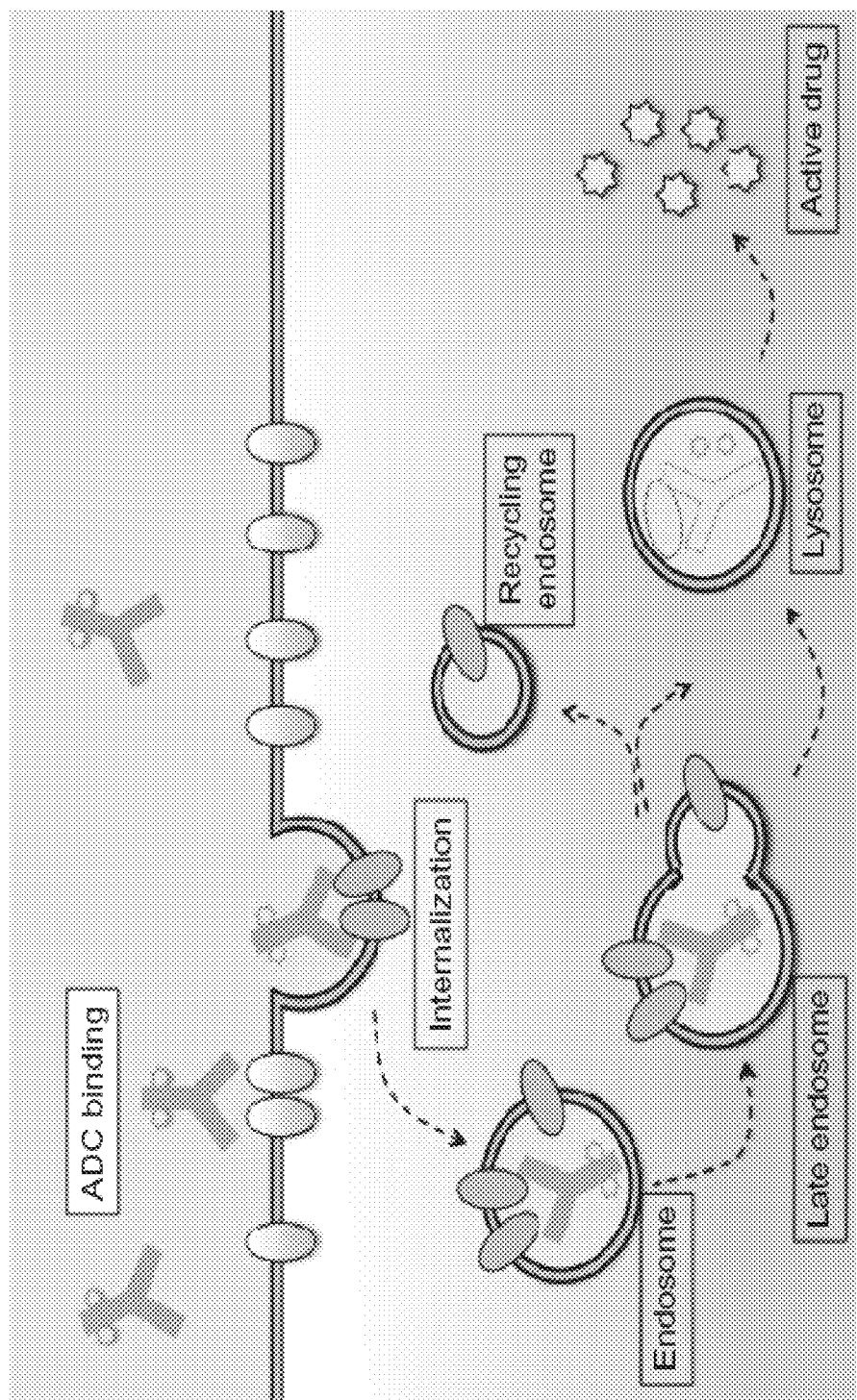

FIG. 6C: Creation of a specific TNFR2 agonist.

Figure 7:
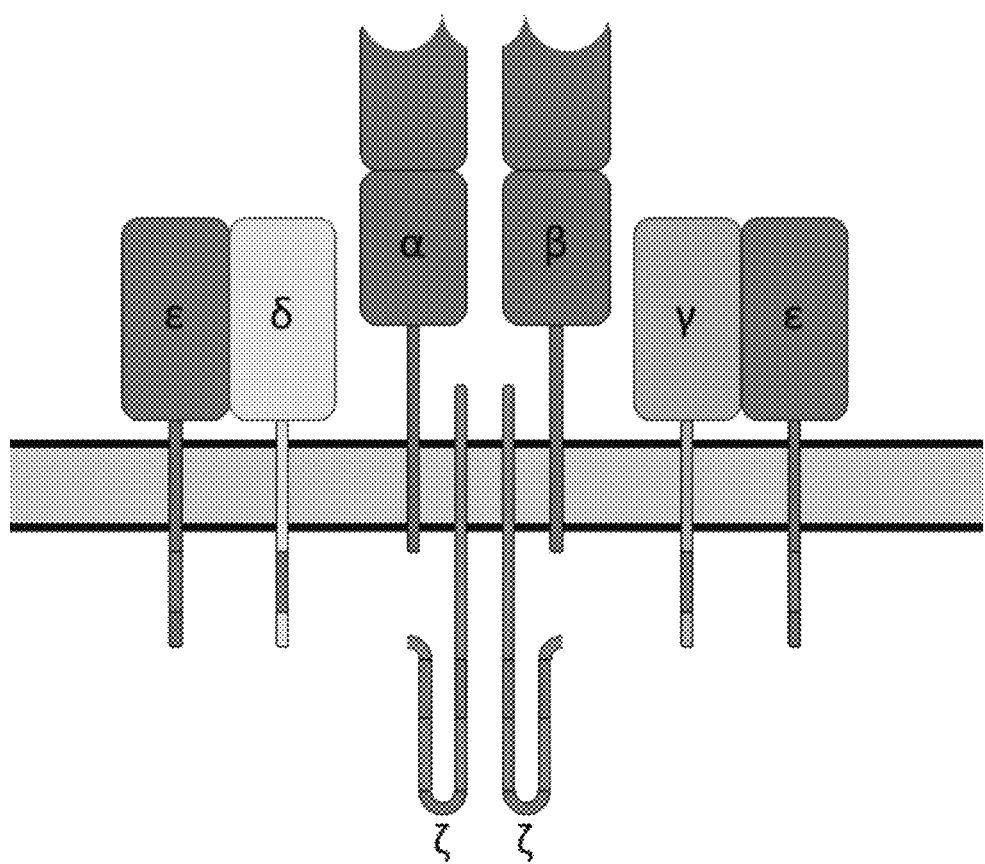

FIG. 7: The T-cell receptor (CD3).

Figure 8:
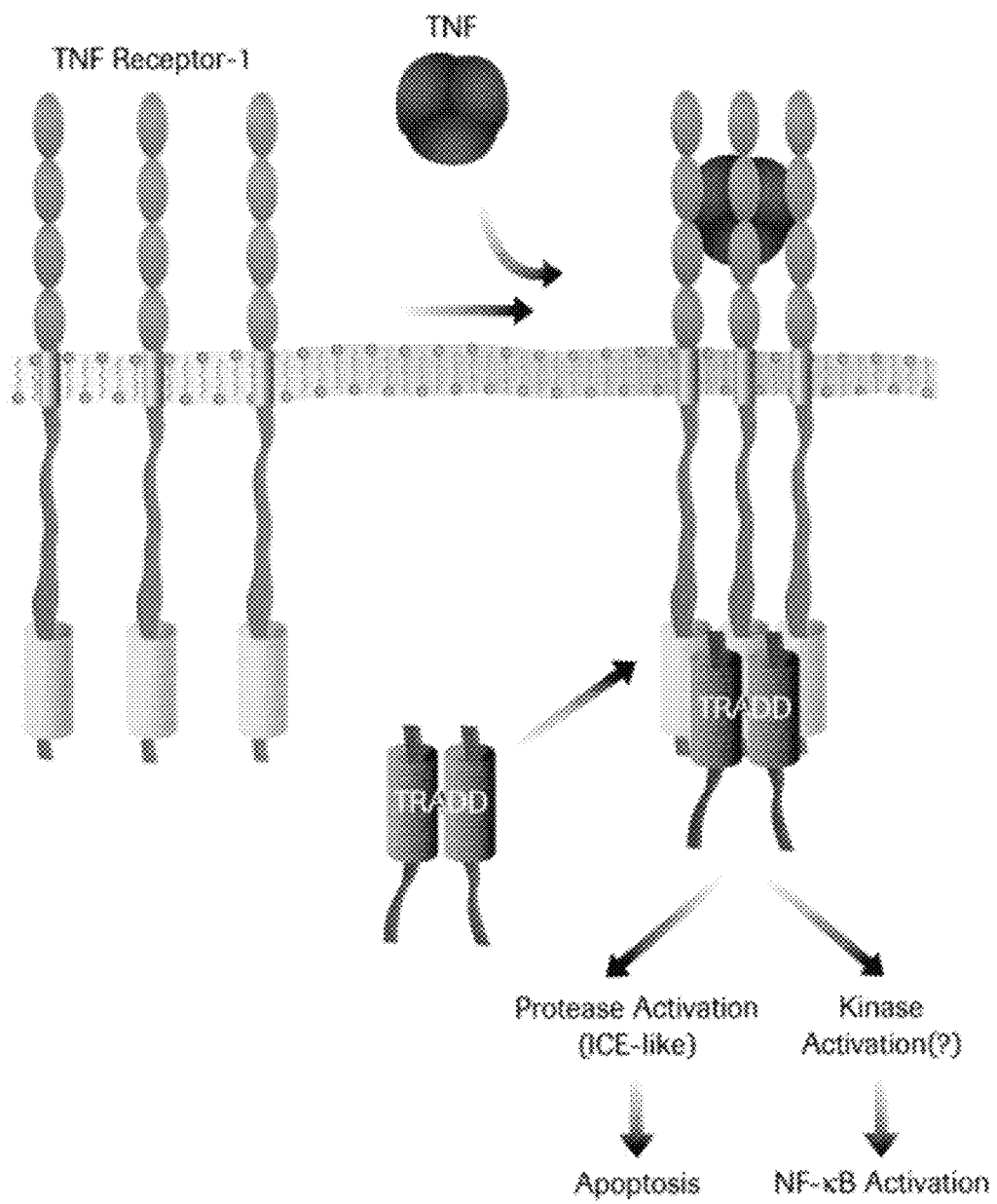

FIG. 8: Trimeric TNF induces TNFR1 aggregation, which is stabilized by homotypic interactions of the death domain (DD) which is also trimeric. Some DD-containing proteins are involved in the regulation of apoptosis and inflammation through their activation of caspases and $NF-_KB$, which typically involve interactions with TNF-α(tumour necrosis factor) cytokine receptors. TRADD (perhaps as an oligomer) associates via its own death domain with the aggregated DD of TNFR1 to initiate signaling cascades for both apoptosis (cell death) and $NF-_KB$ activation (chronic inflammation and cancer). TRAD=Tumor necrosis Receptor 1, Associated protein interacting with cytoplasmic Domain of TNF-α, mediates programmed cell death through apoptosis and activates NF-Kappa B. Both the apoptotic and NF-Kappa B pathways contribute (Hsu 1996).

Figure 9:
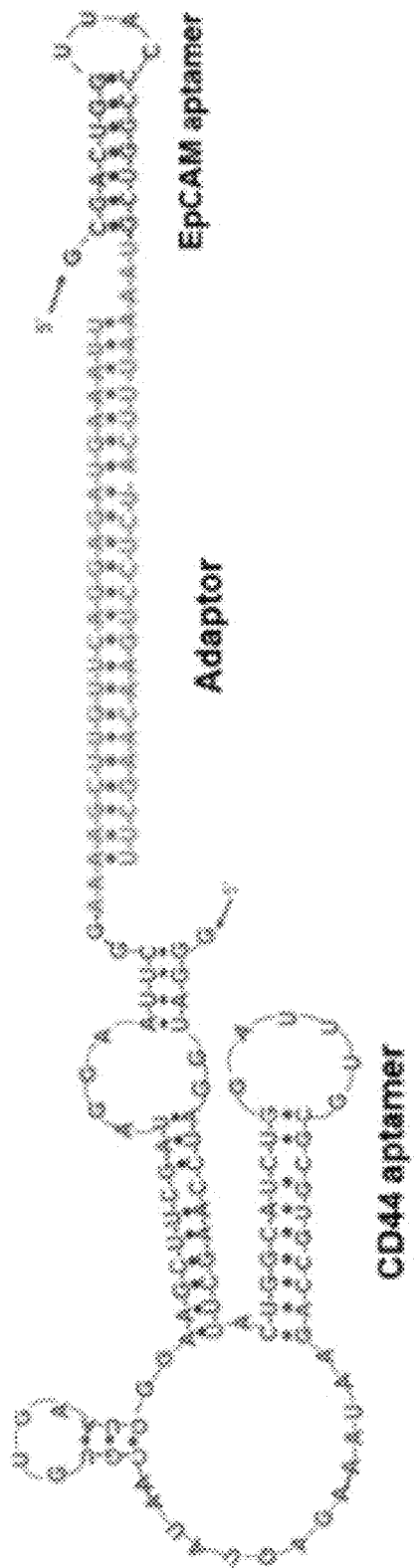

FIG. 9: Bispecific aptamer from Zheng 2017. Aptamers are synthesized separately, and then annealed together via complementary RNA adapters. Other methods could be used to link the aptamers, such as polyethylene glycol (PEG) of various lengths (Zhou 2014).

Figure 10:
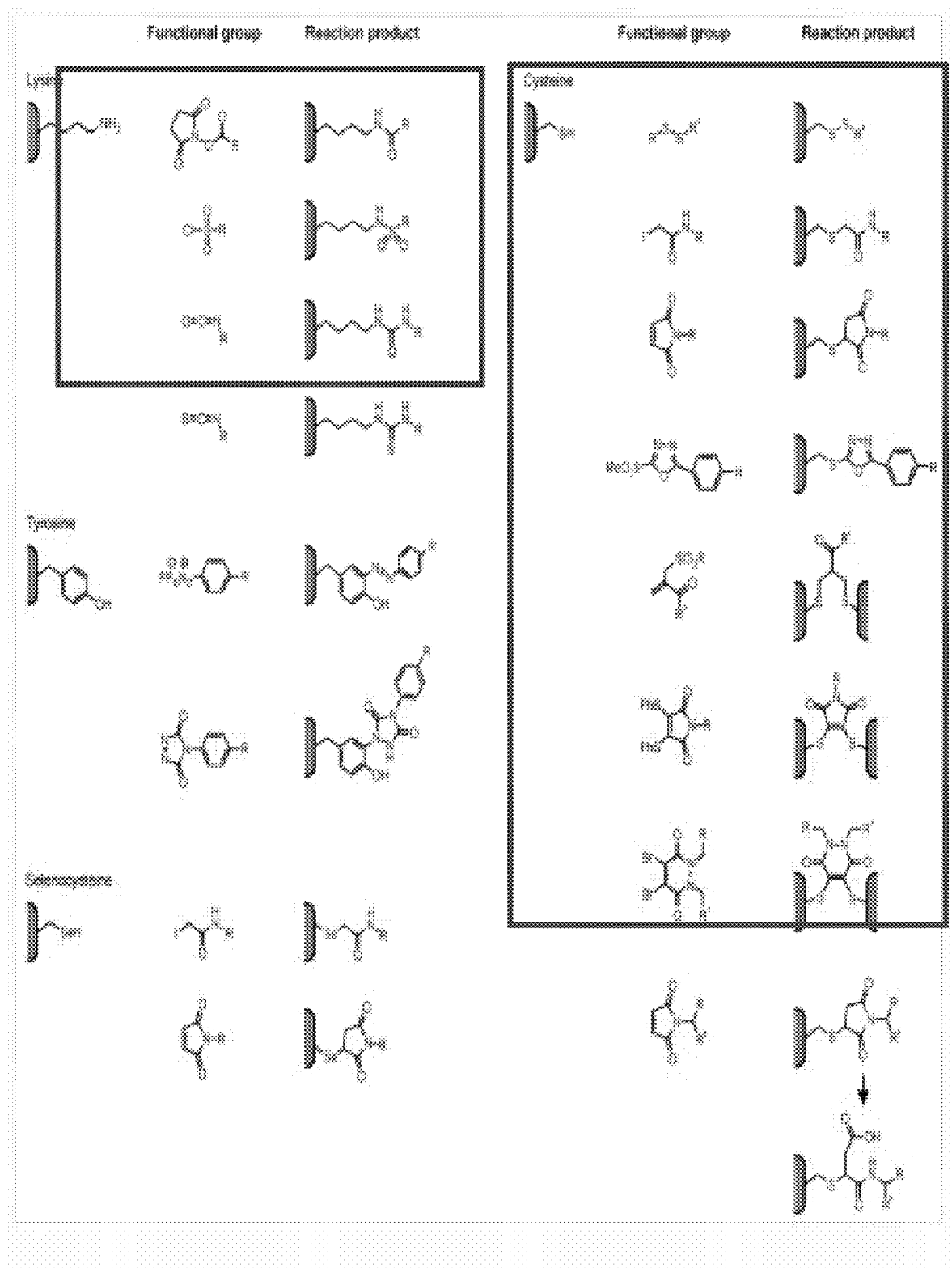

FIG. 10: Functional groups needed on 5'-end of the aptamer for conjugation via to selected amino acids of a protein. Especially note lysine and cysteine. The reactive (—NH2) group is shown for lysine. The reactive (—SH) sulfhydryl is shown for cysteine. R corresponds to the 'Functional group' in the middle column, and for the reaction product in the right column (Dennler 2015).

Figure 11:
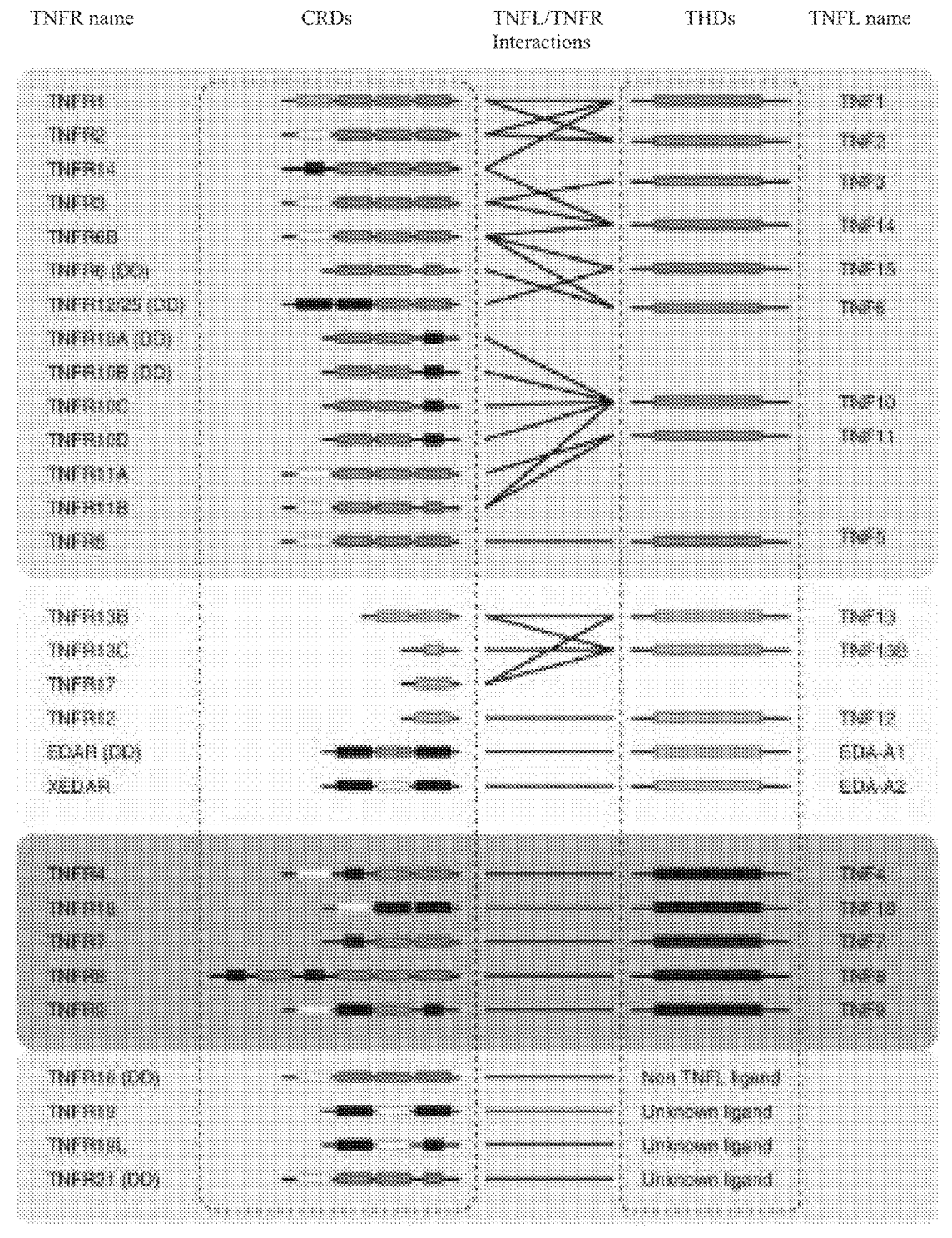

FIG. 11: The human TNF receptor superfamily (TNFSFR) and their ligands. Abbreviations: Tumor Necrosis Factor Ligand (TNFL), Tumor Necrosis Factor Receptor (TNFR), third cysteine rich domain (CRD), and TNF homology domain (THD).

FIG. 12: The cysteine-rich domain-1 (CRD-1) of TNFRSF1a/TNFR1 (see, also, SEQ ID NO:2).

Figure 13:
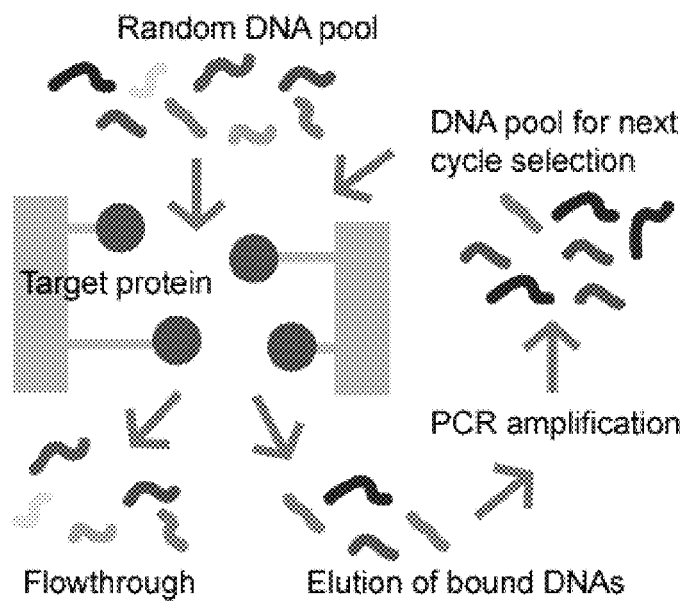

FIG. 13: The TNFR1-CRD1 affinity column will be used to purify aptamers that bind to CRD1. The 'Target protein' in this case will be the CRD1 immunoadhesin.

Figure 14:
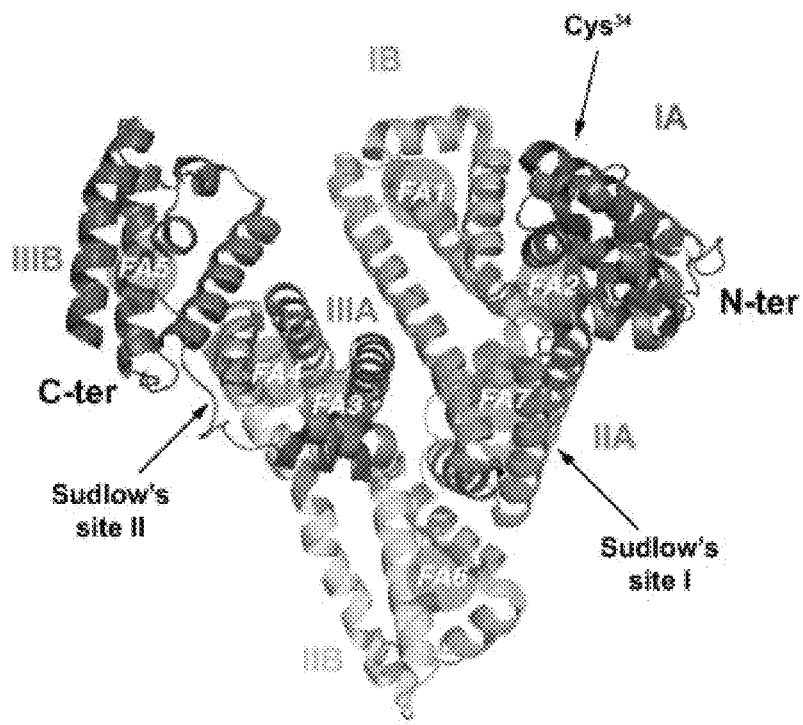

FIG. 14: Molecular structure of human serum albumin showing the domains IA, IB, IIA, IIB, IIIA and IIIB, the N and C termini, of Sudlow's sites I and II. Residue Cys-34 is shown available to solvent. The figure is derived from Liu 2015. Alternatively, a PEG linker with different reactive moieties at each end can be used to first bind with Aptamer A and then with Aptamer B.

Figure 15A:
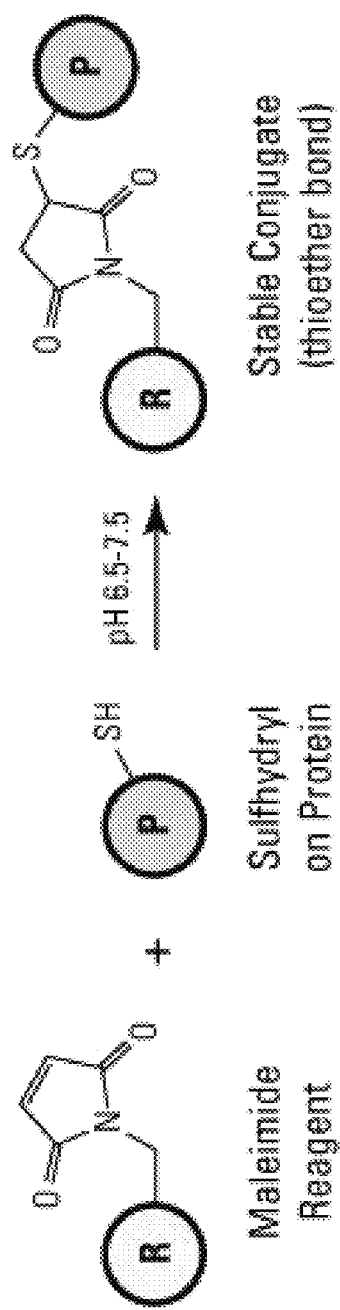

FIG. 15A: The proposed conjugation process. R=polyethylene glycol multimer with free sulfhydryl reacting maleimide reagent (far left). P=Protein with free sulfhydryl capable of reacting with maleimide reagent (middle of figure), for example human serum albumin cysteine-34. R/maleimide/P structure: Far right of FIG. 15A, showing the PEG (R)x Sulfhydryl on protein (in this case cysteine-34 of HSA).

Figure 15B:
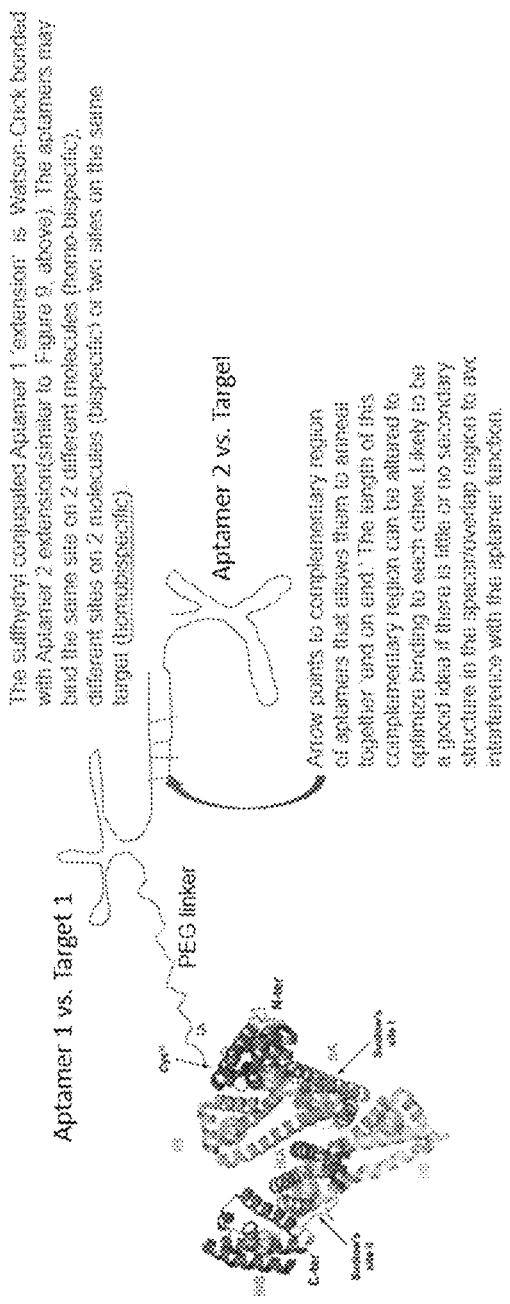

FIG. 15B: Construction of a bispecific aptamer. Aptamer 1 can have the same or different target as Aptamer 2. Aptamer 1 is associated with the carrier protein HSA via cysteine-34 PEG conjugation. The 5' end of Aptamer 1 is conjugated to the PEG linker. The two aptamers are 'zipped' together to enable site recognition, as described in this figure. The sulfhydryl conjugated Aptamer 1 "extension" is Watson-Crick bonded with Aptamer 2 extension (similar to FIG. 15A). The Aptamers may bind the same site on two different molecules (homo-bispecific), different sites on two molecules (bispecific), or two sites on the same target (homobispecific). The curved arrow points to a complementary region of aptamers that allows them to anneal together "end on end." The length of this complementary region can be altered to optimize binding to each other. It is preferable that there be little or no secondary structure in the spacer/overlap region to avoid interference with the aptamer function.

Figure 16:
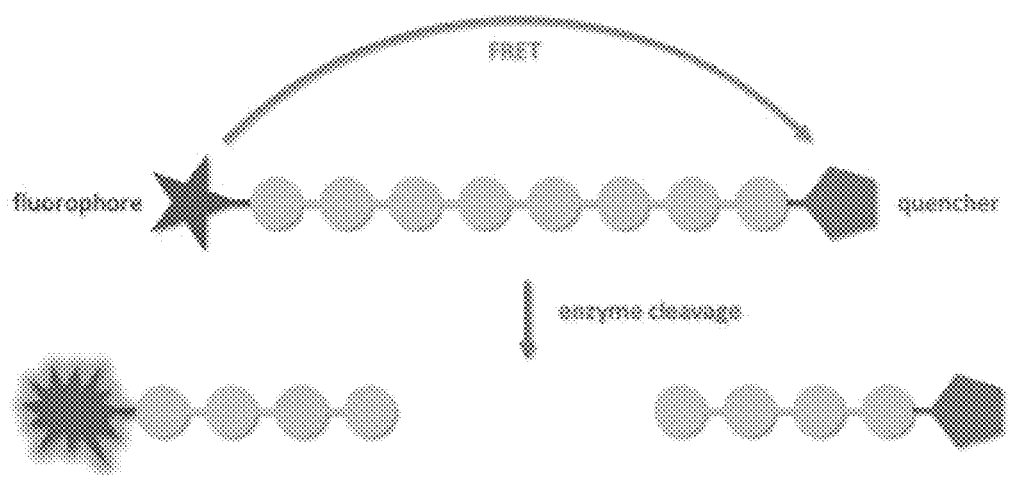

FIG. 16: Assays for detecting MMP14 activity. 1) Fluorescence Resonance Energy Transfer (FRET). The fluorescence of an excited fluorophore (donor) is absorbed by a second dye label (acceptor). Donor and acceptor are also often referred to as "FRET-pair". In contrast to collisional or dynamic quenching, a direct contact between fluorophore and quencher is not required. Since FRET typically takes place in a distal range between 1-10 nm, it can be employed to measure processes on a molecular scale. The fluorescence is inhibited by the quencher until the substrate is cleaved by the matrix metalloproteinase.

Figure 17:
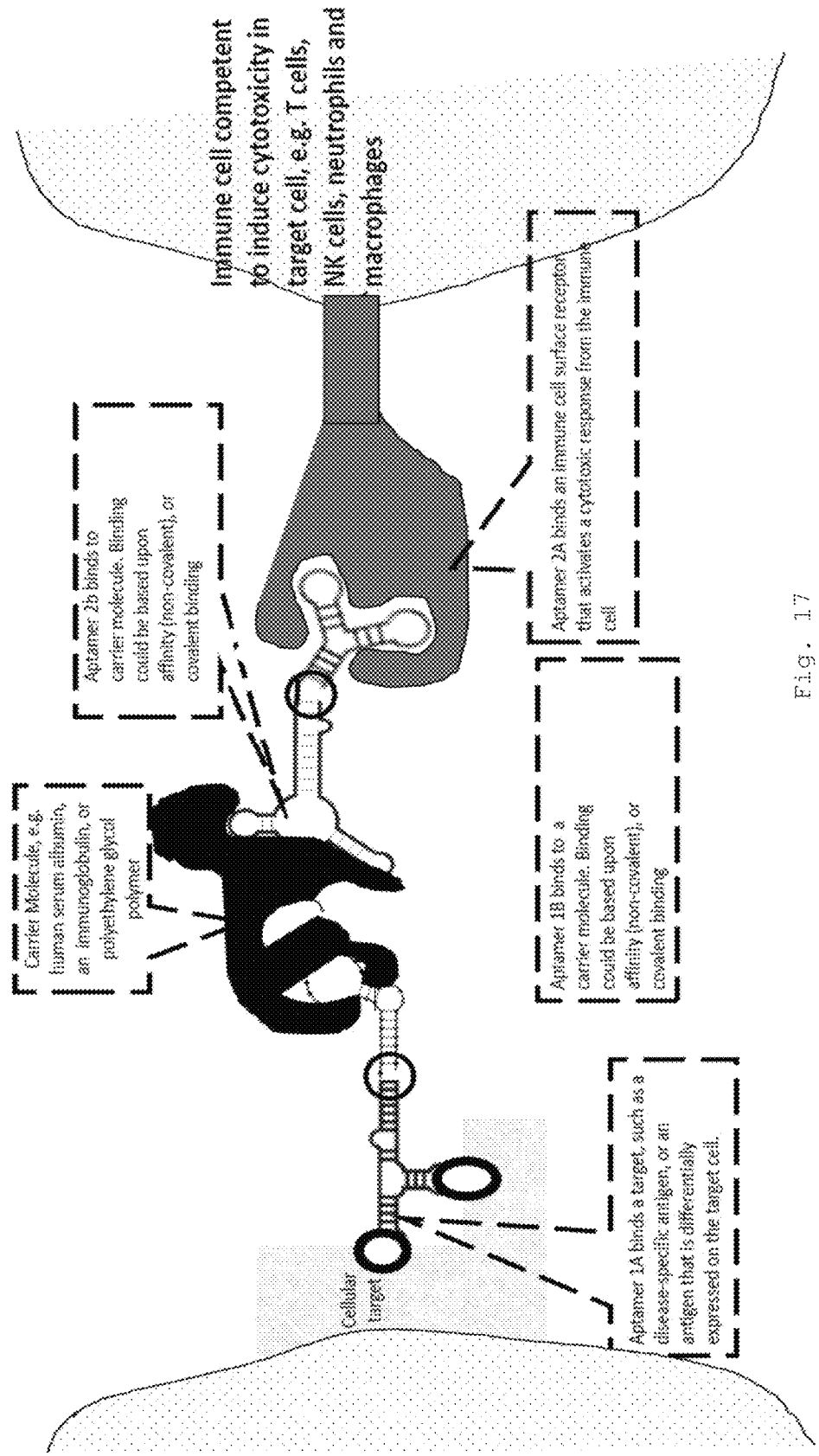

FIG. 17: Tool Box Immunotherapy. The principal is to avoid doing the arduous and very expensive work required to prepare a personalized immunotherapy, e.g. a cell-based therapy as described in Maude 2018. We have solved this problem by creating an aptamer-based self-assembling complex to carry out a similar purpose. Two or more aptamers, which do not compete for binding to a carrier (e.g., human serum albumin, HSA), are prepared. Preferably the aptamers bind to HSA non-covalently and with an affinity of less than 10 nM. In this figure, aptamer 1A binds the target of the therapy, while aptamer 2A binds to the immune target. Aptamers 1B and 2B bridge to the carrier molecule. The aptamers 1A and 1B are preferably synthesized as one molecule. Alternatively, either the 5' or 3' ends can be extended on the first aptamer, and a complementary extension can be synthesized on the second aptamer, the two aptamers are annealed, thus creating the bifunctional aptamer. The assembled aptamers are then combined with HSA under conditions where the therapeutic molecule will assemble, taking on the form shown in this figure. The circles show the 5' and 3' ends of each aptamer. Selection and characterization of aptamers binding to HSA will be done as described in Wilkinson 2017 and elsewhere in this application.

Figure 18:
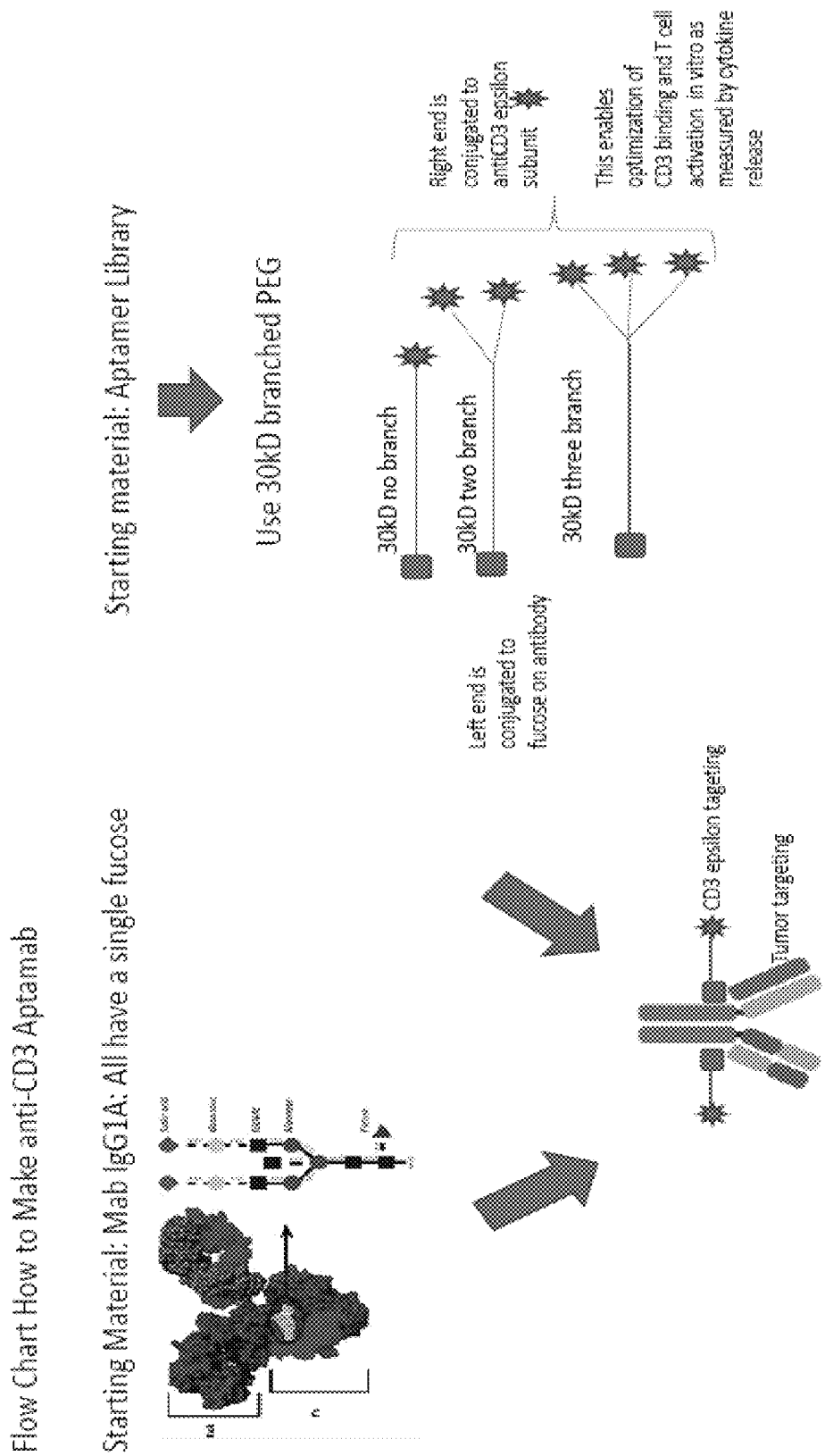

FIG. 18: Flow Chart How to Make anti-CD3 Aptamer. This figure depicts two modules: antigen targeting (on the left) and CD3epsilon targeting on the right. The CD3epsilon targeting agent can be used with any antibody.

DETAILED DESCRIPTION OF THE INVENTION

Terms

As used herein, and unless stated otherwise, each of the following terms shall have the definition set forth below.

The articles "a", "an" and "the" are non-limiting. For example, "the method" includes the broadest definition of the meaning of the phrase, which can be more than one method.

As used herein, "effective" as in an amount effective to achieve an end means the quantity of a component that is sufficient to yield an indicated therapeutic response without undue adverse side effects (such as toxicity, irritation, or allergic response) commensurate with a reasonable benefit/risk ratio when used in the manner of this disclosure. For example, an amount effective to treat a cancer. The specific effective amount will vary with such factors as the particular condition being treated, the physical condition of the patient, the type of mammal being treated, the duration of the treatment, the nature of concurrent therapy (if any), and the specific formulations employed and the structure of the compounds or its derivatives.

As used herein, an "amount" of a compound as measured in milligrams refers to the milligrams of compound present in a preparation, regardless of the form of the preparation. An "amount of compound which is 90 mg" means the amount of the compound in a preparation is 90 mg, regardless of the form of the preparation. Thus, when in the form with a carrier, the weight of the carrier necessary to provide a dose of 90 mg compound would be greater than 90 mg due to the presence of the carrier.

As used herein, to "treat" or "treating" encompasses, e.g., inducing inhibition, regression, or stasis of the disorder and/or disease. As used herein, "inhibition" of disease progression or disease complication in a subject means preventing or reducing or reversing the disease progression and/or disease complication in the subject.

"Subject" includes humans. The terms "human," "patient," and "subject" are used interchangeably herein unless the context clearly indicates the contrary (e.g. in reference to healthy human volunteers). In an embodiment, the subject is a human adult. In an embodiment, the subject is a human adult having a mass of 70 kg.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is understood that where a parameter range is provided, all integers within that range, and tenths thereof, are also provided by the invention. For example, "0.1-2.5 mg" includes 0.1 mg, 0.2 mg, 0.3 mg, etc. up to 2.5 mg.

As used herein, the term enonomer means a chemical entity which comprises at least one aptamer and a carrier molecule. The carrier protein may be any appropriate protein including an antibody, intracellular protein, a messenger RNA (mRNA) or human serum albumin. The term enonomer comes from the Greek word enonoun, meaning 'join together'.

Aptamers have been widely used for medical and pharmaceutical basic research, drug development, diagnosis, and therapy (Wolter 2017), and there is now an FDA approved aptamer pegaptanib (nMacugen®) for the treatment of age-related macular degeneration (Morita 2018). The success of Macugen® is a result of the fact that therapy is intraorbital, where drug clearance is generally not an issue.

Aptamer libraries have the advantage of being highly diverse (up to $10^{15}$ variants). This can be compared to the $10^{12}$ antibodies capacity of humans (The Molecular Biology of the Cell, $4^{th}$ edition). This diversity allows many more potential 'hits' vs. any given target. One of the reasons for this is that all epitopes in a protein are not recognized equally by the immune system because of a phenomenon known as immunodominance (Wortzel 1983). There is no immunodominance with respect to targets that can be recognized by aptamers.

Aptamers have a very short half-life (up to an hour) when administered to animals or humans (Morita 2018). To be effective for systemic treatment of cancer a drug should have a long serum half-life to allow the drug to achieve a steady state concentration. Aptamers have been conjugated to various serum components to increase their half-life, with limited success (Morita 2018). Recently, a complex of aptamer with antibody has been described, but this was not via a stable chemical linkage and did not create a molecule with the long half-life expected from an antibody (Heo 2016). Without wishing to be bound by any scientific theory, this short half-life was likely caused by the aptamer not being attached to the normal glycosylation site of the antibody.

Aptamers can be selected to bind to specific targets because of electrostatic interactions, hydrophobic interactions, and their complementary shapes, which is possible because of the intricate multi-dimensional structures that occur in self-complementary nucleic acid structures (FIG. 1A, 1B, 1C).

Aptamers are screened by a method called SELEX (Systematic evolution of ligands by exponential enrichment), shown in FIG. 1B. In this process a library of aptamers is exposed to a target, potentially immobilized on a plastic plate, or a column matrix, or magnetic beads. The immobilized aptamers are washed with buffer (low salt at neutral pH) to wash out all unbound aptamers. The tightly bound aptamers are eluted with a denaturing buffer (buffer+1M urea, or other agent that will disrupt binding). This is repeated with increasingly stringent conditions until the best binders are identified. The library can then be modified with additional base modifications in order to obtain the best binders. An example of this method is summarized in Gupta 2017. The last step is selecting aptamers against an unrelated target(s) to get rid of non-specific binders. Different modifications of the bases (A, G, T/U, C) can be made (FIG. 1B). A recent advance in this technology was the success of using two modified bases in creating the library. This is shown in FIG. 1C. FIG. 1C also shows how the different base modifications can change the shape of the aptamer.

Aptamers have many advantages over antibodies such as ease and a lower cost of production, lack of immunogenicity, and ability to recognize immune privileged sequences. Thus, the drawbacks of antibodies are related to their cost of manufacture, stability and immunogenicity. Additionally, aptamers can be covalently linked to antibodies or other carriers. The most significant disadvantage of aptamers is a characteristically short half-life in vivo. The short-half life problem is hereby being solved by associating aptamers with a carrier protein, such as antibodies, human serum albumin, cholesterol and other molecular conjugates, like polyethylene glycol.

Recently, Gupta 2017 has shown that aptamers with a long half-life can be made by optimizing hydrophilicity and length, when coupled with 40 kD branched PEG. The method described by Gupta 2017 will be used for aptamer library synthesis, SELEX selection of best binders, and coupling with PEG. Although the preferred method of half-life extension for aptamers is conjugation to PEG, there are other half-life extending strategies that can be employed such as engineering a fatty acid containing derivative of aptamer or PEG molecules such that the product would bind to human serum albumin in vivo and be transported systemically. Alternatively, aptamer conjugation with HSA, or portion thereof, or albumin binding domain, or to immune globulin are alternative strategies to increase half-life in vivo).

The invention includes tumor or organ selective aptamers that can localize an enzyme or drug to a diseased site. For instance, the invention includes the aptamer being adenosine. Local accumulation of adenosine within a tumor will cause immunosuppression (Hatfield 2016). An adenosine deaminase aptamer can specifically direct the enzyme to a tumor specific, or highly expressed, antigen, or to a tissue specific antigen.

In accordance with the invention, low pH dependent conformational activation may be accomplished by selecting an aptamer that takes up its active configuration only when it is inside a low pH microenvironment, such as is found inside a tumor or in the synovial fluid of a rheumatoid arthritis patient. This aptamer can be attached to a carrier protein, such as human serum albumin, to allow for an extended serum half-life. This allows for antagonists of enzymes like MMP14, which are commonly expressed on many tissues, to become low pH dependent, and therefore more restricted in their activity to microenvironments that have a low pH. Low pH in this case is between 6.0 and 6.5, and neutral pH is between 7.0 and 7.4. Each candidate molecule is tested in screening in parallel at both low pH and neutral pH. A drug candidate is expected to bind at least 10-fold higher at low pH. Assays may be performed in any of several formats as described herein.

Embodiments

The subject invention provides a composition comprising an enonomer, which comprises a) a carrier molecule, and b) at least one aptamer, wherein the carrier molecule is an antibody, an antigen-binding moiety, a serum protein, an intracellular protein, a messenger RNA (mRNA) or human serum albumin.

The subject invention provides a composition comprising an enonomer, which comprises a) a carrier molecule, and b) at least one aptamer, wherein the carrier molecule is an antibody, an antigen-binding moiety, a serum protein, an intracellular protein, a messenger RNA (mRNA) or human serum albumin and the half-life of the enonomer is equal to or greater than 10 hours.

In one embodiment, the aptamer(s) is chemically bound to the carrier molecule. In another embodiment, the aptamer(s) is chemically bound to a linker which is bound to the carrier molecule.

The aptamer(s), the linker(s), and the carrier molecule may be (a) linked via lysine-linked toxins, (b) conjugated or (c) linked non-covalently, preferably with an affinity of less than 10 nM.

In some embodiments, the linker is a variable length flexible nucleotide, a synthetic spacer sequence or a polyethylene glycol (PEG). In embodiments, the linker may be 10-60 kDa, 20-50 kDa, 30-40 kDa, 30 kDa, or 40 kDa. The linker may also be a branched linker.

The branched linker may be capable of binding to one, two, or three aptamers.

In one embodiment, the carrier molecule is an antibody or human serum albumin.

In an embodiment, the carrier molecule is an antibody. The antibody may be a human antibody or a humanized antibody.

The carrier molecule may be an IgG1 antibody, trastuzumab, pertuzumab, ado-trastuzumab, fibrinogen, or a biosimilar thereof. The carrier molecule may also be an antibody to the follicle stimulating hormone receptor (FSHR).

In one embodiment, the carrier molecule is a monoclonal antibody targeting the HER2 extracellular domain.

The aptamer(s), or the linker(s), may be (a) bound to the normal glycosylation site of the antibody, (b) bound to an amino acid on the heavy chain of the antibody, (c) conjugated with lysine molecules on the surface of the antibody, or (d) conjugated with the cysteine residues between the heavy chain of the antibody.

The aptamer(s), or the linker(s), may also be bound to the normal glycosylation site of the antibody and chemically linked to the fucose residues embedded in the G0F and G1F glycan structures. In some embodiments, the aptamer(s), or the linker(s), is bound to the normal glycosylation site of the antibody and conjugated to the fucose residues embedded in the G0F and G1F glycan structures.

The enomer may comprise two aptamers and each aptamer, or its linker, is bound to a different heavy chain of the antibody.

In some embodiments, the antibody is capable of binding to HER2 on the surface of a tumor cell. In additional embodiments, the aptamer(s) is capable of binding to HER2 on the surface of a tumor cell.

The aptamer(s) and the antibody may be capable of binding to the same target.

In some embodiments, the carrier molecule is an IgG1 antibody and the aptamer(s), or linker(s), is bound to the IgG1 antibody at the glycosylation site.

The glycosylation site may be asparagine at position 297.

In some embodiments, the antibody is capable of targeting p95-HER2.

In one embodiment, the antibody is a p95-HER2 antibody or the aptamer(s) is an anti-CD3$_\varepsilon$ aptamer.

In an embodiment, the antibody targets HER2. The aptamer(s) may target (a) CD3, (b) the T cell CD3 activating receptor, (c) a hematopoietic malignancy, (d) truncated forms of the epidermal growth factor receptor (EGFR), or (e) a tumor specific target on the surface of tumor cells.

In some embodiments, the antibody targets CD20 or CD19. In further embodiments, the antibody targets the tumor specific target on the surface of tumor cells which is altered glycoepitopes.

In some embodiments, the composition comprises (a) a CD20 targeting antibody conjugated to an anti-CD3ε aptamer, (b a CD19 targeting antibody conjugated to an anti-CD3ε aptamer, (c) a truncated form of the epidermal growth factor receptor (EGFR) targeting antibody conjugated to an anti-CD3ε aptamer, or (d) a glycoepitope targeting antibody conjugated to an anti-CD3ε aptamer.

In another embodiment, the carrier is a monoclonal antibody to the follicle stimulating hormone receptor (FSHR), coupled to an anti-CD3 aptamer. Thus, the anti-CD3 aptamer may be a cassette that can be used with any targeting molecule in order to activate T cells at the site of an antigen-expressing tumor. It is possible that an alternative to the anti-FSHR enonomer could be a defucosylated, or non-fucosylated IgG1 monoclonal antibody which is expected to have enhanced ability to guide ADCC to the tumor site (Van Landuyt 2018).

In one embodiment, the carrier molecule is a human serum albumin. The aptamer(s) may be bound to a position on the human serum albumin which is (a) the single exposed —SH (cysteine-34), (b) the lysine-199, (c) the histidine-242/247, or (d) the histidine 288.

In some embodiments, the enomomer comprises two aptamers and the second aptamer, or its linker, is bound to a different position on the human serum albumin than the first aptamer, or the linker. In additional embodiments, (i) the first aptamer, or its linker, is bound to cysteine-34 and the second aptamer, or its linker, is bound to the lysine-199, (ii) the first aptamer, or its linker, is bound to cysteine-34 and the second aptamer, or its linker, is bound to histidine 288, or (iii) the first aptamer, or its linker, is bound to lysine-199 and the second aptamer, or its linker, is bound to histidine 288.

In an embodiment, the aptamer(s) is capable of binding to the cysteine-rich domain (CRD1) of TNFR1. In another embodiment, the aptamer(s) is capable of specifically blocking TNF-α binding to TNFR1. In a further embodiment, the aptamer(s) is capable of specifically blocking TNF-α binding to TNFR2. In an additional embodiment, the aptamer(s) is capable of specifically blocking TNF-α binding to TNFR14.

In some embodiments, the first aptamer and the second aptamer target different sites. In other embodiments, the first aptamer and the second aptamer target different sites in the extracellular cysteine-rich domain of TNFR1.

The composition may comprise two aptamers or at least two aptamers.

In some embodiments, the aptamer(s) and the carrier molecule both do not bind to TNFR2.

In an embodiment, the aptamer(s) is capable of binding to HER2 on the surface of a tumor cell.

The aptamer may be adenosine.

In one embodiment, the aptamer(s) is synthesized from end-to-end multimers.

In some embodiments, the aptamer(s) is an anti-CD3 aptamer, an anti-CD3 epsilon aptamer, or an acid and nuclease resistant aptamer.

In an embodiment, the aptamer(s) is capable of binding to the extracellular domain of CD3 epsilon.

In another embodiment, the aptamer is capable of binding to amino acids 23-126 of SEQ ID NO: 1.

The aptamer may bind to triggers of potentially cytotoxic cells including neutrophils and natural killer (NK) cells. Thus, the aptamer may bind to neutrophils and/or natural killer cells.

In some instances of this invention, the aptamer may inhibit MMP activity by (a) binding in the enzyme active site, (b) binding to a distant site that disrupts proper formation of the active site (conformational inhibition), (c) interfering in conversion of the pre-protein form of MT1-MMP into the mature protease, and/or (d) by inhibiting dimerization of MMP-14.

The half-life of the composition may be 10 hours, 12 hours, greater than 12 hours, greater than or equal to 24 hours, 24 hours, 1-21 days, 1-12 days, 1-6 days, 4-6 days, or 19-20 days.

The invention also provides a method of treating a subject afflicted with an inflammatory disease, an autoimmune disease, or a malignant disease comprising administering to the subject an amount of a composition of the present invention effective to treat the subject thereby treating the subject.

In some embodiments, the subject is afflicted with breast cancer, gastric cancer, ovarian cancer, or non-small cell lung cancer. In another embodiment, the subject is afflicted with rheumatoid arthritis.

The invention also provides a method of treating a subject afflicted with a HER2(+) cancer comprising administering to the subject an amount of a composition of the present invention effective to treat the subject, wherein the carrier molecule is trastuzumab.

The HER2(+) cancer may be breast cancer, gastric cancer, ovarian cancer, or non-small cell lung cancer.

The invention further provides a method of treating a tumor comprising contacting the tumor with the composition of the present invention.

The invention additionally provides a method of treating a subject afflicted with chronic inflammation or an autoimmune disease comprising administrating a composition of the present invention which specifically blocks TNF-α from binding to TNFR1 but does not block TNF-α from binding to TNFR2.

The invention also provides a method of treating a subject afflicted with chronic inflammation comprising administrating a composition of the present invention which specifically enhances TNF-α binding to TNFR2, optionally in combination with a method of treating a subject afflicted with a HER2(+) cancer, comprising administering to the subject an amount of an enomomer. The enonomer comprises a carrier molecule and at least one aptamer, effective to treat the subject, wherein the carrier molecule is an antibody that is trastuzumab.

The invention further provides a method of treating a subject afflicted with cancer or fibrosis comprising administrating a composition of the present invention which specifically blocks TNF-α binding to TNFR2 but does not block TNF-α from binding to TNFR1.

The fibrosis may be Dupuytren's contracture or lung fibrosis. In some embodiments, the subject is afflicted with cancer and the method further comprises administering checkpoint inhibitors to the subject.

The invention also provides a method of treating a subject afflicted with ovarian cancer, or another cancer which causes overexpression of the follicle stimulating hormone receptor (FSHR), comprising administrating to the subject an enonomer. The enonomer comprises a carrier molecule and at least one aptamer, effective to treat the subject, wherein the carrier molecule comprises an antibody to the FSHR.

In one instance of this invention, a novel target for antibody drug conjugation is the fucose of trastuzumab at aa297/300 (shown as triangles in FIG. 2). Following selection of the most promising aptamers, which are synthesized as described in Gupta 2017, the aptamers are conjugated to PEG spacers of different lengths and the interaction between trastuzumab and the immune cell target (e.g., CD3) is optimized. Bifunctional PEG moieties are chosen to allow for distinct chemistries for joining aptamer to PEG, and joining fucose to PEG. Thus, the molecules used for testing will be Mab: Fucose: PEG: aptamer vs. CD3, or similar. The example shown is with DNA aptamers. The same reaction can be completed with RNA aptamers and RNA polymerase. Molecular optimization for pharmacokinetic optimization to obtain a serum half-life of at least 3 days may be carried out as described in Gupta 2017.

The invention described herein discloses a stable chemical linkage between an aptamer and a long-lived serum protein, including a human or humanized antibody, human serum albumin, or other long lived serum protein. The invention preferably provides a drug which has a half-life of at least 12 hours in order to maintain drug concentrations for no less than daily dosing. In this context, human serum albumin (HSA) has a very long half-life, approximately 19-20 days (Zhang 2018). The half-life of a humanized antibody is dose dependent. With a clinical dose of 500 mg, the half-life of trastuzumab is 12 days (Trastuzumab Package Insert). Fibrinogen has a half-life of 4-6 days (Carpenter 2013), and retinol binding protein exhibits a serum half-life of 12 hours (Sensi 1990). These serum proteins are often used for transport of other molecules throughout the body. The best characterized is human serum albumin, which can carry cargo as diverse as long-chain fatty acids, steroid hormones, vitamins, metal ions, and a number of drugs (Curry 2002). The long circulatory half-life of IgG1 antibodies, and similarly, the extended half-life of HSA, and fibrinogen may be used for framework proteins for serum long-lived proteins that can have their specific binding redirected by attached ligands, such as aptamers.

The workflow to create the trastuzumab enonomer is presented in Workflows 1 and 2. A drawing of the final preferred molecule is presented in FIG. 4. An important part of this invention is the branched PEG: anti-CD3 aptamer molecule. The same chemistry can be used for other indications in which a receptor or other surface molecule is overexpressed. For other antibodies, the fucose chemistry can also be used. For coupling PEG-5'-aptamer to other polypeptides or other molecules the chemistries are well known in the art (Roberts 2002).

Additional examples of receptors to be targeted are the EGFR in a subset of cancers, for example esophageal squamous cell carcinoma (Jiang 2015); the overexpression of follicle stimulating hormone receptor (FSHR), especially on ovarian cancer cells, and associated endothelial cells (Papadimitriou 2016). The overexpression on both the malignant epithelial cells and the associated endothelium provides a double target on the tumor, ie. T cell-mediated killing of endothelial cells (thereby disrupting vascularization of the tumor) and direct killing of the tumor cell. Another example is the RET receptor, which is overexpressed in estrogen receptor positive (ER-positive) breast cancers (Morandi 2011), among others. Thus, there is an abundance of potential therapeutics to be created using enonomer technology.

It is to be appreciated that certain features of the disclosure which are, for clarity, described herein in the context of separate embodiments, may also be provided in combination in a single embodiment. Conversely, various features of the disclosure that are, for brevity, described in the context of a single embodiment, may also be provided separately or in any subcombination.

This invention will be better understood by reference to the Experimental Details which follow, but those skilled in the art will readily appreciate that the specific experiments detailed are only illustrative of the invention as described more fully in the claims which follow thereafter.

EXPERIMENTAL DETAILS

Example 1: Trastuzumab (IgG1) Enonomers Including the Trastuzumab-CD3 Complex

As discussed above, an enonomer refers to a chemical entity comprising a carrier molecule, such as a protein or other complex and an aptamer.

The first aptamer-carrier protein described herein is the humanized antibody, trastuzumab (T). Trastuzumab is a humanized monoclonal immunoglobulin γ-1 (IgG1) antibody. As an IgG1 antibody, trastuzumab consists of two identical heavy chains and two identical light chains that are connected to each other by four disulfide bonds. Trastuzumab was found to treat breast cancer patients by binding to HER2 (Vu 2012). HER2 is a member of the human epidermal growth factor receptor (HER/EGFR/ERBB) family. Amplification or over-expression of HER2 has been shown to play an important role in the development and progression of certain aggressive types of breast cancer. However, only about half of HER2(+) breast cancers respond adequately to T cell therapy.

Additionally, trastuzumab is also approved for HER2(+) gastric cancer, although the response rate is similar to breast cancer (Okita 2018). HER2 is also overexpressed in ovarian and uterine cancers but clinical trials of HER2-directed therapies in these cancers have yielded disappointing results (Teplinksy 2014). Other cancers, for example non-small cell lung cancer, overexpress HER2, but preclinical and clinical data from clinical studies have been similarly disappointing (Torigoe 2018).

In recent years the HER2 protein has become an important biomarker and target of therapy for approximately 30% of breast cancers. There are several anti-HER2 therapies, leading to increased survival for many breast cancer patients (Mitri 2012). Despite this progress, the majority of HER2(+) patients will eventually experience disease progression as a result of one or more described mechanisms of resistance (Arienti 2016). Thus, an improved method of ensuring the death of HER2(+) tumor cells is needed.

Trastuzumab was chosen in this example because of this need for a new approach to controlling HER2(+) cancers. There is clearly a need for an anti-HER2 drug that works by a mechanism which is predictably toxic for cells which overexpress HER2, but which also retains the specificity for tumor cells that was the foundation for the development of trastuzumab. In this example, aptamers are chemically conjugated to Trastuzumab at a defined site on the antibody, specifically, the glycosylation site, asparagine at position 297 in the heavy chains. Because heterogeneity in this glycosylation profile is common for IgG antibodies (Damen 2009), attaching anti-CD3 aptamer to this site does not result in a drastic change in serum half-life. Attaching an aptamer to the glycosylation site of the trastuzumab antibody may be performed using methods known to a person skilled in the art. Upon administration of this CD3 aptamer-T antibody, CD3 aptamers will bind to CD3 of the cytotoxic T cell, bringing it into contact with HER2 overexpressing tumor cells.

The HER2 receptor clusters when it is overexpressed. When the CD3 aptamer-T antibody complex clusters (a mirror image of receptor clustering), it will cause the T-cell CD3 to cluster, thereby activating the T cell to kill tumor cells characterized by HER2 clustering.

A similar strategy was used in the design of the first bispecific antibody against HER2 (Shalaby 1992). Although this bispecific was not clinically developed, it did demonstrate specificity for HER2-overexpressing breast tumor cells in vitro. However, manufacturing and pharmacology has been difficult for bispecific antibodies and not many bispecific drugs have been approved by the U.S. Food and Drug Administration (FDA). One of the first bispecific antibodies approved was blinatumomab (Velasquez 2018). Despite approval, blinatumomab has limited utility because of a very short half-life. This short half-life requires continuous infusion (Klinger 2012) which is costly to clinical resources.

Historically, almost all patients afflicted with metastatic cancer relapse when treated with the FDA approved trastuzumab therapy or bispecific antibodies, regardless of whether these therapies include chemotherapy. As a result, over the last few years, arduous and extremely expensive modalities for cellular immunotherapy have been derived, resulting in three approvals of CAR-T cell technology, which are alternatives to bispecific antibodies, specifically, Sipuleucel-T, axicabtagene ciloleucel, and tisagenlecleucel.

The first two CAR-T cell therapies to receive FDA approval were axicabtagene ciloleucel and tisagenlecleucel, which are both for patients with large B-cell lymphomas. Axicabtagene ciloleucel targets B cells expressing CD19 lymphoma for some children and adults with advanced leukemia. These CAR-T therapies use patient-engineered T cells to target CD19 in lymphoma and leukemia or any other cells that express CD19, like B cells resulting in immunosuppression. Sipuleucel-T is a vaccination (active immunotherapy) for prostate cancer. All of these treatments require removing patient immune cells, treating them in vitro, growing in vitro, harvesting, and then reinfusion into the patient. These CAR-T therapies are very costly due to the difficult work-flow required to create the CAR-T, and finally to infuse into patients. The infusion of the CAR-T cells creates a severe cytokine storm, potentially resulting in serious toxicities (Hartmann 2017, Bonifant 2016). In particular, a CAR-T targeting HER2 was found to be associated with a patient death (Morgan 2010). Additionally, the cost of a course of therapy of tisagenlecleucel is approximately $475,000, and the costs of axicabtagene ciloleucel is similarly high.

Thus, there is a critical need to provide an alternative technology for the creation of bispecific reagents. Such reagents would enable specific, directed, T cell immunotherapy without the difficulties, costs, and toxicities associated with CAR-T cells. It is contemplated that an aptamer that is chemically joined with a carrier molecule that also binds to the target can overcome the problems associated with CAR-T cells. This example describes a CD3 aptamer chemically joined with trastuzumab (as a carrier molecule) that also binds to the target, specifically HER2 on the surface of a tumor cell. This trastuzumab: CD3ε complex targets the tumor and will bring the T cell to the tumor, without any in vitro manipulations. This trastuzumab:CD3ε complex is easy to make (i.e. cheap and safe) and provide a therapeutic mechanism that is independent of any other approaches. The trastuzumab:CD3ε a complex can recognize B-cell CD19, like the CAR-T therapies, but its special use will be for tumor antigen specific therapy, similar to anti-HER2 therapy (Browne 2009). This new class of molecules is herein referred to as enonomers.

Description of HER2 Enonomers, Including a Specific HER2 Enonomer (Antibody Targeting HER2 with Aptamer Targeting CD3)

HER2 enonomers are most often comprised of two major parts: 1) a monoclonal antibody to the HER2 extracellular domain; and 2) two aptamers, each with one end chemically bound to each of the antibody heavy chains. In this specific case, the other end of each aptamer will bind to the T cell CD3 activating receptor. Thus, the trastuzumab antibody part of the enonomer will bind to the target, i.e. HER2 on the tumor cell in this case, and the CD3 aptamer part of the enonomer will bind to the CD3 on the surface of the T-Cell thereby bringing them together and enabling T-Cell mediated killing of the target. The aptamers will be either (a) conjugated to a glycan associated with amino acid (aa) 297 (Asn) in each of the antibody heavy chains, (2) conjugation with lysine molecules on the surface of the antibody, (3) conjugated to the cysteine residues between the heavy chains of the antibody, or (4) bound to an intracellular protein or messenger RNA, each of which is discussed below in turn.

(1) Conjugated to a Glycan

TABLE 1

The relative abundance of G0, G0F, G1F, and G2F glycans at aa297 (Asparagine) from four different batches of Trastuzumab (Damen 2009). The table includes the G0F and G1F which together are on more than 80% of trastuzumab molecules.

| Batch | Glycoforms of heavy chain (%) | | | |
|---|---|---|---|---|
| | G0 | G0F | G1F | G2F |
| 1.1 | 4.96 | 52.8 | 35.8 | 6.47 |
| 1.2 | 9.59 | 39.8 | 40.0 | 10.6 |
| 1.3 | 6.53 | 47.4 | 38.4 | 7.65 |
| 1.4 | 6.12 | 35.9 | 44.7 | 13.3 |

An important aspect of this example is to make the HER2 enonomer as homogenous as possible. To achieve this goal, aptamers are chemically linked to the fucose residues embedded in the G0F and G1F glycan structures, which together are attached to >80% of the antibody heavy chains (Table 2; G0F+G1F). There is at most a single fucose per glycan chain (FIG. 2), allowing a limited amount of heterogeneity in the active pharmaceutical ingredient (API) and allowing for careful batch to batch analysis of the active API. Attaching the aptamer in this manner may be accomplished to methods known to a person skilled in the art and/or as described herein.

Identical aptamers are conjugated to both antibody heavy chains. This is contemplated to make the HER2 enonomer bivalent with respect to CD3, and thus have a higher avidity for the target. Avidity refers to the accumulated strength of multiple affinities of individual non-covalent binding interactions, such as between a protein receptor and its ligand, and is commonly referred to as functional affinity. As such, avidity is distinct from affinity, which describes the strength of a single interaction. Avidity should not be thought of as the mere sum of its constituent affinities but as the product of the effect of all affinities participating in the biomolecular interaction. In order to achieve the highest avidity of aptamer binding to the T cell, it is preferable for one arm of the antibody-associated (fucose conjugated) aptamer to bind a single CD3 and the second aptamer (on the other heavy chain) to bind another CD3, either on the same T cell, or an adjacent T cell.

(2) Conjugation with Lysine Molecules

The aptamer may be conjugated to the lysine residues of the antibody together using the chemistry described in Lewis Phillips 2008. In this reference the cytotoxic drug DM1 was conjugated to lysine residues of trastuzumab using the heterobifunctional reagent N-succinimidyl 4-(N-maleimidomethyl) cyclohexane-1-carboxylate (SMCC) in a 2-step process. Additional details of the synthesis of trastuzumab DM1 are provided in Lewis Phillips 2008 and Burris 2011.

(3) Conjugated to the Cysteine Residues

The aptamer may also be conjugated to the cysteine residues between the heavy chains of the antibody as described in Peters 2015. More specifically, site-directed mutagenesis may be used to introduce a fixed number of engineered cysteines at specific, controlled sites along the mAb by conjugation of novel unpaired cysteine residues to a small portion of the mAb.

(4) Bound to an Intracellular Protein or Messenger RNA

A further alternative is to create aptamers that bind to an intracellular protein or messenger RNA (mRNA). In the HER2 system, or other similar internalizing receptor systems, an acid and nuclease resistant aptamer can be attached to an antibody by any of the above described methods, be internalized by the receptor, and released from lysosomes to bind target protein or mRNA, thus inhibiting its activity, and resulting in tumor growth inhibition or cytotoxicity.

A person having ordinary skill in the art will readily be able to conjugate an aptamer to an antibody using the disclosures provided herein.

Methods for activating the fucose at aa297/300 (asparagine) of trastuzumab for reaction with exogenously added compounds (aptamers, PEG molecules of various lengths) have been described and are well known in the art (Zuberbühler 2012; Youn 2005).

Because the purpose of adding a linker to the antibody at its fucose moiety is to use the antibody for drug localization—in this case capturing and activating cytotoxic T cells via CD3 epsilon chain (or to other immune cell receptors capable of tumor cell killing), it is important that the linker be of the right length to bridge the distance between antibody and the immune cell target, such that the interaction will induce cytotoxicity, independent of the tumor cell microenvironment, which may be immunosuppressive (Shiokawa 2005; Khattabi 2018; Wang F 2018). Linker-length effects have been observed for other pharmacokinetic (PK)enhancing molecules like cholesterol, cyclodextrin or liposomes (Giorgi 2014; Kulkarni 2013), any of which could be carriers for aptamer-conjugated therapies. In one simplified form of this invention, polyethylene glycol polymers of different lengths are conjugated to the activated fucose shown FIG. 2B. Each of these [mAB/Fuscose-PEG-anti-CD3 aptamers] with different length PEG molecules are tested in vitro using standard T cell cytotoxicity assays (Wang 2018, Löffler 2000) to determine which has the best activity. The best candidates are then used for in vivo antitumor activity in immunodeficient mouse models with human xenografts which may or may not overexpress human HER2 (Lin 2018).

More than 88% of glycoforms in trastuzumab contain a single fucose on each heavy chain as shown in FIG. 2C. Conjugating linkers at the fucose residue will give a more homogeneous product than linking through MAb lysines and cysteines. Multiple linkages can be created by targeting carbohydrate ambiguously, ie. fucose plus galactose, mannose, etc.

It is known that conjugating to some positions of the antibody can lead to unacceptably short half-life. Part of this invention is to direct the linker to the glycosylation site because: 1) The antibody is already known to tolerate modification (glycosylation) at this site; and 2) Conjugation to the fucose residue may result in improved antibody-dependent cell-mediated cytotoxicity (ADCC) for the Mab, thus providing an additional mechanism of antibody dependent ADCC. The chemistry of linkers is well known for fucose and carbohydrates in general in conjugation with polyethylene glycol or other reagents that extend serum half-life. This approach could be taken with most IgG1 monoclonal antibodies, any MAB with similar fucosylation, with IV IgG (which is 80% IgG1), or Fc fragments which retain the hinge region/glycosylation site at amino acid 297/300.

Work-flow 1: Work-flow for creating Trastuzumab Enonomers
1) Obtain trastuzumab, or a biosimilar thereof, or any other mAb or protein with accessible fucose residues;
2) Activate the fucose residue (Zuberbühler 2012) for reaction with hetero-bifunctional polyethylene glycol (HBPEG) (JenKem Technology (Plano, TX)). Both linear and heterobifunctional branched will be tested. The linear aptamer-PEG conjugation (1) will only cluster CD3 when the antibody receptor is clustered; but the advantage of branched chain-aptamer (2) is that will be much easier to 'capture' CD3 and induce clustering is overexpressed receptors on the T cell;
3) Form mAb: fucose: HBPEG;
4) Conjugate anti-CD3epsilon aptamer to other end of the HBPEG (described in Gupta 2017). Aptamer is selected as described in FIG. 3;
5) Form mAb: fucose: HBPEG: AntiCD3 epsilon aptamer (bifunctional antibody) (Synthesis of aptamer library, selection, and pegylation will be performed as described by Gupta et al. (Gupta 2017), or obtained commercially from vendors such a TriLink® Biotechnologies, Aptagen® LLC, AMS Bio Ltd, or Genelink, Inc.

Examples of single chain and branched chain HBPEG:

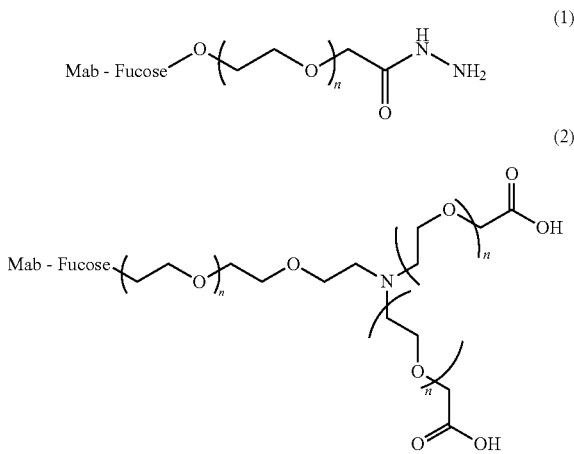

The end of the PEG moiety which conjugates to the aptamer can be single or branched. Hydrazide (or similar) derivative of fucose is conjugated to methylhydrazide derivative of either single or branched PEG. The branched version of PEG coupled with antiCD3epsilon aptamers is preferred because higher avidity for the target is possible. Thus, branched PEGs are preferred because an aptamer may be bound to the end of each branch of the PEG. For example, up to 3 aptamers may be bound to a different branch of a single branched PEG. This will be efficient at clustering CD3, and subsequently activating it.

Workflow 2: Workflow for Selecting Aptamers vs. CD3
1) Library of nuclease resistant DNA aptamers (two-base modifications, as in FIG. 1B). The library will include $\geq 10^{12}$ different aptamer sequences, with identical PCR tags at 5' and 3' ends) for amplification of first and subsequent rounds of selection). Aptamer libraries can be synthesize as described previously.
2) Screening will be performed using the extracellular domain of CD3 epsilon (CD3epsilonECD) immobilized on magnetic beads or an equivalent substrate according to the SELEX method. The sequence of CD3epsilonECD is described in Sun 2001 and this molecule is available commercially from several sources. For example, a complex of CD3 epsilon with CD3 gamma is available from Reprokine Ltd (Valley Cottage, NY) and CD3 epsilon is available from Sino Biological (Wayne, PA).
3) A hit will be defined by two criteria. The ability of the aptamer to block CD3 epsilon binding of UCHT-1 to TCR/CD3δε and the ability of the aptamer to block anti-CD3 epsilon-induced T cell proliferation by UCHT-1.
4) Identified hits will undergo affinity maturation (via SELEX) to have a Kd of less than 10 nM, and will then be incorporated into the final product (e.g., trastuzumab: PEG: antiCD3epsilonECD aptamer). FIG. 3.

Selection and Preparation of Aptamers.

The candidate aptamers will be selected from a preexisting library provided by a commercial vendor, such as TriLink® Biotechnologies (San Diego, CA), AMBiotech® (Houston, TX), Aptamer Group (United Kingdom), or the candidate aptamers will be synthesized and screened as described in Gold 2010. In general, the synthetic protocols for various aptamer designs have been described in detail in Current Protocols in Nucleic Acid Chemistry 2000. Methods of selection and synthesis of aptamers are also described in the following publications: U.S. Pat. Nos. 8,969,318; 5,475, 096; 5,270,163; 5,958,691; 5,660,985; 5,958,691; 5,698, 687; 5,817,635; 5,672,695; 5,707,796; 5,763,177; 5,567, 588; 5,496,938; 5,705,337; and 5,861,254 and PCT Application Publication No. WO 1992/007065, the entire content of each of which is incorporated herein by reference.

TABLE 2

The general outline of the process of identifying candidate aptamers

| | |
|---|---|
| 1 | Preparation of the initial oligonucleotide pool of approximately $10^{14}$ to $10^{15}$ random sequences, 30 to 50 nucleotides in length between two primer binding sites. |
| 2 | Incubation in which random sequences in the initial pool fold into different secondary and tertiary structures and form aptamer-target complexes when optimal conditions occur. |
| 3 | Partitioning in which unbound sequences are separated from target-bound sequences using methods such as membrane filtration, affinity columns, magnetic beads, or capillary electrophoresis. |
| 4 | Amplification in which target-bound sequences are amplified by PCR, in the case of DNA aptamers, or RT-PCR, in the case of RNA aptamers. Reaction products are used as a new aptamer sub-pool for the next round of selection. |
| 5 | Sequencing using high-throughput sequencing methods. |
| 6 | Specific modification of the aptamer for conjugation to the target molecule. |

(Gold 2010; Current Protocols in Nucleic Acid Chemistry 2000; Ni 2017).

In this example, aptamers are identified as potential 'hits' when they bind one of the subunits of CD3, particularly CD3epsilon (CD3ε, FIG. 7).

The T-cell receptor (TCR) is made up of multiple subunits as shown in FIG. 7. The CD3 (cluster of differentiation 3) T cell co-receptor helps to activate both the cytotoxic T cell (CD8+ naive T cells) and also T helper cells (CD4+ naive T cells). It consists of a protein complex and is composed of four distinct chains. In mammals, the complex contains a CD3γ chain, a CD3δ chain, and two CD3ε chains. These chains associate with the T-cell receptor (TCR) and the ζ-chain (zeta-chain) to generate an activation signal in T lymphocytes. The TCR, ζ-chain, and CD3 molecules together constitute the TCR (CD3) complex.

The epsilon chain has been shown to be successful in triggering T cell dependent cytotoxicity in a bispecific modality (Shalaby 1992). This target has the added advantage that the epsilon subunit is present twice in the CD3 complex, raising the possibility that one anti-CD3 aptamer could bind one epsilon chain, while the second aptamer could bind the second epsilon chain. This will create a very high affinity complex with the anti-HER2 antibody.

The sequence of the CD3 epsilon (CD3ε) extracellular domain is amino acids 23-126 of the CD3E gene. The sequence of the CD3E gene is set forth in SEQ ID NO: 1. This extracellular domain is expressed in human CHO cells and will be used for aptamer selection. Specifically, the CD3 epsilon extracellular domain will be fused with IgG1:Fc to create an immunoadhesin (Ashkenazi 1997), or alternatively, it will be expressed in CHO cells to have a polyhistidine tag at the C-terminus. The expression of the CD3ε extracellular domain fused with IgG1: Fc can be purified easily using a column matrix with immobilized protein A. Alternatively, the CD3ε can be expressed fused to polyhistidine (CD3ε-His) and its purification will be carried out according to methods well known in the art, for example by protocols which may be found in the Protocol Online®. The first selection will identify all binders, and subsequent selection will be for the aptamers with the best binding ability to the target.

Aptamers prepared and selected as described above can be modified to have variable length flexible nucleotide or synthetic spacer sequence at the antibody attachment site, followed by the selected aptamer sequence. The successful aptamers may also be synthesized as end-to-end multimers of various lengths (from no added sequence, to 'N' nucleotides). The various length multimers will be tested experimentally in order to determine the optimal length needed for interacting with T cell CD3 or CD3ε. Methods for creating spacers for aptamers are described in Waybrant 2014 and in the publications referred to above. One way to extend the aptamer is to synthesize end to end aptamers, thereby creating a multimer aptamer with a high concentration of CD3ε binding sites. This latter method is contemplated to have the advantage of increasing the possibility of binding to the CD3ε target on T cells (just by increasing the local concentration of CD3 binding sites on the aptamer). Methods for improving aptamer binding affinity are also well known in the art (Hasegawa 2016), as well as methods for attaching aptamers to biologic molecules, such as carbohydrates and proteins (Tolle 2013).

Preparation of the Aptamer-Antibody Complex

Following the selection and preparation of the aptamers detailed above, the selected aptamers, or the aptamers with variable length flexible nucleotide or synthetic spacer sequence at the antibody attachment site, will be attached to the antibody as described earlier in this example to form an HER2 enonomer.

Testing of the HER2 Enonomer

The HER2 enonomer created by the methods described above is tested both in vitro and in animal (in vivo) models.

In vitro testing: The in vitro bioassays for measuring CD3-dependent cytotoxicity are well known. Aptamers assays, assays of aptamers conjugated to receptors, or other assays that may include aptamers with different lengths can be performed by many different CD3-dependent tumor cell killing assays, all well known in the art (Shalaby 1992; Smith 2015; Chen 2016; Sugiyama 2017; Current Protocols in Immunology 1992). The components of the HER2 enonomer are to be tested in typical ligand receptor assays in an ELISA format. The HER2 component of the HER2 enonomer are to be tested in an assay including purified HER2 extracellular domain as described in Jin 2009 to ensure an adequate binding affinity to the HER2 extracellular domain. Similarly, CD3 binding of the HER2 enonomer is to be tested using the assays described by Law 2002 to ensure an adequate binding affinity to CD3. Binding affinity assays may also be performed with the ForteBio Octet® instrument (Abdiche 2008).

For in vitro testing, the same cell lines and protocol used by Lewis 1993 are performed on the HER2 enonomers described herein. Specifically, a HER2 enonomer is added to a cancer cell line which overexpresses HER2 and then incubated. Several examples of these cell lines are listed in Lewis 1993. It is contemplated that the HER2 enonomer inhibits growth in the cancer cell lines.

Additionally, a CD3-dependent cytotoxicity assay is performed with a HER2 enonomer in a HER2 overexpressing tumor cell, such as SKBR3, and compared the results of the same assay with the same HER2 enonomer in a cell type that expresses low amount of HER2 (in the range of a normal fibroblast). It is contemplated that an in vitro comparison of the sensitivity of these two cell lines to a HER2 enonomer will clearly show that the HER2-high cell line was much more sensitive than the HER2-low cells line to the CD3-dependent cytotoxicity of the bispecific antibody.

Similar assay models were used for preclinical proof of concept for the trastuzumab monoclonal antibody (Pegram 2004). Alternatively, the ability of the HER2 enonomer to coordinate T cell mediated cytotoxicity may be tested as described in the assay described by Shalaby 1992. Both sets of assays are HER2-dependent, and sensitivity of tumor cell lines to the HER2 enonomer are contemplated to be similar to what has been described by Lewis 1993 and Shalaby 1992. Alternative assays have been developed to replace the chromium release assay described in Shalaby 1992. One such variant is described in Singha (Singha 2015). Many other assay formats, including high throughput assays to measure activity of many drug candidates is described in Sittampalam G. S. 2004. In vivo assays to test efficacy of the HER2 enonomer can be similar to what has been described in the literature (Pegram 2004) to test direct growth inhibition by the antibody component of the HER2 enonomer. Growth inhibition is contemplated to be HER2 expression dependent.

In vivo testing: Immunodeficient mice having HER2-high and HER2-low human tumor xenografts are prepared. These mice have been reconstituted with a human immune cell repertoire, including T cells. This animal model has been developed and tested previously, although not using enonomers. Thus, the preparation of such mice is within the ability of a person of ordinary skill in the art or alternatively the mice may be obtained from contract research organizations such as Biocytogen® (Worcester, MA) and The Jackson Laboratory (Bar Harbor, ME). The mice are infused with human peripheral blood mononuclear cells (PBMCs). The mice are then treated with HER2 enonomers. The bispecific aspect of the HER2 enonomer is dependent upon the T cell directed tumor therapy. It is contemplated that the enonomers will provide growth inhibition or regression of the HER2-high tumor, but little or no effect on the HER2-low tumor.

Alternatively, in vivo testing of the bispecific nature of the HER2 enonomer may be performed using immunodeficient mice that have been reconstituted with a human immune cell repertoire, including T cells. The preparation of such mice is within the ability of a person of ordinary skill in the art, or alternatively the mice may be obtained from The Jackson Laboratory (Bar Harbor, ME). It is contemplated that the HER2 enonomers discussed above will inhibit tumor growth.

Example 2: Other Enonomers

The approach detailed in Example 1 may be used to treat any malignancy in which a target is highly overexpressed.

p95-HER2: For example, the target may be p95-HER2, which is only expressed on tumor cells (Ohman 2002). p95-HER2 is a series of carboxy-terminal fragments expressed by a subtype of HER2-positive tumors with distinct biological and clinical features (Arribas 2011). There are at least two p95-HER2 fragments, a 100-115 kDa fragment, known as 611-CTF and a 90-95 kDa fragment (Arribas 2011). P95-HER2 is likely a resistance pathway for trastuzumab. It is contemplated that p95-HER2 can be separately targeted using anti-p95-HER2 antibody conjugated to anti-CD3ε aptamers as described in Example 1 to form an enonomer. It is contemplated that the CD3ε: anti-p95-HER2 enonomer provides the same results as the HER2 enonomer of Example 1 in the in vitro and in vivo tests disclosed in Example 1.

CD20 or CD19: The next target is CD20 in hematopoietic malignancies characterized by transformation of a single cell type such as low-grade or follicular CD20-positive non-Hodgkin's lymphoma. Thus, an anti-CD20 antibody may be conjugated to anti-CD3ε aptamers using the methods described in Example 1 to form an enonomer. Such CD20 antibodies include, but are not limited to, ofatumumab, rituximab, ocrelizumab, hyaluronidase, ibritumomab, and obinutuzumab.

A similar cell surface antigen, CD19, is the target of the bispecific antibody blinatumomab, which has considerable clinical difficulty because of its short half-life, and therefore 24h infusions of blinatumomab are needed (Portell 2013). Thus, an anti-CD19 antibody may be conjugated to anti-CD3ε aptamers using the methods described in Example 1 to form an enonomer.

EGFR: Another target is truncated forms of the epidermal growth factor receptor (EGFR) which occur in glioblastoma (and some other diseases (Keir 2018). EGFR is not effectively recognized by approved anti-EGFR monoclonal antibodies. Thus, an anti-EGFR antibody may be conjugated to anti-CD3ε aptamers using the methods described in Example 1 to form an enonomer.

Additional targets are tumor specific targets on the surface of tumor cells, such as altered glycoepitopes (Schietinger 2006). The appropriate targeting antibody may be conjugated to anti-CD3ε aptamers using the methods described in Example 1 to form an enonomer.

Example 3

Enonomer comprised of a long-lived serum globular protein and an aptamer to sterically interfere in receptor multimerization, or to specifically lengthen the half-life of a therapeutic aptamer.

Human serum albumin (HSA) is a globular protein present in the circulatory system. It is the most abundant of all plasma proteins (~60%), with an average concentration of 50 grams per liter. It is primarily a carrier protein involved in the binding and transport of fatty acids, hormones, metabolites, endogenous ligands and drugs, in addition to the maintenance of colloid osmotic blood pressures and the preservation of blood pH. This protein consists of 585 amino acids in a single polypeptide chain, with a heart-shaped structure composed of three main domains that are loosely joined together through physical forces and six subdomains that are wrapped by 17 disulfide bonds, as revealed by its crystal structure. The disulfide bridges impart rigidity to the helical, globular structure but provide enough flexibility to allow the protein to undergo conformational changes in response to variations in the surrounding medium (Lee 2015). The one free —SH group facilitates dimerization, and influences higher-order association with itself or other proteins. This single exposed —SH (aa34) can also be used to attach cargo to HSA in a specific manner that results in a homogeneous product. Additional unique targeting could be achievable via the lysine-199; and slightly more heterogeneously by coupling to histidine-242/247, and lastly to histidine 288 (Liu 2012). Therefore, product homogeneity can be accomplished by specific conjugation to cysteine-34, or lysine-199. The same aptamer could be attached to both the cys-34 and the lys-199, or a bispecific enonomer could be created by conjugating one aptamer to cys-34 and a different aptamer to lys-199. This can be accomplished because each of cysteine, lysine and histidine has different chemistries for conjugating to an aptamer.

For conjugation of an aptamer to cysteine, or lysine, the functional groups that can be used are shown in FIG. 10. The chemistry that can be used is well known in the art (for example, Current Protocols in Nucleic Acid Chemistry 2000; Gold 2010; Ni 2017).

Thus, an aptamer which binds to a target (e.g., an antigen) is chemically bound to the cysteine-34 of HSA molecule to form an enonomer. It is contemplated that the half-life of this enonomer is substantially increased allowing for therapeutic treatment of a subject.

Additionally, a first aptamer which binds to a first antigen is chemically bound to the cysteine-34 and a second aptamer which binds to a second antigen is chemically bound to the lysine-199 of a HSA molecule to form a bispecific enonomer. It is contemplated that the half-life of this bispecific enonomer is substantially increased allowing for therapeutic treatment of a subject.

Example 4: Specific Blockade of TNFR1 and TNFR2

Blockers of TNF-α have been tremendously successful in the treatment of autoimmune disease, both for patients (Monaco 2015), and for pharmaceutical companies (US$43, 394.4 Mn in 2017, Credence Research 2018)

Tumor necrosis factor-alpha (TNF-α) was initially thought to be a mediator of cachexia (Torigoe 1988), and a tumor cytotoxic cytokine (Carswell-Richards 2012). Later, once the enthusiasm for TNF-α as a cancer therapeutic was tempered by high toxicity and little efficacy, Feldmann and colleagues discovered it was an important mediator of chronic inflammation, particularly in rheumatoid arthritis (Monaco 2015). In parallel work, Shepard, Schreiber and colleagues found that the principal origin of TNF-α was macrophages, and that it had an early role in preventing tumor progression (Urban 1986). However, tumors often escape from TNF-α inhibition (Urban op cit), and when they do, their growth is actually stimulated by this cytokine (Lewis 1987). This effect is possibly mediated by TNFR2.

It is now known that there is a family of TNF receptors (TNFRs), the TNFR super family (TNFSFRs), with more than 27 members (Croft 2013). These receptors have diverse roles in the immune response, and different (and sometimes overlapping) sets of ligands activate the TNFRSF of receptors. FIG. 11 shows a list of TNFRSF members (left column), an exon-intron map (second column), and the ligand-receptor interactions. The black lines (third column) connect TNFR ligands to one or more TNF receptors (fourth and fifth columns).

The difficulty of blocking a single ligand-receptor pair is shown in FIG. 11. For instance, TNF-α (or TNF1) binds to TNFSFR1, 2 and 14 (Magis 2012). Because each of these receptors has a different biology (chronic inflammation, TNFR1; stimulation of tumor cell growth and immunosuppression, TNFR2; and T cell survival, TNFR14), there are likely unwanted side effects which occur as a result of non-specific TNF-α blockade. For instance, rare infectious diseases are reported in patients being treated with TNF-blockers (more description is provided below). This could be the result of immune suppression occurring by inhibition of TNFSFR2 and/or TNFSFR14. In fact, because there are a multitude of interactions that could occur because of the blockade of a common ligand (e.g., TNF-α) it is unclear how to predict the outcome of blanket inhibition by total blockade of TNF-α binding to its receptors. However, it is known that there is evidence for immunosuppression, increased risk of serious infections leading to hospitalization or death, including tuberculosis (TB), bacterial sepsis, invasive fungal infections (such as histoplasmosis), and infections due to other opportunistic pathogens. Lymphoma and other malignancies, some fatal, have been reported in children and adolescent patients treated with TNF blockers (Connor 2011). Post-marketing cases of hepatosplenic T-cell lymphoma (HSTCL), a rare type of T-cell lymphoma, have occurred in adolescent and young adults with inflammatory bowel disease treated with TNF blockers (Humira®/adalimumab Package Insert). These effects were not seen in animal models. Thus, single receptor blockade is likely to have a more predictable outcome. This idea is supported by the experimental use of monoclonal antibodies in preclinical models that specifically inhibit TNFSFR1 or TNFSFR2 (Sheng 2018, Hu 2014, Williams 2014). Despite the promising results obtained in these mouse models with TNFR1 vs. TNFR2 inhibition, the experience with non-specific TNF blockers teaches that the data cannot be extended to humans because the pathways activated by TNF-α, and which express TNFR1 or 2, are significantly different (Placke 2010). Thus, it is not obvious whether all receptor-specific effects seen in mice will translate to humans, since these side effect diseases were not seen in mouse models. Most critical for the diverse biological effects of the two receptor subtypes is the lack of the intracellular death domain in TNFR2. Hence, TNF promotes apoptosis via binding to TNFR1 but exerts pro-survival effects via TNFR2 (4, 5, 13).

An engineered antagonist for the TNFR may be based upon TNF-α blockade (non-specific), or interfering with receptor activation (can be made specific for each receptor subtype). FIG. 8 and its description provide a summary of how TNF-α (a trimer of TNF-α forms the ligand for the TNFR) binds to the TNFR, forming a receptor trimer, and induces signaling and internalization.

Thus, tumor necrosis factor (TNF) is an inflammatory cytokine that has important roles in various immune responses, which are mediated through its two receptors, TNF receptor 1 (TNFR1) and TNFR2. Antibody-based therapy against TNF (ligand for both receptors) is used clinically to treat several chronic autoimmune diseases; however, such treatment sometimes results in serious side effects, including cancers. The second receptor for TNF is TNFR2. The current approved TNF blockers all prevent binding of TNF to both receptors. A number of side effect illnesses are associated with 'starving' TNFR2 of TNF. These include serious infections such as tuberculosis and fungal infections, in addition, lymphoma and other malignancies (FDA 2011). Through the tumor necrosis factor (TNF) receptor type II (TNFR2), TNF preferentially activates, expands, and promotes the phenotypic stability of CD4+Foxp3+ regulatory T (Treg) cells. Thus, blocking TNFR2 can enhance immunity by reducing activated Treg cells. For these reasons, a specific inhibitor of TNFR1 is needed.

In the example of overexpressed receptors in disease the approach described herein can be employed. In other cases the targeted receptor may not be overexpressed. Examples are TNFR1 and TNFR2. Targeted therapeutics like infliximab, or ligand traps like etanercept, neutralize TNF and block TNFR1 and TNFR2. This is a problem because TNFR1 signals through an inflammatory and apoptotic pathway, while TNFR2 signals to enhance anti-inflammatory signals via proliferation of regulatory T cells (Tregs), and cellular proliferation, as in fibrosis. Thus, inhibition of TNFR2 actually enhances autoimmune disease by suppressing proliferation of Tregs (FIG. 5). TNF plays a critical role in upregulation or downregulation of Treg activity, via TNFR2. An ideal therapeutic strategy for autoimmune diseases would be to selectively block the TNFR1, while keeping the TNFR2 signaling pathway intact (to retain Treg activity). An opposite goal would be to selectively stimulate TNFR2 to enhance Treg proliferation, as a way of suppressing autoimmune disease. Design of these therapeutic strategies targeting the TNFR1 or TNFR2 signaling pathways holds promise for the treatment of diverse inflammatory diseases. In cancer, cancer specific inhibition of TNFR2 will suppress Tregs, and allow synergy with immunotherapies (Mocellin 2008, Sheng 2018). The purpose of this invention is to use enonomer technology to specifically block TNFR1 (for treatment of autoimmune disease), to block TNFR2 to inhibit fibrosis (treat diseases like Dupuytren's contracture or lung fibrosis), to specifically activate TNFR2 to suppress autoimmunity via increased proliferation of Treg cells, or to specifically inhibit TNFR2 to enhance immunity, as would be advantageous in combination with checkpoint inhibitors in the treatment of cancer.

Multimerization of either TNFR1 or TNFR2 can be induced by TNF, or by bivalent antibodies which induce dimer formation. There is also spontaneous (non-signaling) assembly of receptors mediated by the PLAD (Pre-signaling Ligand Activation Domain, which can then be stabilized by TNF ligand binding. For these reasons a bivalent antibody is not the preferred means of blocking TNFR signaling. The region of TNFR1 that is critical for ligand binding includes amino acids 1-70 of the mature protein, and in particular cysteine-rich domain 1 and the first few amino acids of cysteine-rich domain 2 (Zettlitz 2010).

Because the problem with bivalent antibodies is unwanted clustering, a monovalent inhibitor is needed. A monovalent Fab vs. TNFR1 did not have sufficient affinity to compete with TNF binding to the receptor (TNF binding to TNFR1 is $1.9 \times 10^{-11}$ M; Zettlitz 2010, Grell 1998). Instead a bivalent Mab was needed, which introduces the potential issue of unwanted multimerization of TNFR1. Aptamers are a good choice for creating TNF/TNFR 1 inhibitors because they can be selected to have affinities for target in the pM range (i.e., $10^{-12}$ M, Kimoto 2013; Gawande 2017), which is sufficient to compete TNF binding to its receptor. The very high affinity was achieved by including modifications of two bases to increase library diversity (FIG. 1C and Gawande 2017). The work flow for creating an efficient aptamer-based antagonist for TNF binding is described in work flows 3 and 4. The identification of a candidate aptamer will be carried out as described in this application. This effort will require (more) multiple rounds of SELEX in order to identify an aptamer with Kd in the picomolar binding range.

TNF/TNFR2 antagonism results in enhanced immunity by suppressing regulatory T cell activity. The structures of complexes of other TNF-TNFR superfamily proteins have been solved, and these reports suggest that the structural features that were described for the TNF-TNFR1 complex are common to other TNF-TNFR superfamily members. In particular, the importance of the PLAD domain and the cysteine-rich domains. Thus, it is likely that the same approach described above for creating a specific aptamer-based anti-TNFR1 can also be used for TNFR2. FIG. 11 provides a drawing of how a successful enonomer will work.

Recent data suggest that activity of TNFR2 is required to quell autoimmune disease (Atretkhany 2018). Thus, it is important to retain function of TNFR2, but also the agonist activity against this receptor would be useful in expanding antigen specific regulatory T cells. In addition, TNFR2 function is needed for optimal NK cell anticancer activity (Xu 2007). This can be accomplished by stabilizing the preexisting TNFR2 multimers on the surface of the cell. To accomplish this, 30-40 kDa branched PEG will be employed as described in FIG. 6B. Trivalent or quadrivalent PEG molecules will be tagged with a TNFR2 aptamer that binds at the N-terminal PLAD domain to facilitate bringing the PLAD domains together to form a signaling TNFR2.

Work-flow 3: Work-flow to Create an Anti-TNF Enonomer:
1) Aptamer library (Gupta 2017) or from commercially available sources (see Work-flow 2);
2) Repeated selection vs. immobilized protein including aa1-70 of TNFR1 fused with a peptide linker, and IgG1Fc. IgG1-Fc (Ashkenazi 1997, Czajkowsky 2012). The fusion protein can be immobilized on magnetic beads, on a Protein A/G column, or other methods well known in the art (e.g., Kangwa 2019);
3) Aptamers with affinity of <100pM (pM=$10^{-12}$ M) will be tested for competition with biotinylated TNF binding to TNFR1:Fc (available from AB Biosciences (Concord, MA);
4) Candidates will be tested for affinity to Human TNFR1 expressed on mouse 3T3 cells where the endogenous TNFR's are inactivated using CRISPR (service available from GenScript® (Piscataway, NJ)). Human TNFR1 and TNFR2 can then be inserted into the TNFR-negative background. Because the background TNFR signaling has been eliminated, it will be easy to measure TNF reactivity on cells by monitoring cytotoxicity (3T3 cells are killed by TNF-α), which is TNFR1 specific (Thermo Fisher Scientific 2019);
5) The 5' end of the aptamers will be conjugated to unmodified branched PEG (branched 2·20kDa N-hydroxysuccinimide ester; JenKem Technology (Plano, TX)) through a 5'-photocleavable amino modifier (Glen Research™ (Sterling, VA). A person of ordinary skill in the art would be able to perform this step in view of the disclosure herein and related publications such as Gupta 2017) or with products available from commercial vendors such as TriLink® Biotech (San Diego, CA);
6) PEG: 5'-aptamer conjugate is then used in animal studies to evaluate efficacy vs. rheumatoid arthritis (Keffer 1991).

Work-flow 4: Methods of Measuring Inhibition of TNFR1/2, Solving the Problem of Signaling Convergence:
1) Endogenous murine TNFR1 and TNFR2 are inactivated by insertion of a non-sense DNA fragment using CRISPR;
2) Transfect human TNFR1 or TNFR2 into 3T3-murine TNFR inactivated cells;
3) These cells will respond to TNF only via the human TNFR1, or the human TNFR2, so stimulation by TNF can be monitored independently and can be assayed at any point in the signaling pathway, thus, enabling:
    a. Receptor binding competition assays (ability of aptamers and enonomers to compete with TNF) on either of the intact receptors separately in vitro on cell lines;
    b. Monitor ligand induced caspases, or elements of the pathway.

Experimental design: The purpose of this example is to create an effective and specific antagonist of the TNFR1 in order to specifically treat chronic inflammatory and autoimmune diseases. The antibodies that have been tested for this purpose are limited in efficacy because they recognize only one epitope (per arm of the antibody) in the extracellular domain of TNFR1. This approach is now known to have limitations as compared to "2-epitope" binding (Jacobsen 2015; Nahta 2004), which results in rapid receptor internalization and degradation. To accomplish this, a human serum albumin is created having aptamers each recognizing a different aptamer epitope in the extracellular cysteine-rich (ligand binding) domains of TNFR1, which are largely responsible for TNFR1 multimerization. A simultaneous targeting of two different epitopes with two different aptamers bound together was successfully demonstrated by Zheng et al. (2017). However, instead of binding two different receptors together like in Zheng, herein two non-overlapping aptamers are selected against the cysteine-rich domain 1 (CDB1) of the TNFR1 extracellular domain. This domain of the TNFRs is the most critical for ligand activation (Branschadel 2010). The enonomers to be formed are contemplated to inhibit activation of TNFR1, or other receptors that require multimerization for activation. There are also cases where dimerization results in receptor deactivation (Chang 2016).

Aptamer Selection

Aptamers are selected that bind to the CRD1 of the TNFR1. First, the CRD1 region, together with an appropriate secretion signal peptide, are cloned and fused with IgG1:Fc to create a TNFR1-CBD1 immunoadhesin. For this purpose, the CRD1 region will be considered to be amino acids 43-82 (aa43-82) (see, FIG. 12, grey highlight, and, also, SEQ ID NO:2). The CRD1-immunoadhesin is expressed and purified from a mammalian expression system, as is well known in the art (Current Protocols in Molecular Biology 1988). An affinity column is prepared from the CRD1-immunoadhesin and it will be used for selecting two non-overlapping CRD-1 binding aptamers, a process called SELEX (as described by Darmostuk 2015; and Current Protocols in Nucleic Acid Research 2000, Gold 2010). A pictorial image of the Selex process is shown in FIG. 13. In short, an initial oligonucleotide pool is incubated, and aptamer-target complexes are formed. The unbound sequences are separated from the aptamer-target sequences and then the target-bound sequences are amplified. The process is then repeated with the targets-bound sequences only (i.e. not an oligonucleotide pool). This provides aptamers which bind to the CRD1 of the TNFR1.

Other selection methods may be used, as described in Darmostuk 2015.

Additionally, purified TNFR1 extracellular domain may be used in an ELISA or Octet format to test binding of CRD1 aptamers, either free aptamers or aptamers conjugated to human serum albumin. The same assays can be used to measure competition between the aptamers, to be sure that they are non-overlapping. In addition, similar assays can be used to measure whether CRD1-aptamers compete with TNF-α ligand, which is an important property of the successful aptamers.

The ability of the TNFR1 enonomer to inhibit signaling by TNFR1 can be measured by assay of caspase 8 activation, increased phospho-JNK, and cellular cytotoxicity (Ma 2014).

Aptamer-Human Serum Albumin Formation

As discussed above, aptamers are characterized by having a short serum half-life when administered in vivo (Nimjee 2017). To overcome this obstacle in this example, the free 5' end of the aptamer selected above will be conjugated to the single free cysteine of human serum albumin to form an enonomer thereby increasing the serum half-life compared to the aptamer alone. Polyethylene glycol (PEG) 'spacers' will be conjugated with this free cysteine, as shown in FIG. 15. Different spacer lengths are employed to maximize interaction of the anti-CRD-1 aptamers with CRD-1.

The conjugation process shown in FIG. 15A is used to attach the PEG linker to cysteine-34 of HSA.

The complementary region (spacer) shown in FIG. 15B can be any length, depending upon the distance between the two targets defined by Aptamer 1 and Aptamer 2. If the targeted regions are very close together (for instance, both bind in CRD-1 of the TNFR1), then the spacer is shortened to enhance intramolecular interactions. If the two targets are on two different proteins, then both the PEG linker and the spacer can be made longer.

In some instances it is desired to specifically block TNF-α binding to the TNFR1. This may be accomplished by determining the non-overlapping aptamers that bind to CRD1 (cysteine rich domain-1) of the human TNFR1 using the methods provided above. The CRD-1 domain has been shown to be essential for ligand binding (TNF-α or TNF-β). By blocking CRD-1 with overlapping aptamers (each with nanomolar affinity) the therapeutic molecule will have a high avidity for CRD-1 (less than nanomolar) such that it will block proper binding by TNF-α to TNFR1, but not TNFR2. The aptamers will not bind to TNFR2. This is important because, as discussed above, TNFR1 signals are associated with autoimmune and inflammatory diseases, while tumor necrosis factor receptor 2 (TNFR2) is an inducer of Treg expansion. Expansion of Treg function can contribute to the blunting of autoimmune disease (Vanamee 2018, Williams 2016).

Results

An enonomer is created as described above comprising two aptamers (each of which target the CRD-1 of the TNFR1) linked together by a complementary region, and one of the aptamers is conjugated to a PEG linker which is conjugated to the cysteine-34 of HSA. This enonomer is contemplated to inhibit of activation of TNFR1.

Additionally, an in vivo assay is performed in a collagen induced arthritis model with this enonomer. Although the CRD1 aptamers are human there is a high degree of homology between the CDR1 of human and mouse (about 80%), while the overall homology between mouse and human TNFR1 is only 65%. Furthermore, because the CRD1 is a conformation based protein domain, it is substantially more likely that the human aptamers will work in a mouse system. Specifically, the enonomer is administered to a mouse model for rheumatoid arthritis which uses immunodeficient mice, reconstituted with a human immune system via CD34+ stem cell transplant (Misharin 2012). The enonomer is contemplated to treat rheumatoid arthritis in the model.

Example 5: MMP

Cancer and other diseases mediated in part by degradation of structural proteins, such as collagen, by MMP-14 (also known as MT-MMP1), or related enzymes are important mechanisms for cellular invasion and tissue destruction, especially in malignancy or arthritis. The aptamer of this example may be conjugated, or otherwise bound, to HSA or other suitable carrier, and optionally polyethylene glycol (PEG). It is contemplated that the aptamer will inhibit MMP activity by (a) binding in the enzyme active site, (b) binding to a distant site that disrupts proper formation of the active site (conformational inhibition), (c) interfering in conversion of the pre-protein form of MT1-MMP into the mature protease, (d) by inhibiting dimerization of MMP-14. Although MMP14 is the initial focus, it is understood that other MMPs can have a role in malignancy and autoimmune disease, and can be targeted in the same way. However, because MMPs have roles in many normal processes (Tokito 2016), specificity for anti-MMP14 is required. The advantage of aptamer-based candidate therapeutics is that the diversity of potential structures is much greater than with antibodies, even phage display. The greater diversity of an aptamer library increases the possibility of obtaining specific inhibitors of the targeted MMP. High throughput assays may be used to test both activity and specificity. Assays to accomplish this are described in Lopez 2017, and Paladini 2013. An example of such an assay, and description of other related assays, is shown in FIG. 16.

Recombinant MMP14 can be purchased commercially from sources such as (Thermo Fisher Scientific, Massachusetts). In addition, complete reagent kits for measuring MMP-14 via FRET may also be purchased (AnaSpec, California). MMP-14 activity can also be measured using a colorimetric assay (Enzo Life Sciences, New York). The principals of both assays are similar. Control MMP14 inhibitors are included in the kit, or can be purchased (Selleck Chemicals, Texas). These and other assays are well known in the art.

Example 6

It is contemplated that periodically administering a therapeutically effective amount of the aptamer-trastuzumab complex described in Example 1 to a patient suffering from breast cancer successfully treats such a patient.

Example 7

It is contemplated that periodically administering a therapeutically effective amount of the aptamer-trastuzumab complex described in Example 1 to a patient suffering from ovarian cancer successfully treats such a patient.

Example 8

It is contemplated that periodically administering a therapeutically effective amount of the aptamer-trastuzumab complex described in Example 1 to a patient suffering from uterine cancer successfully treats such a patient.

Example 9

It is contemplated that periodically administering a therapeutically effective amount of the aptamer-trastuzumab complex described in Example 1 to a patient suffering from non-small cell lung cancer successfully treats such a patient.

Example 10

It is contemplated that periodically administering a therapeutically effective amount of the aptamer-trastuzumab complex described in Example 1 to a patient suffering from gastric cancer successfully treats such a patient.

Example 11

It is contemplated that periodically administering a therapeutically effective amount of the CD3ε: anti-p95-HER2 enonomer described in Example 2 to a patient suffering from cancer and overexpressing p95-HER2 successfully treats such a patient.

Example 12

It is contemplated that periodically administering a therapeutically effective amount of the aptamer-serum globular protein complex described in Example 3 to a patient suffering from cancer successfully treats such a patient.

Example 13

It is contemplated that periodically administering a therapeutically effective amount of the anti-TNF aptamer-serum globular protein complex described in Example 4 to a patient suffering from rheumatoid arthritis successfully treats such a patient.

REFERENCES

Abdel-Latif M M et al. "Inflammation and esophageal carcinogenesis." Curr Opin Pharmacol. 2009 August; 9(4):396-404. PMID 19596608

Abdiche Y et al. "Determining kinetics and affinities of protein interactions using a parallel real-time label-free biosensor, the Octet." Anal Biochem. 2008 Jun. 15; 377 (2):209-17. PMID 18405656).

Alberts B et al. "Molecular Biology of the Cell." 4$^{th}$ edition. New York: Garland Science; 2002. Available from: https://www.ncbi.nlm.nih.gov/books/NBK1054/

American Cancer Society, Cancer Facts and Figures, 2017

Ancona E et al. "First-line chemotherapy improves the resection rate and long-term survival of locally advanced (T4, any N, M0) squamous cell carcinoma of the thoracic esophagus: final report on 163 consecutive patients with 5-year follow-up." Ann Surg. 1997 December; 226(6): 714-23; discussion 723-4. PMID 9409570

Arienti C et al. "Preclinical evidence of multiple mechanisms underlying trastuzumab resistance in gastric cancer." Oncotarget. 2016 Apr. 5; 7(14):18424-39. PMID: 26919099

Arribas J et al. "p95HER2 and breast cancer." Cancer Res. 2011 Mar. 1; 71(5):1515-9. PMID 21343397

Ashkenazi A and Chamow S M "Immunoadhesins as research tools and therapeutic agents." Curr Opin Immunol. 1997 April; 9(2):195-200. PMID 9099788

Atretkhany K N et al. "Intrinsic TNFR2 signaling in T regulatory cells provides protection in CNS autoimmunity." Proc Natl Acad Sci USA. 2018 Dec. 18; 115(51): 13051-13056. PMID:30498033

Black J D et al. "PIK3C A oncogenic mutations represent a major mechanism of resistance to trastuzumab in HER2/ neu overexpressing uterine serous carcinomas." Br J Cancer. 2015 Sep. 29; 113(7):1020-6. PMID 26325104

Bonifant C L et al. "Toxicity and management in CAR T-cell therapy." Mol Ther Oncolytics. 2016 Apr. 20; 3:16011. PMID 27626062

Boston University Biology, "NF-kB Target Genes", www.b-u.edu/nf-kb/gene-resources/target-genes, accessed Feb. 7, 2019.

Branschädel M et al. "Dual function of cysteine rich domain (CRD) 1 of TNF receptor type 1: conformational stabilization of CRD2 and control of receptor responsiveness." Cell Signal. 2010 March; 22(3):404-14. PMID:19879354

Browne B C et al. "HER-2 signaling and inhibition in breast cancer." Curr Cancer Drug Targets. 2009 May; 9(3):419-38. 19442060

Burris H A "Trastuzumab Emtansine (T-DM1): Hitching a Ride on a Therapeutic Antibody." Am Soc Clin Oncol Educ Book. 2012:159-61. PMID: 24451727

Carpenter S L "Evaluating for suspected child abuse: conditions that predispose to bleeding." Pediatrics. 2013 April; 131(4):e1357-73. PMID 23530171

Carswell-Richards E A and Williamson B D "A man of vision and the discovery of tumor necrosis factor." Cancer Immun. 2012; 12:4. Epub 2012 May 1. PMID 22896749

Castellarin et al. Gene Ther. 2018 Jun.; 25(3):165

Chaganty B K R et al. "Trastuzumab upregulates PD-L1 as a potential mechanism of trastuzumab resistance through engagement of immune effector cells and stimulation of IFNγ secretion." Cancer Lett. 2018 Aug. 28; 430:47-56. PMID 29746929

Chang V T et al. "Initiation of T cell signaling by CD45 segregation at 'close contacts'." Nat Immunol. 2016 May; 17(5):574-582. PMID: 26998761

Chen K H et al. "Novel anti-CD3 chimeric antigen receptor targeting of aggressive T cell malignancies." Oncotarget. 2016 Aug. 30; 7(35):56219-56232. PMID 27494836

Connor V "Anti-TNF therapies: a comprehensive analysis of adverse effects associated with immunosuppression." Rheumatol Int. 2011 Mar.; 31(3):327-37. PMID 20013267

Credence Research "Tumor Necrosis Factor (TNF) Inhibitors Market is Expected to Reach U S$181,139.7 Million By 2026. Apr. 30, 2018 globenewswire.com/news-release/2018/04/30/1489866/0/en/Tumor-Necrosis-Factor-TNF-Inhibitors-Market-is-Expected-to-Reach-US-181-139-7-Million-By-2026-Credence-Research.html Croft M et al. "Clinical targeting of the TNF and TNFR superfamilies." Nat Rev Drug Discov. 2013 Feb.; 12(2): 147-68. PMID 23334208

Current Protocols in Immunology, Online ISSN:1934-368X, Wiley. Publication Start Year: 1992

Current Protocols in Molecular Biology, Online ISSN:1934-3647, Wiley. Publication Start Year: 1988

Current Protocols in Nucleic Acid Chemistry, Online ISSN: 1934-9289, Wiley and Sons, Publication Start Year: 2000

Curry S "Beyond expansion: structural studies on the transport roles of human serum albumin." Vox Sang. 2002 August; 83 Suppl 1:315-9. PMID 12617161

Czajkowsky D M et al. "Fc-fusion proteins: new developments and future perspectives." EMBO Mol Med. 2012 Oct.; 4(10):1015-28. PMID 22837174

Damen C W et al. "Electrospray ionization quadrupole ion-mobility time-of-flight mass spectrometry as a tool to distinguish the lot-to-lot heterogeneity in N-glycosylation profile of the therapeutic monoclonal antibody trastuzumab." J Am Soc Mass Spectrom. 2009 November; 20(11):2021-33. PMID:19744865

Darmostuk M et al. "Current approaches in SELEX: An update to aptamer selection technology. Biotechnol Adv. 2015 Nov. 1; 33(6 Pt 2):1141-61. PMID 25708387

Dennler, Antibodies 2015, 4(3), 197-224.

Dhanasekharan et al. Bioprocess International, Nov. 28, 2018

Ebbing E A et al. "ADAM10-mediated release of heregulin confers resistance to trastuzumab by activating HER3." Oncotarget. 2016 Mar. 1; 7(9):10243-54. PMID 26863569

FDA Sep. 7, 2011, "FDA Drug Safety Communication: Drug labels for the Tumor Necrosis Factor-alpha (TNFα) blockers now include warnings about infection with Legionella and Listeria bacteria" www.fda.gov/Drugs/DrugSafety/ucm270849.htm Figueroa-Magalhães M C et al. "Treatment of HER2-positive breast cancer." Breast. 2014 April; 23(2):128-136. PMID 24360619

Fouad T M et al. "The role of inflammation in inflammatory breast cancer." Adv Exp Med Biol. 2014; 816:53-73. PMID 24818719

Gawande B N et al. "Selection of DNA aptamers with two modified bases." Proc Natl Acad Sci USA. 2017 Mar. 14; 114(11):2898-2903 PMID: 28265062

Ghinea et al. Endocrinology. 2018 Sep. 1; 159(9):3268

Gianni L et al. "5-year analysis of neoadjuvant pertuzumab and trastuzumab in patients with locally advanced, inflammatory, or early-stage HER2-positive breast cancer (NeoSphere): a multicentre, open-label, phase 2 randomised trial." Lancet Oncol. 2016 Jun.; 17(6):791-800. PMID 27179402

Giorgi M E et al. "Carbohydrate PEGylation, an approach to improve pharmacological potency." Beilstein J Org Chem. 2014 Jun. 25; 10:1433-44. PMID: 24991298

Gold L et al. "Aptamer-based multiplexed proteomic technology for biomarker discovery." PLoS One. 2010 Dec. 7; 5(12):e15004. unencumbered by our incomplete knowledge of biology, thereby helping to advance the next generation of evidence-based medicine. PMID: 21165148

Grell M et al. "The type 1 receptor (CD120a) is the high-affinity receptor for soluble tumor necrosis factor." Proc Natl Acad Sci USA. 1998 Jan. 20; 95(2):570-5. PMID:9435233

Gupta S et al. "Pharmacokinetic Properties of DNA Aptamers with Base Modifications." Nucleic Acid Ther. 2017 December; 27(6):345-353. PMID 28961063

Hartmann J et al. "Clinical development of CAR T cells-challenges and opportunities in translating innovative treatment concepts." EMBO Mol Med. 2017 September; 9(9):1183-1197. PMID: 28765140

Hasegawa H et al. "Methods for Improving Aptamer Binding Affinity." Molecules. 2016 Mar. 28; 21(4):421. PMID: 27043498

Hatfield S M and Sitkovsky M "A2A adenosine receptor antagonists to weaken the hypoxia-HIF-1α driven immunosuppression and improve immunotherapies of cancer." Curr Opin Pharmacol. 2016 August; 29:90-6. PMID: 27429212

Heo K et al. "An aptamer-antibody complex (oligobody) as a novel delivery platform for targeted cancer therapies." J Control Release. 2016 May 10; 229:1-9. PMID 26956592

Hsu H et al. "TRADD-TRAF2 and TRADD-FADD interactions define two distinct TNF receptor 1 signal transduction pathways." Cell. 1996 Jan. 26; 84(2):299-308. PMID:8565075

Hu X et al. "Transmembrane TNF-α promotes suppressive activities of myeloid-derived suppressor cells via TNFR2." J Immunol. 2014 Feb. 1; 192(3):1320-31. PMID 24379122

Jacobsen H J et al. "Pan-HER, an Antibody Mixture Simultaneously Targeting EGFR, HER2, and HER3, Effectively Overcomes Tumor Heterogeneity and Plasticity." Clin Cancer Res. 2015 Sep. 15; 21(18):4110-22. PMID: 25908781

Jiang D et al. "The prognostic value of EGFR overexpression and amplification in Esophageal squamous cell Carcinoma." BMC Cancer. 2015 May 8; 15:377. PMID: 25953424

Jin P et al. "Rational optimization of a bispecific ligand trap targeting EGF receptor family ligands." Mol Med. 2009 Jan.-Feb.; 15(1-2):11-20. PMID 19048033

Kangwa M et al. "An engineered Staphylococcal Protein A based ligand: Production, characterization and potential application for the capture of Immunoglobulin and Fc-fusion proteins." Protein Expr Purif. 2019 Mar.; 155:27-34. PMID 30445097

Keffer J et al. "Transgenic mice expressing human tumour necrosis factor: a predictive genetic model of arthritis." EMBO J. 1991 Dec.; 10(13):4025-31. PMID: 1721867

Keir S T et al. "Sym004-induced EGFR elimination is associated with profound anti-tumor activity in EGFRvIII patient-derived glioblastoma models." J Neurooncol. 2018 July; 138(3):489-498

Kimoto M et al. "Generation of high-affinity DNA aptamers using an expanded genetic alphabet." Nat Biotechnol. 2013 May; 31(5):453-7. PMID:23563318

Khattabi A M et al. "The effect of polymer length on the in vitro characteristics of a drug loaded and targeted silica nanoparticles." Saudi Pharm J. 2018 November; 26(7): 1022-1026. PMID: 30416358

Klinger M et al. "Immunopharmacologic response of patients with B-lineage acute lymphoblastic leukemia to continuous infusion of T cell-engaging CD19/CD3-bispecific BITE antibody blinatumomab." Blood. 2012 Jun. 28; 119(26):6226-33. PMID:22592608

Kulkarni A et al. "Cationic α-cyclodextrin:poly(ethylene glycol) polyrotaxanes for siRNA delivery." Mol Pharm. 2013 Apr. 1; 10(4):1299-305. PMID: 23398604

Law C L et al. "Expression and characterization of recombinant soluble human CD3 molecules: presentation of antigenic epitopes defined on the native TCR-CD3 complex." Int Immunol. 2002 April; 14(4):389-400. PMID 11934875

Lee P and Wu X "Review: modifications of human serum albumin and their binding effect." Curr Pharm Des. 2015; 21(14):1862-5. PMID 25732553

Lewis G D et al. "Differential responses of human tumor cell lines to anti-p185HER2 monoclonal antibodies." Cancer Immunol Immunother. 1993 September; 37(4):255-63. PMID 8102322

Lewis Phillips G D et al. "Targeting HER2-positive breast cancer with trastuzumab-DM1, an antibody-cytotoxic drug conjugate." Cancer Res. 2008 Nov. 15; 68(22):9280-90. PMID 19010901

Lewis G D et al. "Modulation of the growth of transformed cells by human tumor necrosis factor-alpha and interferon-gamma." Cancer Res. 1987 Oct. 15; 47(20):5382-5. PMID: 2820567

Li G et al. "Mechanisms of Acquired Resistance to Trastuzumab Emtansine in Breast Cancer Cells." Mol Cancer Ther. 2018 Jul.; 17(7):1441-1453. PMID 29695635

Lin L et al. "A HER2 bispecific antibody can be efficiently expressed in *Escherichia coli* with potent cytotoxicity." Oncol Lett. 2018 Jul.; 16(1):1259-1266.

Liu F et al. "Recent advances on the development of pharmacotherapeutic agents on the basis of human serum albumin." Curr Pharm Des. 2015; 21(14):1866-88. PMID 25732552

Liu Q et al. "The reactivity of human serum albumin toward trans-4-hydroxy-2-nonenal." J Mass Spectrom. 2012 April; 47(4):411-24. PMID 22689617

Löffler A et al. "A recombinant bispecific single-chain antibody, CD19×CD3, induces rapid and high lymphoma-directed cytotoxicity by unstimulated T lymphocytes." Blood. 2000 Mar. 15; 95(6):2098-103. PMID: 10706880

Lopez T et al. "Identification of highly selective MMP-14 inhibitory Fabs by deep sequencing." Biotechnol Bioeng. 2017 June; 114(6):1140-1150. PMID 28090632

Ma L et al. "A novel small-molecule tumor necrosis factor α inhibitor attenuates inflammation in a hepatitis mouse model." J Biol Chem. 2014 May 2; 289(18):12457-66. PMID 24634219

Magis C et al. "An improved understanding of TNFL/TNFR interactions using structure-based classifications." Trends Biochem Sci. 2012 September; 37(9):353-63. PMID: 22789664 Marquardt C R "Inflammations, tumors and cell life; an explanation." Urol Cutaneous Rev. 1947 June; 51(6):317-21. PMID 20256873

Maude S L et al. "Tisagenlecleucel in Children and Young Adults with B-Cell Lymphoblastic. Leukemia." N Engl J Med. 2018 Feb. 1; 378(5):439-448. PMID: 29385370

Misharin A V et al. "Development of a new humanized mouse model to study acute inflammatory arthritis." J Transl Med. 2012 Sep. 13; 10:190. PMID 22974474

Mitri Z et al. "The HER2 Receptor in Breast Cancer: Pathophysiology, Clinical Use, and New Advances in Therapy." Chemother Res Pract. 2012; 2012:743193. PMID: 23320171

Mocellin S and Nitti D "TNF and cancer: the two sides of the coin." Front Biosci. 2008 Jan. 1; 13:2774-83. PMID: 17981752

Monaco C et al. "Anti-TNF therapy: past, present and future." Int Immunol. 2015 Jan.; 27(1):55-62. PMID: 25411043

Morandi A et al. "RET in breast cancer: functional and therapeutic implications." Trends Mol Med. 2011 Mar.; 17(3):149-57. PMID:21251878

Morita Y et al. "Aptamer Therapeutics in Cancer: Current and Future." Cancers (Basel). 2018 Mar. 19; 10(3). PMID 29562664

Morgan R A et al. "Case report of a serious adverse event following the administration of T cells transduced with a chimeric antigen receptor recognizing ERBB2." Mol Ther. 2010 April; 18(4):843-51. PMID:20179677

Möker et al. "Antibody Selection for Cancer Target Validation of FSH-Receptor in Immunohistochemical Settings" Antibiotics 2017, 6, 15

Mukai Y et al. "Solution of the structure of the TNF-TNFR2 complex." Sci Signal. 2010 Nov. 16; 3(148):ra83. PMID 21081755

Nahta R et al. "The HER-2-targeting antibodies trastuzumab and pertuzumab synergistically inhibit the survival of breast cancer cells." Cancer Res. 2004 Apr. 1; 64(7):2343-6. PMID:15059883

Nieto T et al. "Epigenetic biomarkers in progression from non-dysplastic Barrett's oesophagus to oesophageal adenocarcinoma: a systematic review protocol." BMJ Open. 2016 Dec. 7; 6(12). PMID 27927666

Ni S et al. "Chemical Modifications of Nucleic Acid Aptamers for Therapeutic Purposes. Int J Mol Sci. 2017 Aug. 2; 18(8). PMID 28767098

Nimjee S M et al. "Aptamers as Therapeutics." Annu Rev Pharmacol Toxicol. 2017 Jan. 6; 57:61-79. PMID 28061688

Ohman L et al. "A new antibody recognizing the vIII mutation of human epidermal growth factor receptor." Tumour Biol. 2002 Mar.-Apr.; 23(2):61-9. PMID: 12065843

Okita A et al. "Efficacy and Safety of Trastuzumab in Combination with S-1 and Cisplatin Therapy for Japanese Patients with HER2-Positive Advanced Gastric Cancer: Retrospective Analysis." Tohoku J Exp Med. 2018 June; 245(2):123-129. PMID:29937450

Paladini R D et al. "Mutations in the catalytic domain of human matrix metalloproteinase-1 (MMP-1) that allow for regulated activity through the use of Ca2+." J Biol Chem. 2013 Mar. 1; 288(9):6629-39. PMID 23322779

Papadimitriou K et al. "Follicle-Stimulating Hormone Receptor (FSHR): A Promising Tool in Oncology?" Mol Diagn Ther. 2016 December; 20(6):523-530. PMID: 27392476

Pegram M D et al. "Rational combinations of trastuzumab with chemotherapeutic drugs used in the treatment of breast cancer." J Natl Cancer Inst. 2004 May 19; 96(10): 739-49. PMID 15150302

Peters C and Brown S Biosci. Rep. 2015; 35:e00225

Perales-Puchalt, Clin Cancer Res. 2017 Jan. 15; 23(2):441

Placke T et al. "Glucocorticoid-induced TNFR-related (GITR) protein and its ligand in antitumor immunity: functional role and therapeutic modulation." Clin Dev Immunol. 2010; 2010:239083. PMID 20936139

Portell C A et al. "Clinical and pharmacologic aspects of blinatumomab in the treatment of B-cell acute lymphoblastic leukemia." Clin Pharmacol. 2013 Apr. 12; 5(Suppl 1):5-11.

Protocol Online® www.protocol-online.org/prot/Molecular_Biology

Pulusu SSR and Lawrance I C "Dysplasia and colorectal cancer surveillance in inflammatory bowel disease." Expert Rev Gastroenterol Hepatol. 2017 August; 11(8): 711-722. PMID 28475382

Roberts M J et al. "Chemistry for peptide and protein PEGylation." Adv Drug Deliv Rev. 2002 Jun. 17; 54(4): 459-76. PMID:12052709

Sanchez-De Melo I et al. "N-glycosylation profile analysis of Trastuzumab biosimilar candidates by Normal Phase Liquid Chromatography and MALDI-TOF MS approaches." J Proteomics. 2015 Sep. 8; 127(Pt B):225-33. PMID 25907685

Schietinger A et al. "A mutant chaperone converts a wild-type protein into a tumor-specific antigen." Science. 2006 Oct. 13; 314(5797):304-8. PMID:17038624

Sensi M et al. "Retinol binding protein: a short half life determinant of protein non enzymatic glycation in diabetes." Diabetes Res. 1990 Apr.; 13(4):195-8. PMID: 2134212

Shalaby M R et al. "Development of humanized bispecific antibodies reactive with cytotoxic lymphocytes and tumor cells overexpressing the HER2 protooncogene." J Exp Med. 1992 Jan. 1; 175(1):217-25. PMID: 1346155

Sheng Y et al. "TNF Receptor 2 Makes Tumor Necrosis Factor a Friend of Tumors." Front Immunol. 2018 May 28; 9:1170. PMID: 29892300

Shiokawa T et al. "Effect of polyethylene glycol linker chain length of folate-linked microemulsions loading aclacinomycin A on targeting ability and antitumor effect in vitro and in vivo." Clin Cancer Res. 2005 Mar. 1; 11(5):2018-25 PMID: 15756028

Singha N C et al. "Tumor-associated hyaluronan limits efficacy of monoclonal antibody therapy." Mol Cancer Ther. 2015 Feb.; 14(2):523-32. PMID 25512619

Sittampalam G S et al. "Assay Guidance Manual" Eli Lilly and Co. and the National Center for Advancing Translational Sciences, 2004)

Smith E J et al. "A novel, native-format bispecific antibody triggering T-cell killing of B-cells is robustly active in mouse tumor models and cynomolgus monkeys." Sci Rep. 2015 Dec. 11; 5:17943. PMID 26659273

Steffen T et al. "Recurrence Patterns and Long-term Results After Induction Chemotherapy, Chemoradiotherapy, and Curative Surgery in Patients With Locally Advanced Esophageal Cancer." Ann Surg. 2019 January; 269(1):83-87. PMID 28742685

Sugiyama A et al. "A semi high-throughput method for screening small bispecific antibodies with high cytotoxicity." Sci Rep. 2017 Jun. 6; 7(1):2862. PMID 28588218

Sun Z J "Mechanisms contributing to T cell receptor signaling and assembly revealed by the solution structure of an ectodomain fragment of the CD3 epsilon gamma heterodimer." Cell. 2001 Jun. 29; 105(7):913-23. PMID 11439187

Teplinsky E and Muggia F. "Targeting HER2 in ovarian and uterine cancers: challenges and future directions." Gynecol Oncol. 2014 November; 135(2):364-70. PMID: 25220628

Tolle F and Mayer G, Chem. Sci., 2013, 4, 60-67

Tokito A and Jougasaki M "Matrix Metalloproteinases in Non-Neoplastic Disorders." Int J Mol Sci. 2016 Jul. 21; 17(7). PMID: 27455234

Torigoe H et al. Therapeutic strategies for afatinib-resistant lung cancer harboring HER2 alterations." Cancer Sci. 2018 May; 109(5):1493-1502. PMID:29532558

Tracey K J et al. "Cachectin: a hormone that triggers acute shock and chronic cachexia." J Infect Dis. 1988 March; 157(3):413-20. PMID:3278061

Tran L S et al. "Regulation and functions of inflammasome-mediated cytokines in *Helicobacter pylori* infection." Microbes Infect. 2017 Sep.-Oct.; 19(9-10):449-458. PMID 28690082

Trinchieri G., Chapter 17, pp. 202, in Devita, Hellman, and Rosenberg's Cancer Principles & Practice of Oncology; 2011. $9^{th}$ edition Urban J L et al. "Tumor necrosis factor: a potent effector molecule for tumor cell killing by activated macrophages. Proc Natl Acad Sci USA. 1986 July; 83(14):5233-7. PMID 3487788

Van Landuyt et al. Curr Opin Biotechnol. 2018 Dec. 13; 60:17

Vanamee E S and Faustman D L "TNFR2: A Novel Target for Cancer Immunotherapy." Trends Mol Med. 2017 November; 23(11):1037-1046. PMID 29032004

Velasquez M P et al. "Redirecting T cells to hematological malignancies with bispecific antibodies." Blood. 2018 Jan. 4; 131(1):30-38. PMID:29118005

Vlahopoulos S et al. "Nuclear factor-kappaB-dependent induction of interleukin-8 gene expression by tumor necrosis factor alpha: evidence for an antioxidant sensitive activating pathway distinct from nuclear translocation." Blood. 1999 Sep. 15; 94(6):1878-89. PMID 10477716

Vu T and Claret F X "Trastuzumab: updated mechanisms of action and resistance in breast cancer." Front Oncol. 2012 Jun. 18; 2:62. PMID: 22720269

Wang F "Optimization of the Linker Length of Mannose-Cholesterol Conjugates for Enhanced mRNA Delivery to Dendritic Cells by Liposomes." Front Pharmacol. 2018 Sep. 5; 9:980. PMID: 30233368

Wang S et al. "N F-kappaB signaling pathway, inflammation and colorectal cancer." Cell Mol Immunol. 2009 Oct.; 6(5):327-34. PMID 19887045

Wang T et al. "Three decades of nucleic acid aptamer technologies: Lessons learned, progress and opportunities on aptamer development." Biotechnol Adv. 2019 January-February; 37(1):28-50. PMID: 30408510.

Yu et al., "Trastuzumab Glycan Batch-to-Batch Profiling using a UPLC/FLR/Mass Spectrometry Platform," Waters Corporation, Milford, MA, U.S. (2010).

Waybrant B et al. "Effect of polyethylene glycol, alkyl, and oligonucleotide spacers on the binding, secondary structure, and self-assembly of fractalkine binding FKN-S2 aptamer-amphiphiles." Langmuir. 2014 Jul. 1; 30(25): 7465-74. PMID 24849928

Wikipedia, "Systematic evolution of ligands by exponential enrichment" 2019 en.wikipedia.org/wiki/Systematic_evolution_of_ligands_by_exponential_enrichment, accessed Feb. 7, 2019.

Wilkinson DM. "Selection of aptamers for human serum albumin and its glycated form." Thesis for PhD in Chemistry at Imperial College, London, UK (2011).

Williams G S et al. "Phenotypic screening reveals TNFR2 as a promising target for cancer immunotherapy." Oncotarget. 2016 Oct. 18; 7(42):68278-68291. PMID 27626702

Williams S K et al. "Antibody-mediated inhibition of TNFR1 attenuates disease in a mouse model of multiple sclerosis. PLoS One. 2014 Feb. 28; 9(2):e90117. PMID 24587232

Wolter O and Mayer G "Aptamers as Valuable Molecular Tools in Neurosciences." J Neurosci. 2017 Mar. 8; 37(10): 2517-2523. PMID 28275062

Wortzel R D et al. "Independent immunodominant and immunorecessive tumor-specific antigens on a malignant tumor: antigenic dissection with cytolytic T cell clones." J Immunol. 1983 May; 130(5):2461-6. PMID: 6187859

ThermoFisher Scientific Publication, "TNF Signaling Pathway" www.thermofisher.com/us/en/home/life-science/antibodies/antibodies-learning-center/antibodies-resource-library/cell-signaling-pathways/tnf-signaling-pathway.html, accessed Feb. 7, 2019

Xu J et al. "Essential role of the TNF-TNFR2 cognate interaction in mouse dendritic cell-natural killer cell crosstalk." Blood. 2007 Apr. 15; 109(8):3333-41. PMID: 17164346

Youn Y S et al. "Carbohydrate-specifically polyethylene glycol-modified ricin A-chain with improved therapeutic potential." Int J Biochem Cell Biol. 2005 July; 37(7): 1525-33. PMID: 15833282

Zhang Y et al. "Biomacromolecules as carriers in drug delivery and tissue engineering." Acta Pharm Sin B. 2018 Jan.; 8(1):34-50. PMID: 29872621

Zheng J et al. "Simultaneous targeting of CD44 and EpCAM with a bispecific aptamer effectively inhibits intraperitoneal ovarian cancer growth." Theranostics. 2017 Mar. 23; 7(5):1373-1388. PMID: 28435472

Zhou J and Rossi J J et al. "Cell-type-specific, Aptamer-functionalized Agents for Targeted Disease Therapy." Mol Ther Nucleic Acids. 2014 Jun. 17; 3:e169. PMID: 24936916

Zettlitz K A et al. "ATROSAB, a humanized antagonistic anti-tumor necrosis factor receptor one-specific antibody." MAbs. 2010 Nov.-Dec.; 2(6):639-47. PMID: 20935477

Zuberbühler K et al. "Fucose-specific conjugation of hydrazide derivatives to a vascular-targeting monoclonal antibody in IgG format." Chem Commun (Camb). 2012 Jul. 18; 48(56):7100-2. PMID 22684082

What is claimed is:

1. A composition, comprising an enonomer, wherein:
the enonomer comprises: a) a carrier molecule, b) two or more aptamers, and c) a linker bound to the carrier molecule and to the two or more of the aptamers;
the carrier molecule is an antibody;
the antibody does not bind the same target as the two or more aptamers; and
the linker is a branched linker that is a branched PEG linked to the antibody and to the two or more aptamers.

2. The composition of claim 1, wherein the antibody is a human antibody or a humanized antibody.

3. The composition of claim 1, wherein the carrier molecule is an IgG1 or IgM antibody.

4. The composition of claim 1, wherein the linker is bound to the normal glycosylation site of the antibody.

5. The composition of claim 4, wherein the linker is bound to the normal glycosylation site of the antibody and chemically linked to the fucose residues embedded in the G0F and G1F glycan structures.

6. The composition of claim 5, wherein the linker is bound to the normal glycosylation site of the antibody and conjugated to the fucose residues embedded in the G0F and G1F glycan structures.

7. The composition of claim 1, wherein the antibody binds to HER2 on the surface of a tumor cell.

8. The composition of claim 1, wherein at least one of the aptamers bind to HER2 on the surface of a tumor cell.

9. The composition of claim 1, wherein at least one of the aptamers bind to a T cell CD3 activating receptor.

10. The composition of claim 1, wherein the carrier molecule is an IgG1 antibody and the linker is bound to the IgG1 antibody at the glycosylation site.

11. The composition of claim 10, wherein the glycosylation site is asparagine at position 297 by EU numbering.

12. The composition of claim 1, wherein the antibody targets p95-HER2.

13. The composition of claim 1, wherein the antibody is a p95-HER2 antibody.

14. The composition of claim 1, wherein at least one of the aptamers in the enonomer is an anti-CD3ε aptamer.

15. The composition of claim 1, wherein:
the carrier molecule is an antibody; and
the antibody targets HER2.

16. The composition of claim 1, wherein at least one of the aptamers in the enonomer targets (a) CD3, (b) a T cell CD3 activating receptor, (c) a hematopoietic malignancy, (d) truncated forms of an epidermal growth factor receptor (EGFR), or (e) a tumor specific target on the surface of tumor cells.

17. The composition of claim 16, wherein:
the carrier molecule is an antibody; and
the antibody targets CD20 or CD19.

18. The composition of claim 16, wherein:
the antibody targets a tumor specific target on the surface of tumor cells; and
the tumor specific target comprises an altered glyco-epitope.

19. The composition of claim 1, which comprises (a) a CD20 targeting antibody conjugated via the linker to an anti-CD3ε aptamer, (b) a CD19 targeting antibody conjugated via the linker to an anti-CD3ε aptamer, (c) truncated forms of an epidermal growth factor receptor (EGFR) targeting antibody conjugated via the linker to an anti-CD3ε aptamer, or (d) a glyco-epitope targeting antibody conjugated via the linker to an anti-CD3ε aptamer.

20. The composition of claim 1, wherein the enonomer comprises two aptamers.

21. The composition of claim 1, wherein the branched PEG linker binds three aptamers.

22. The composition of claim 1, wherein at least two of the aptamers bind to HER2 on the surface of a tumor cell.

23. The composition of claim 1, wherein at least one of the aptamers is an anti-CD3 aptamer, an anti-CD3 epsilon aptamer, or an acid and nuclease resistant aptamer.

24. The composition of claim 1, wherein at least one of the aptamers bind to the extracellular domain of CD3 epsilon.

25. The composition of claim 24, wherein at least one of the aptamers bind to amino acids 23-126 of SEQ ID NO: 1.

26. A method of treating a subject afflicted with an inflammatory disease, an autoimmune disease, or a malignant disease comprising administering to the subject an amount of the composition of claim 1 effective to treat the subject thereby treating the subject.

27. The method of claim 26, wherein the subject is afflicted with breast cancer, gastric cancer, ovarian cancer, or non-small cell lung cancer.

28. A method of treating a subject afflicted with a HER2 (+) cancer, comprising administering to the subject an amount of the composition of claim 1 effective to treat the subject, wherein the carrier molecule is an antibody that is trastuzumab.

29. The method of claim 28, wherein the HER2 (+) cancer is breast cancer, gastric cancer, ovarian cancer, or non-small cell lung cancer.

30. The method of claim 26, wherein:
the subject is afflicted with cancer; and
the method further comprises administering checkpoint inhibitors to the subject.

31. A method of treating a subject afflicted with ovarian cancer, or another cancer that causes overexpression of the follicle stimulating hormone receptor (FSHR), comprising administering a composition of claim 1 to the subject, wherein the enonomer comprises an antibody to the FSHR.

32. The composition of claim 1, wherein at least two of the aptamers bind to a T cell CD3 activating receptor.

33. The composition of claim 1, wherein:
the enonomer comprises two or more aptamers, a PEG moiety, and a tumor-targeting antibody that is an IgA1 antibody;
the aptamers bind to CD3 epsilon; and
the PEG is bound to the fucose on each chain of the antibody, the PEG moiety is branched, and the aptamers are linked to each branch of the PEG moiety.

34. The composition of claim 1, wherein:
the antibody is coupled through fucose to a single branched or multi-branched polyethylene glycol (PEG); and
the PEG is conjugated to the 5' end of an anti-CD3 aptamer to provide bispecific activity.

35. The composition of claim 34, wherein each chain of the antibody is coupled through fucose to PEG.

36. The composition of claim 34, wherein the antibody binds overexpressed receptors on a tumor cell.

37. The composition of claim 1, wherein the antibody is selected from among trastuzumab, pertuzumab, ado-trastuzumab, and a biosimilar thereof.

38. The composition of claim 1, wherein the antibody is an anti-cancer antibody, the linker is branched PEG moiety linked to a glycan moiety on the CH2 domain of the antibody, and the construct comprises two or three aptamers, each binding to a target on an immune cell.

* * * * *